(12) United States Patent
Yamaguchi et al.

(10) Patent No.: US 7,852,764 B2
(45) Date of Patent: Dec. 14, 2010

(54) RELAY TRANSMISSION DEVICE AND RELAY TRANSMISSION METHOD

(75) Inventors: Takao Yamaguchi, Osaka (JP); Katsuji Aoki, Kanagawa (JP); Atsushi Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 12/095,577

(22) PCT Filed: Sep. 12, 2007

(86) PCT No.: PCT/JP2007/067757

§ 371 (c)(1),
(2), (4) Date: May 30, 2008

(87) PCT Pub. No.: WO2008/035600

PCT Pub. Date: Mar. 27, 2008

(65) Prior Publication Data

US 2010/0165846 A1    Jul. 1, 2010

(30) Foreign Application Priority Data

Sep. 20, 2006  (JP) .............................. 2006-254345

(51) Int. Cl.
*G01R 31/08* (2006.01)
*G06F 11/00* (2006.01)
*G06F 13/36* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ..................... 370/231; 370/232; 370/235; 710/56; 710/310

(58) Field of Classification Search .............. 370/231, 370/235, 236, 236.1, 237, 238; 710/56, 310
See application file for complete search history.

(56) References Cited

U.S. PATENT DOCUMENTS 4,788,679 A * 11/1988 Kataoka et al. .............. 370/413

(Continued)

FOREIGN PATENT DOCUMENTS

JP        2001-160824        6/2001

(Continued)

OTHER PUBLICATIONS

International Search Report issued Oct. 30, 2007 in International (PCT) Application No. PCT/JP2007/067757.

(Continued)

*Primary Examiner*—Aung S Moe
*Assistant Examiner*—Benjamin Elliott
(74) *Attorney, Agent, or Firm*—Wenderoth, Lind & Ponack, L.L.P.

(57) ABSTRACT

A relay transmission device can achieve high-quality transmission by suppressing congestion in an ad hoc network, even when a network environment changes or performance of a relay device to be communicated with changes. The relay transmission device includes: an optimization coefficient storage unit (1608) that stores, for each cooperative relay device, a self-optimization coefficient for weighting an amount of data determined by a self-optimization flow control unit (1603) and a total optimization coefficient for weighting an amount of data determined by a total optimization flow control unit (1604); and a balance adjustment unit (1605) that compares, for each cooperative relay device, an influence of congestion caused by transmission bandwidth allocation contention on the relay transmission device and an influence of congestion caused by transmission bandwidth allocation contention on the cooperative relay device, and adjusts the self-optimization coefficient and the total optimization coefficient based on a result of the comparison.

22 Claims, 28 Drawing Sheets

U.S. PATENT DOCUMENTS

| | | | |
|---|---|---|---|
| 5,493,566 A * | 2/1996 | Ljungberg et al. | 370/231 |
| 5,581,544 A * | 12/1996 | Hamada et al. | 370/253 |
| 5,742,600 A * | 4/1998 | Nishihara | 370/395.6 |
| 5,777,988 A * | 7/1998 | Cisneros | 370/238 |
| 6,463,135 B2 * | 10/2002 | Abrishami et al. | 379/100.01 |
| 6,859,435 B1 * | 2/2005 | Lee et al. | 370/231 |
| 6,868,083 B2 | 3/2005 | Apostolopoulos et al. | |
| 6,918,077 B2 * | 7/2005 | Fukushima et al. | 714/748 |
| 7,054,790 B1 * | 5/2006 | Rich | 702/186 |
| 7,103,669 B2 | 9/2006 | Apostolopoulos et al. | |
| 7,142,508 B2 * | 11/2006 | Tobagi et al. | 370/230 |
| 7,417,993 B1 * | 8/2008 | Ebergen et al. | 370/395.72 |
| 7,508,758 B1 * | 3/2009 | Kekki | 370/230 |
| 7,689,695 B2 * | 3/2010 | Astley et al. | 709/226 |
| 2004/0114576 A1 | 6/2004 | Itoh et al. | |
| 2004/0136379 A1 * | 7/2004 | Liao et al. | 370/395.21 |
| 2004/0233918 A1 | 11/2004 | Larsson et al. | |
| 2005/0021830 A1 * | 1/2005 | Urzaiz et al. | 709/234 |
| 2005/0206726 A1 | 9/2005 | Yoshida et al. | |
| 2006/0168338 A1 * | 7/2006 | Bruegl et al. | 709/240 |
| 2006/0203760 A1 * | 9/2006 | Fukui et al. | 370/328 |
| 2007/0025250 A1 * | 2/2007 | Shimonishi et al. | 370/231 |
| 2010/0165846 A1 * | 7/2010 | Yamaguchi et al. | 370/236 |

FOREIGN PATENT DOCUMENTS

| | | |
|---|---|---|
| WO | 2005/076621 | 8/2005 |
| JP | 2002-325095 | 11/2002 |
| JP | 2003-152752 | 5/2003 |
| JP | 2004-235978 | 8/2004 |
| JP | 2004-529533 | 9/2004 |
| JP | 2005-65335 | 3/2005 |
| JP | 2005-065335 | 3/2005 |
| JP | 2005-507569 | 3/2005 |
| JP | 2005-110294 | 4/2005 |
| JP | 2005-303828 | 10/2005 |
| JP | 2006-81163 | 3/2006 |
| JP | 3903062 | 4/2007 |
| WO | WO 9853577 A1 * | 11/1998 |
| WO | 2004/091155 | 10/2004 |

OTHER PUBLICATIONS

Hidenori Aoki, "*IEEE802.11s Wireless Meshed Network Technology*", NTT DoCoMo Technical Journal, Jul. 1, 2006, vol. 14, No. 2, pp. 14-22.

Kentaro Kakami, "*Wireless Scheduling Method for Assured Service*", Technical Report of IEICE, CQ2000-11, vol. 100, No. 93 (2000), pp. 65-70.

M. Sugi et al., "*Autonomous Distributed Control of Traffic Signal Network by Reaction-Diffusion Equation on a Graph*", The Society of Instrument and Control Engineers, vol. 39, No. 1, Jan. 2003 (p. 51, left column, line 2—right column, line 25).

M. Sugi et al. "*Autonomous Decentralized Control of Traffic Signals with Closed-Loop Contraints on Offsets*", School of Engineering, The University of Tokyo, Bio-Mimetic Control Research Center, RIKEN (2003).

Hideo Yuasa et al., "*Autonomous Decentralized Systems and Reaction-Diffusion Equation on a Graph*", Journal of Control, Measurement, and System Integration, vol. 35, No. 11, pp. 1447-1453 (1999).

Takeshi Ohyabu et al. "*Proposal and Evaluation of an Access Point Selection Strategy in Multihop Wireless LAN*", Technical Report of IEICE, IN2005-207, pp. 299-304.

S. Sakata et al., "*Mobile Ad Hoc Networks and Wireless LAN Mesh Networks*", IEICE Transactions on Communications, vol. J89-B, No. 6, pp. 811-823, 2006 (p. 820, left column, line 39—right column, line 8).

International Search Report issued in the International (PCT) Application of which the present application is the U.S. National Stage.

* cited by examiner

FIG. 9

| | State of present relay device | State of other relay device | Operation |
|---|---|---|---|
| Airtime metric<br>Transmission error rate<br>Forward error correction strength<br>Retransmission count/time<br>Number of accommodated terminals | | < | Exclude from cooperative party |
| | | ≧ | Select as cooperative party |
| Reception electric field intensity | | > | Exclude from cooperative party |
| | | ≦ | Select as cooperative party |
| Buffer remaining amount (load) | Large | | Widen cooperative range |
| | | Large | Widen cooperative range<br>Exclude from cooperative party |
| | | Small | Widen cooperative range<br>Select as cooperative party with higher priority |
| Variation in buffer remaining amount | | Large | Exclude from cooperative party |
| | | Small | Select as cooperative party |
| Physical buffer size | Large | | Exclude from cooperative party |
| | Small | Large | Select as cooperative party |
| | Significant performance difference | | Exclude from cooperative party |
| Maximum transmission rate | Significant performance difference | | Exclude from cooperative party |

| Transmission source address | Transmission time | Cooperative information |
|---|---|---|
| | | Average buffer remaining amount |
| 192.168.0.10 | 12:00:10:11 | 4500 byte |

(b)

| Transmission source address | Transmission time | Cooperative information |
|---|---|---|
| | | Average buffer remaining amount |
| 192.168.0.1 | 12:00:10:64 | 10 byte |
| 192.168.0.3 | 12:00:10:21 | 2234 byte |
| 192.168.0.7 | 12:00:10:31 | 123 byte |
| 192.168.0.10 | 12:00:10:11 | 4500 byte |

| Transmission source address | Transmission time | Cooperative information | Performance information |
|---|---|---|---|
| | | Average buffer remaining amount | Physical buffer size |
| 192.168.0.10 | 12:00:10:11 | 4500 byte | 15000 byte |

(b)

| Transmission source address | Transmission time | Cooperative information | Performance information |
|---|---|---|---|
| | | Average buffer remaining amount | Physical buffer size |
| 192.168.0.1 | 12:00:10:64 | 10 byte | 15000 byte |
| 192.168.0.3 | 12:00:10:21 | 2234 byte | 10000 byte |
| 192.168.0.7 | 12:00:10:31 | 123 byte | 5000 byte |
| 192.168.0.10 | 12:00:10:11 | 4500 byte | 20000 byte |

FIG. 13

| | | State of present relay device | State of cooperative party | Operation |
|---|---|---|---|---|
| Buffer remaining amount (load, congestion) | | Large | | High frequency |
| | | Small | | Low frequency |
| | | Large | Large | Low frequency |
| | | Large | Small | High frequency |
| Variation in buffer remaining amount (variation in load, congestion) | | Large | | High frequency |
| | | Small | | Low frequency |
| | | Large | Large | Low frequency |
| | | Large | Small | High frequency |
| Communication distance (relay hop count) | | Long | | High frequency |
| | | Short | | Low frequency |
| Physical buffer size | | < | | High frequency |
| | | > | | Low frequency |
| Maximum transmission rate | Cooperative party on transmission path of data flow | < | | High frequency |
| | | > | | Low frequency |
| | Bidirectional communication with cooperative party | Significant performance difference | | Low frequency |

FIG. 19

| Difference | α | β₁...ₙ |
|---|---|---|
| + | ↗ | ↘ |
| 0 | → | → |
| − | ↘ | ↗ |

FIG. 21

| | | | Selection of cooperative party | Transmission buffer state of present relay device | Transmission buffer state of cooperative party |
|---|---|---|---|---|---|
| First example | Self-optimization and total optimization by scheduling control | Self-optimization | | Data remaining amount $q_{n,i}$ of each transmission buffer | |
| | | Total optimization | | | Average data remaining amount $Q_k$ of transmission buffers |
| Second example | Self-optimization and total optimization by packet discard control | Self-optimization | Data forwarding destination, forwarding destination relay device | Data remaining amount $q_{n,i}$ of each transmission buffer | |
| | | Total optimization | Data forwarding destination, forwarding destination relay device | | Average data remaining amount $Q_k$ of transmission buffers |
| Third example | Self-optimization by Examples 1 and 2 + total optimization by MAC control | Self-optimization | | Same as first and second examples | |
| | | Total optimization | One-hop neighbor relay device | Total data remaining amount $q_n$ of transmission buffers | Total data remaining amount $q_k$ of transmission buffers |
| Fourth example | Self-optimization and total optimization by MAC control | Self-optimization | | Data remaining amount $q_{n,i}$ of each transmission buffer | |
| | | Total optimization | One-hop neighbor relay device | | Average data remaining amount $Q_k$ of transmission buffers |
| Fifth example | Use of congestion control request (CCR) message of IEEE 802.11s | Estimate buffer state of cooperative party by CCR | Same as any of first to fourth examples | Same as any of first to fourth examples (estimate value) | |
| | | Estimate transmission amount of cooperative party by CCR | | Transmission amount $X_i$ of present relay device | Transmission amount $X_k$ of cooperative party |

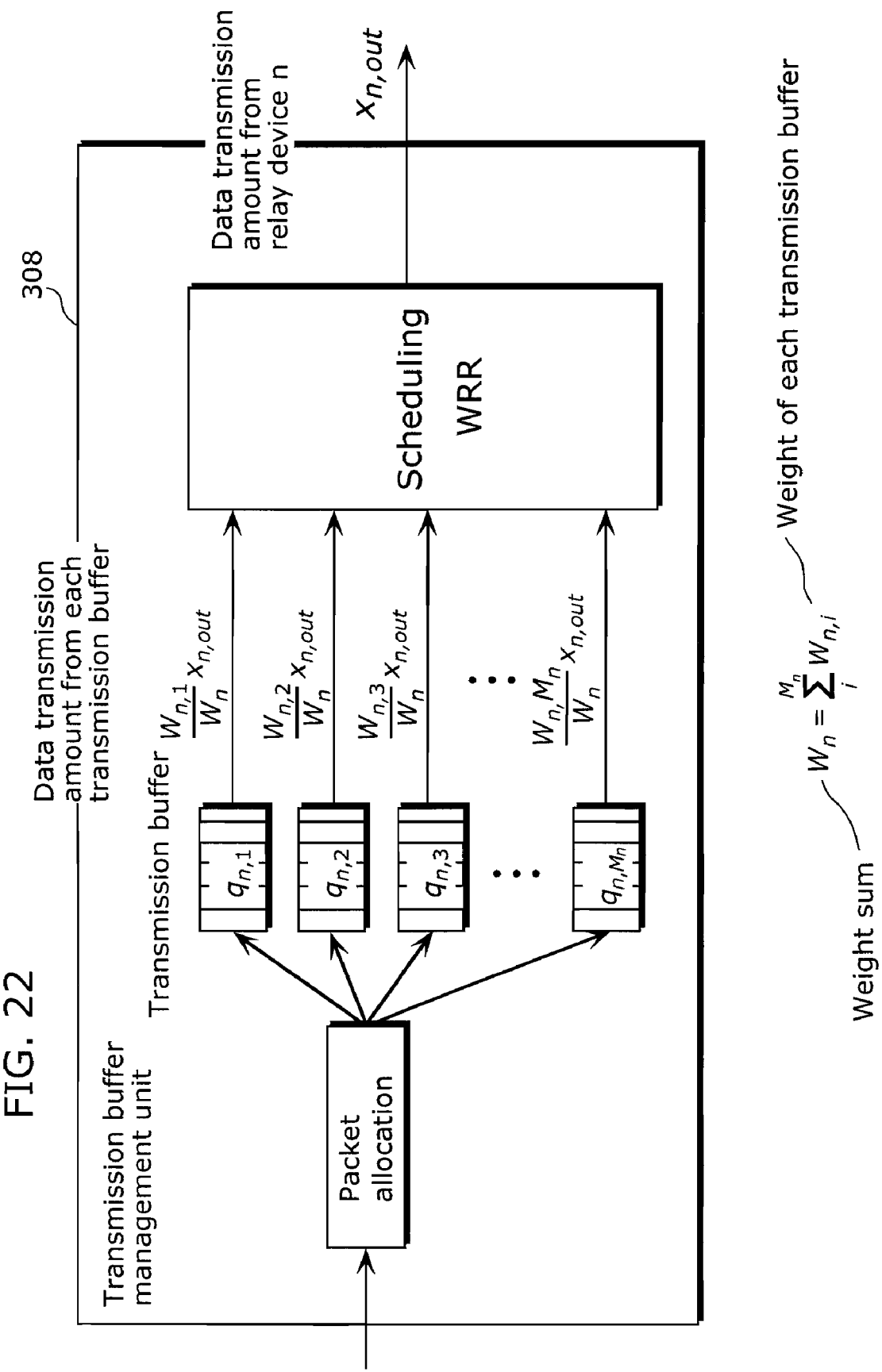

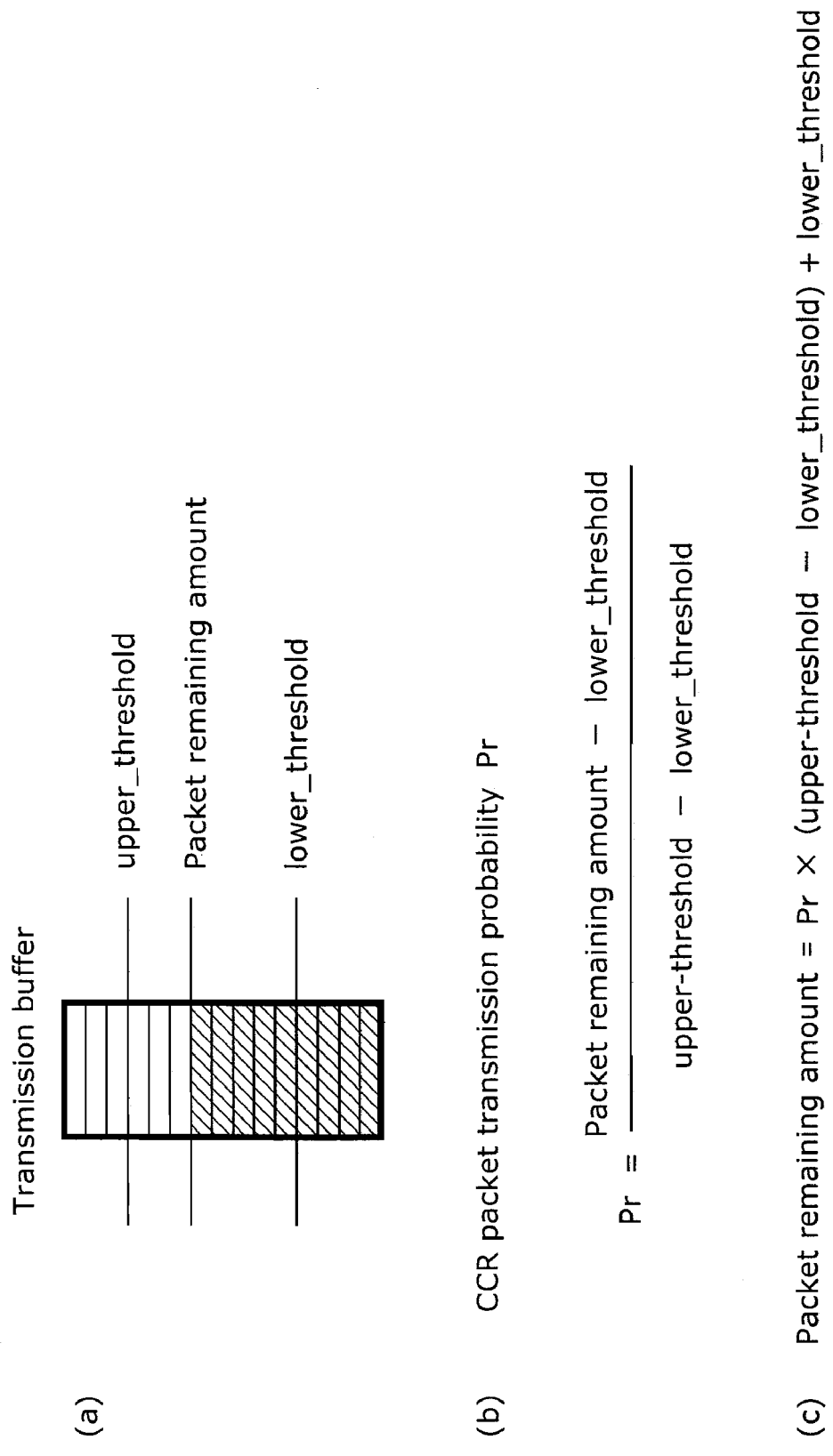

RELAY TRANSMISSION DEVICE AND RELAY TRANSMISSION METHOD

TECHNICAL FIELD

The present invention relates to a relay transmission device for relaying data in a network system in which fixed terminals or mobile terminals are connected by a wired or wireless network.

BACKGROUND ART

In a network where a plurality of terminals (including a transmission terminal and a reception terminal) and relay devices are connected to each other, "congestion" can occur when data is transmitted from the transmission terminal to the reception terminal via relay devices. This causes problems such as a transmission error (data loss) and a data reception delay.

In the data transmission, a relay device which relays between the transmission terminal and the reception terminal temporarily stores the data transmitted from the transmission terminal (or another relay device) connected to the relay device, into one of buffers that each correspond to a different forwarding destination (the reception terminal or another relay device). The relay device then transmits the stored data to a forwarding destination of the data. For example, congestion is such a state where, as a result of data that exceeds a buffer capacity being transmitted to the relay device, a buffer overflow occurs and a data loss or a time delay in transmitting to the forwarding destination ensues. Which is to say, congestion means that transmission packets concentrate and crowd in one place and consequently a data loss or a data transmission delay occurs.

The following compares an environment of an ad hoc network (often also called a multi-hop network or a mesh network) that does not require an access point and is composed only of a plurality of terminals (for example, personal computers, PDAs, mobile phones, and the like) which are connectable wirelessly (for example, by a wireless Local Area Network (LAN) or Ultra Wide Band (UWB)), with an environment of a network having only wired connections or a network having both wired and wireless connections. In the ad hoc network environment, all terminals and relay devices are connected wirelessly, so that transmission between a transmission terminal and a relay device, between relay devices, and between a relay device and a reception terminal tends to become unstable. Hence a data loss or a time delay due to congestion arises easily.

Congestion in the ad hoc network environment can be attributed to two types of imbalance in packet remaining amount between a plurality of buffers.

One type of imbalance is an inequality in packet remaining amount between buffers that correspond to different forwarding destinations in one relay device. This causes an imbalance in loss or delay between a plurality of traffic flows.

The other type of imbalance is an inequality in packet remaining amount between buffers of relay devices that are located on a same transmission path. This induces congestion in a relay device on the transmission path.

As a method of reducing an imbalance in buffer remaining amount in one relay device to suppress a delay or a loss between traffic flows, Non-patent Reference 1 discloses the following technique. In a network where a wireless network, such as a wireless LAN or a mobile phone network, and a wired network are connected to each other, scheduling control of changing a transmission priority in each service such as video distribution, voice communication, and data communication is performed according to a transmission error rate of a wireless link in a gateway which interconnects the wired network and the wireless network, in order to alleviate a degradation in Quality of Service (QoS) caused by a variation in transmission error rate on a transmission path.

Also, as a method of reducing an imbalance in buffer remaining amount between relay devices to suppress congestion in a relay device, the following technique is proposed. Each relay device performs, for each forwarding destination node or each communication flow to an ultimate destination, autonomous distributed control of resources according to a network crowding level in a wireless network, based on load states of the relay device itself and its neighbor relay device.

In detail, Patent Reference 1 discloses a wireless bridge that constitutes an autonomous distributed wireless communication network, to address the above problem. This wireless bridge includes: a load detection unit that detects a load of the wireless bridge itself; a high load node judgment unit that judges a node having a high forwarding load concentration in the network, by exchanging the detected load information with another wireless bridge; a forwarding destination determination unit that determines a forwarding destination node of a received packet; and a resource allocation control unit that controls resource allocation for each forwarding destination node based on a result of judgment by the high load node judgment unit. According to this structure, in the wireless network, resources are controlled in an autonomous distributed manner for each forwarding destination node or each communication flow to an ultimate destination, depending on a network crowding level.

This technique, however, urges each relay device to try to secure its own resources as much as possible (self-optimization). Therefore, contention arises when allocating resources among relay devices.

To allow a plurality of nodes, which operate in an autonomous distributed manner, to control resource allocation in cooperation with each other, Patent Reference 2 and Non-patent Reference 2 propose the following methods.

In the method of Patent Reference 2, in addition to self-optimization control, total optimization control is simultaneously executed on each of a plurality of cameras which are capable of adjusting a photographing area (resource shared by the plurality of cameras) by pan/tilt/zoom control. The self-optimization control causes each individual camera to photograph directly below itself so that no distortion occurs. The total optimization control causes the plurality of cameras to photograph an entire surveillance area without any blind spot. To enable the system as a whole to fully achieve the two purposes of photographing directly below each individual camera and photographing the entire surveillance area, optimization control is performed on allocation of the photographing areas of the plurality of cameras to the surveillance area. It should be noted here that, to make the mutually contradictory operations of the self-optimization control and the total optimization control coexist in each camera, a ratio of the two types of control has been determined in advance through trial and error when setting up the plurality of cameras, in consideration of a room size, a number of cameras, and camera performance.

In the method of Non-patent Reference 2, the following self-optimization control and total optimization control are performed to ease traffic jams of vehicles at a plurality of intersections. The self-optimization control adjusts switching timings of traffic lights at each intersection according to a traffic volume of each destination, to reduce the number of vehicles stopping at a red light at the intersection. The total optimization control adjusts switching timings of traffic lights at each intersection so that vehicles can drive through an adjacent intersection without stopping.

It is to be noted here that, to make the self-optimization control and the total optimization control coexist at each traffic light, a ratio of the two types of control has been determined in advance in consideration of a number and placement of intersections and a distance between intersections.

Furthermore, Non-patent Reference 3 proposes a method of selecting an access point (party to be communicated with) to which a terminal is to transmit data, in a wireless multi-hop network having a plurality of access points.

In the method of Non-patent Reference 3, in a multi-hop wireless LAN where a plurality of access points are wirelessly connected to each other, a terminal autonomously selects an access point based on a reception electric field intensity, a transmission error rate, and a number of terminals connected to each access point.

Patent Reference 1: Japanese Unexamined Patent Application Publication No. 2005-303828

Patent Reference 2: Japanese Patent No. 3903062

Non-patent Reference 1: Kakami, "Wireless Scheduling Method for Assured Service", Technical Report of IEICE, CQ2000-11, Vol. 100, No. 93 (2000), pp. 65-70

Non-patent Reference 2: Sugi, "Autonomous Distributed Control of Traffic Signal Network by Reaction-Diffusion Equation on a Graph", The Society of Instrument and Control Engineers, Vol. 39, No. 1, January 2003

Non-patent Reference 3: Ohyabu, "Proposal and Evaluation of an Access Point Selection Strategy in Multihop Wireless LAN", Technical Report of IEICE, IN2005-207, pp. 299-304

DISCLOSURE OF INVENTION

Problems that Invention is to Solve

As for a method of reducing the two types of imbalance in packet remaining amount between a plurality of buffers which can lead to a delay or a loss in an ad hoc network, Patent Reference 1 employs self-optimization control which is performed independently in each relay device. Since each relay device tries to secure its own resources as much as possible, contention for resource allocation occurs between relay devices.

Conventionally, a buffer transmission amount is controlled so that a single buffer has a bandwidth allocated based on a predetermined network operation policy, without distinguishing different traffic destinations. However, since transmission amounts of traffic flows having different destinations are controlled in the same buffer, a traffic delay or fluctuation tends to occur due to interference between traffic flows. This causes congestion.

Class-Based Queuing (CBQ) that allows for sharing of a bandwidth by each class of traffic flow depending on a volume of the traffic flow is proposed for effective bandwidth utilization. In CBQ, however, transmission bandwidths of a plurality of buffers in one relay device are controlled without simultaneously taking congestion states of the relay device and its neighbor relay device into consideration. Accordingly, a traffic delay or fluctuation tends to occur, which causes congestion.

Thus, the cause of congestion in an ad hoc network can be analyzed as follows. Because each relay device does not perform transmission bandwidth allocation in consideration of congestion states of the relay device itself and its neighbor relay device while distinguishing different destinations, a buffer imbalance arises in relay devices owing to interference between traffic flows, a fluctuation in physical band of a transmission path, and the like. This increases a likelihood of congestion.

Such an imbalance that causes congestion can be classified into two types, namely, an imbalance in data remaining amount between buffers in one relay device, and an imbalance in data remaining amount between buffers of relay devices on a transmission path.

To realize stable high-quality transmission, both imbalances need to be suppressed simultaneously.

In view of this, to prevent congestion in all relay devices in a network system, there is a need for a specific method of dynamically determining a transmission bandwidth allocation ratio for each destination so as to suppress these two imbalances, by distinguishing between different destinations and also taking buffer remaining amounts of a relay device and its neighbor relay device into consideration.

Patent Reference 2 and Non-patent Reference 2 propose solutions to resource allocation contention between devices, by employing not only self-optimization control but also total optimization control in fields (camera control, traffic light control) other than a network field.

In the case of applying self-optimization control and total optimization control to a distributed system, there is an issue of how to design the self-optimization control and the total optimization control. When comparing camera photographing control with no blind spot and its application to network control, the problems to be solved are completely different, and so their approaches to solutions are different. Therefore, self-optimization control and total optimization control are totally different between camera photographing control and network control.

A conventional study similar to network control is a vehicle traffic jam solution system. When compared with traffic light control aimed at solving traffic jams, conditions such as a transmission packet loss, a packet retransmission, and a physical transmission bandwidth of a transmission path vary in network control. Therefore, a packet remaining amount in a relay device changes in more various ways than a traffic jam solution system. This being so, even when the method of controlling switching timings of traffic lights to reduce a stopped time (delay) of each individual vehicle in the traffic jam solution system is applied to network control as a method of controlling transmission timings of individual packets by simply replacing vehicles with packets, it is difficult to avoid congestion.

Which is to say, in the case of network control, conditions such as a transmission packet loss, a packet retransmission, and a physical transmission bandwidth of a transmission path change and so a storage time of each individual packet is different, when compared with the traffic jam solution system. Hence there is a difficulty of executing control based on a packet storage time.

In Patent Reference 2 and Non-patent Reference 2, a ratio of each of self-optimization control and total optimization control is fixed beforehand at the time of designing, based on experience. Accordingly, when an environment surrounding a device continues to change dynamically, there is a problem of being unable to respond to such an environmental change in the process of solving resource allocation contention between devices.

In view of this, there is a need for a specific method of balance control that dynamically determines a ratio of each of self-optimization control and total optimization control in an application where high responsiveness to an environmental change is required, such as a network where a number of transmission flows or a transmission error rate changes.

Also, in determination of a party to be communicated with in a conventional network field, each terminal unilaterally determines a party to be communicated with and a communication frequency based only on a state of its connection destination, without any consideration for an influence of the connection on the party to be communicated with. This being so, in the case where the selected party greatly differs from the terminal in load (for example, a buffer crowding level) or performance (for example, a physical buffer size or a maximum transmission rate), a communication failure may occur due to a rapid load increase. In view of this, there is a need for a specific method of determining a party to be communicated with and a communication frequency in consideration of a difference in load or performance between terminals.

Moreover, in the total optimization control in the camera control and the traffic light control, a cooperative party (party to be communicated with) and a communication frequency with the cooperative party are fixed beforehand at the time of designing. This is problematic in terms of adaptability to a change in system structure, such as a change in number or placement of devices.

In view of this, there is a need for a specific method of determining a cooperative party (party to be communicated with) and a communication frequency with the cooperative party for total optimization control that exhibits high adaptability to a change in system structure, such as a change in number or placement of devices as in the case of a network.

Furthermore, a method of controlling self-optimization control and total optimization control in the case where performance differs between relay devices has not been studied yet.

The present invention has been developed to solve the above problems, and has an object of providing a relay transmission device that can achieve high-quality transmission by suppressing congestion in an ad hoc network, even when a network environment changes or performance of a relay device to be communicated with changes.

Means to Solve the Problems

A relay transmission device according to the present invention is a relay transmission device for transmitting data from a transmission terminal to a reception terminal via a plurality of relay devices, the relay transmission device including: transmission buffers each of which corresponds to, among the plurality of relay devices, a different one of relay devices that are data transmission destinations, and temporarily holds data to be transmitted from the relay transmission device to the corresponding relay device; a cooperative party determination unit which determines one or more cooperative relay devices that are to cooperate with the relay transmission device, from among the plurality of relay devices; a transmission flow information management unit which, for each cooperative relay device, exchanges information including a data remaining amount of a transmission buffer with the cooperative relay device, the data remaining amount being an amount of data held in the transmission buffer; a self-optimization flow control unit which, for each cooperative relay device, determines an amount of data to be transmitted from the relay transmission device to the cooperative relay device so that respective data remaining amounts of the transmission buffers are equalized; a total optimization flow control unit which, for each cooperative relay device, determines an amount of data to be transmitted from the relay transmission device to the cooperative relay device so that a data remaining amount of the transmission buffers and a data remaining amount of transmission buffers included in the cooperative relay device are equalized; an optimization coefficient storage unit in which a self-optimization coefficient and a total optimization coefficient are stored for each cooperative relay device, the self-optimization coefficient being a coefficient for weighting the amount determined by the self-optimization flow control unit, and the total optimization coefficient being a coefficient for weighting the amount determined by the total optimization flow control unit; and a transmission buffer management unit which, for each cooperative relay device, calculates a sum of a value obtained by weighting the amount determined by the self-optimization flow control unit based on the self-optimization coefficient and a value obtained by weighting the amount determined by the total optimization flow control unit based on the total optimization coefficient, and transmits data of an amount specified by the calculated sum to the cooperative relay device.

According to this structure, a ratio of each of self-optimization control and total optimization control can be changed based on the self-optimization coefficient and the total optimization coefficient. This makes it possible to vary the ratio of each of self-optimization control and total optimization control in an application where high responsiveness to an environmental change is required, such as a network where a number of transmission flows or a transmission error rate changes. As a result, congestion in an ad hoc network can be suppressed even when a network environment changes or performance of a relay device to be communicated with changes, with it being possible to achieve high-quality transmission.

Preferably, the relay transmission device further includes a balance adjustment unit which, for each cooperative relay device, compares an influence of congestion caused by transmission bandwidth allocation contention on the relay transmission device and an influence of congestion caused by transmission bandwidth allocation contention on the cooperative relay device, increases the self-optimization coefficient and decreases the total optimization coefficient when the influence on the relay transmission device is larger than the influence on the cooperative relay device, and decreases the self-optimization coefficient and increases the total optimization coefficient when the influence on the relay transmission device is smaller than the influence on the cooperative relay device.

According to this structure, the ratio of each of self-optimization control and total optimization control can be dynamically changed according to the degree of influence on the relay transmission device and the degree of influence on the cooperative relay device. This makes it possible to dynamically determine the ratio of each of self-optimization control and total optimization control in an application where high responsiveness to an environmental change is required, such as a network where a number of transmission flows or a transmission error rate changes. As a result, congestion in an ad hoc network can be suppressed even when a network environment changes or performance of a relay device to be communicated with changes, with it being possible to achieve high-quality transmission.

Preferably, the balance adjustment unit, for each cooperative relay device, increases the self-optimization coefficient and decreases the total optimization coefficient when the data remaining amount of the transmission buffers in the relay transmission device is larger than the data remaining amount of the transmission buffers in the cooperative relay device, and decreases the self-optimization coefficient and increases the total optimization coefficient when the data remaining amount of the transmission buffers in the relay transmission device is smaller than the data remaining amount of the transmission buffers in the cooperative relay device.

When the remaining amount of the transmission buffers in the relay transmission device is larger than the remaining amount of the transmission buffers in the cooperative relay device, it can be judged that the relay transmission device is in a heavier congestion state than the cooperative relay device. In this case, by increasing the self-optimization coefficient and decreasing the total optimization coefficient, the congestion state of the relay transmission device can be solved with a higher priority. On the other hand, when the remaining amount of the transmission buffers in the relay transmission device is smaller than the remaining amount of the transmission buffers in the cooperative relay device, it can be judged that the cooperative relay device is in a heavier congestion state than the relay transmission device. In this case, by increasing the total optimization coefficient and decreasing the self-optimization coefficient, the congestion state of the cooperative relay device can be solved with a higher priority.

More preferably, the self-optimization flow control unit, for each cooperative relay device, compares a data remaining amount of one of the transmission buffers in the relay transmission device corresponding to the cooperative relay device and an average data remaining amount of the transmission buffers in the relay transmission device, increases the amount of data to be transmitted to the cooperative relay device when the data remaining amount of the transmission buffer corresponding to the cooperative relay device is larger than the average data remaining amount of the transmission buffers, and decreases the amount of data to be transmitted to the cooperative relay device when the data remaining amount of the transmission buffer corresponding to the cooperative relay device is smaller than the average data remaining amount of the transmission buffers.

According to this structure, the data transmission amount is adjusted so that the remaining amount of each transmission buffer in the relay transmission device is equalized. This contributes to a more uniform quality (delay, loss rate) of a data flow transmitted to each forwarding destination.

More preferably, the total optimization flow control unit calculates an average data remaining amount of transmission buffers in all of the one or more cooperative relay devices and, for each cooperative relay device, compares a data remaining amount of one of the transmission buffers in the relay transmission device corresponding to the cooperative relay device and the calculated average data remaining amount, increases the amount of data to be transmitted to the cooperative relay device when the data remaining amount of the transmission buffer corresponding to the cooperative relay device is larger than the calculated average data remaining amount, and decreases the amount of data to be transmitted to the cooperative relay device when the data remaining amount of the transmission buffer corresponding to the cooperative relay device is smaller than the calculated average data remaining amount.

By controlling the data transmission amount so that the buffer remaining amount of the relay transmission device and the average buffer remaining amount of the cooperative relay devices are equalized, buffer congestion in a relay device on a path from a transmission source to a transmission destination can be suppressed.

More preferably, the cooperative party determination unit, when the data remaining amount of the transmission buffers in the relay transmission device is larger than a first threshold, increases a number of hops specifying a range of cooperative relay devices, and determines each relay device which is located within a range of the increased number of hops counted from the relay transmission device, as a cooperative relay device.

When the buffer remaining amount of the relay transmission device is large, congestion occurs in the relay transmission device. In such a case, the range of cooperative relay devices is widened by increasing the number of hops. As a result, the congestion can be solved more easily.

More preferably, the cooperative party determination unit excludes, from the determination, a relay device which is located within the range of the increased number of hops counted from the relay transmission device but whose transmission buffers have a data remaining amount that is larger than a second threshold.

Even when a relay device is situated within the range of the number of hops, it is difficult to solve congestion if the relay device has a large buffer remaining amount. Accordingly, such a relay device is excluded from the cooperative party determination.

More preferably, the cooperative party determination unit determines a relay device whose transmission buffers have a data remaining amount that is smaller than a predetermined threshold, as a cooperative relay device, and the predetermined threshold is a median value or a mode value of the data remaining amount of the transmission buffers in the relay device in a predetermined time period.

A relay device whose buffer remaining amount has a large temporal variation is excluded from the cooperative party determination. In this way, it is possible to avoid a situation where, as a result of adjusting the transmission amount in cooperation with a relay device having a large variation in buffer remaining amount, the transmission amount control of the relay transmission device varies significantly and the transmission quality (loss rate, delay time, jitter) deteriorates.

More preferably, the cooperative party determination unit determines, with a higher priority, a relay device whose transmission buffers have a larger physical size as a cooperative relay device.

By prioritizing a relay device having a large buffer size as a cooperative party for transmission amount control, a greater portion of the buffer remaining amount of the relay transmission device can be passed to that relay device. Hence buffer congestion can be suppressed speedily.

More preferably, the cooperative party determination unit excludes, from the determination, a relay device that exceeds the relay transmission device in at least one of an airtime metric, a transmission error rate, a forward error correction strength, a retransmission count, a retransmission time, and a number of accommodated terminals.

Also, the cooperative party determination unit excludes a relay device that has a smaller reception electric field intensity than the relay transmission device, from the determination.

According to these structures, a faulty network component is isolated promptly. This enables transmission to be performed on a stable network.

More preferably, the cooperative party determination unit excludes a relay device whose maximum transmission rate absolute difference from the relay transmission device is larger than a predetermined threshold, from the determination.

When there is a significant disparity in maximum transmission rate between the relay transmission device and a relay device, congestion is likely to occur in the device with a lower maximum transmission rate. Accordingly, by excluding the relay device from the cooperative party determination, a failure of optimization control between the relay transmission device and the relay device can be avoided.

More preferably, the transmission flow information management unit increases a frequency of exchanging the information, when the data remaining amount of the transmission buffers in the relay transmission device is larger than a first threshold.

In the case when the relay transmission device has a high load state, the cooperative information is exchanged more frequently so as to reduce the load as soon as possible.

More preferably, the transmission flow information management unit, for each cooperative relay device, increases the frequency of exchanging the information with the cooperative relay device, when the data remaining amount of the transmission buffers in the relay transmission device is larger than the first threshold and the data remaining amount of the transmission buffers in the cooperative relay device is smaller than a second threshold.

When the cooperative relay device has a low load state, a greater effect of reducing the load of the relay transmission device can be expected. Accordingly, the cooperative information is exchanged more frequently.

More preferably, the transmission flow information management unit increases a frequency of exchanging the information, when the data remaining amount of the transmission buffers in the relay transmission device is larger than a first threshold, and the first threshold is a median value or a mode value of the data remaining amount of the transmission buffers in the relay transmission device in a first time period.

When the load variation of the relay transmission device is large, the cooperative information is exchanged more frequently to keep up with the rapid load variation.

More preferably, the transmission flow information management unit, for each cooperative relay device, increases the frequency of exchanging the information with the cooperative relay device, when the data remaining amount of the transmission buffers in the relay transmission device is larger than the first threshold and the data remaining amount of the transmission buffers in the cooperative relay device is smaller than a second threshold, and the second threshold is a median value or a mode value of the data remaining amount of the transmission buffers in the cooperative relay device in a second time period.

When the load variation of the cooperative relay device is small, stable control in the relay transmission device can be expected. Accordingly, the cooperative information is exchanged more frequently.

More preferably, the transmission flow information management unit, for each cooperative relay device, increases a frequency of exchanging the information with the cooperative relay device, when the transmission buffers in the relay transmission device have a smaller physical size than the transmission buffers in the cooperative relay device.

In the case where an amount of data transmitted to a relay device changes, a variation in data occupancy rate of a buffer is larger when the relay device has a small physical buffer size, than when the relay device has a large physical buffer size. This being so, when the transmission buffers in the relay transmission device have a smaller physical size than the transmission buffers in the cooperative relay device, a variation in data occupancy rate of the transmission buffers in the relay transmission device is large relative to the cooperative relay device. Accordingly, the cooperative information is exchanged more frequently. This enables the cooperative relay device to perform transmission amount control of high responsiveness to a variation in buffer remaining amount of the relay transmission device having a smaller physical buffer size.

More preferably, the transmission flow information management unit, for each cooperative relay device, increases a frequency of exchanging the information with the cooperative relay device, when the cooperative relay device is a larger number of hops away from the relay transmission device.

According to this structure, even when the number of relay devices which relay the cooperative information for total optimization increases (i.e. the distance to the cooperative relay devices increases), an influence of a connection relation or status change between relay devices, such as an influence of a processing load delay or a packet loss at the time of relay, can be prevented.

More preferably, the transmission flow information management unit, for each cooperative relay device, increases a frequency of exchanging the information with the cooperative relay device, when the relay transmission device has a smaller maximum transmission rate than the cooperative relay device.

When the relay transmission device has a smaller maximum transmission rate than the cooperative relay device, the buffer remaining amount of the relay transmission device tends to be larger than that of the cooperative relay device. Accordingly, the cooperative information is exchanged more frequently. This enables the cooperative relay device to perform transmission amount control of high responsiveness to a variation in buffer remaining amount of the relay transmission device having a smaller maximum transmission rate.

More preferably, the transmission flow information management unit, for each cooperative relay device, decreases a frequency of exchanging the information with the cooperative relay device when an absolute difference in maximum transmission rate between the relay transmission device and the cooperative relay device is larger than a predetermined threshold, in a case where the relay transmission device and the cooperative relay device perform mutual data transmission.

When the difference in maximum transmission rate between the relay transmission device and the cooperative relay device is significantly large, an influence of transmission amount control for buffer remaining amount equalization greatly differs between the relay transmission device and the cooperative relay device, which may lead to a failure of optimization control between them. Therefore, to prioritize total optimization control with another cooperative relay device whose maximum transmission rate does not differ so much from that of the relay transmission device, the cooperative information is less frequently transmitted to the cooperative relay device having a significant maximum transmission rate difference.

It should be noted that the present invention can be realized not only as a relay transmission device which includes the above characteristic units, but also as a relay transmission method which includes steps corresponding to the characteristic units included in the relay transmission device, or as a program for causing a computer to execute the characteristic steps included in the relay transmission method. Such a program can be distributed via a recording medium such as a Compact Disc-Read Only Memory (CD-ROM) or a communication network such as the Internet.

EFFECTS OF THE INVENTION

According to the present invention, buffer control is performed from two perspectives, namely, equalization of a packet remaining amount between buffers which are provided in each relay device in correspondence with different forwarding destinations (self-optimization), and equalization of a packet remaining amount between buffers of relay devices on a same transmission path (total optimization). Through such buffer control, contention for transmission bandwidth allocation between buffers in each relay device and contention for transmission bandwidth allocation between relay devices can both be solved. As a result, congestion in an ad hoc network is suppressed, with it being possible to achieve high-quality transmission.

In detail, a packet loss caused by a packet overflow from a buffer in a relay device can be reduced, a throughput of each traffic flow can be improved, and a transmission delay and jitter can be minimized.

BRIEF DESCRIPTION OF DRAWINGS

FIG. 9 is an explanatory diagram of cooperative party (range) selection conditions.

FIG. 10 is an explanatory diagram of data communicated by a buffer remaining amount communication unit.

FIG. 11 is an explanatory diagram of data communicated by the buffer remaining amount communication unit.

FIG. 13 is an explanatory diagram of notification frequency determination conditions.

FIG. 19 is an explanatory diagram of a method of determining control amounts of α and β based on a difference in buffer remaining amount between the relay device and its neighbor relay device.

FIG. 21 is an explanatory diagram of assumed conditions of examples.

FIG. 22 is an explanatory diagram of a transmission amount adjustment method according to transmission buffer scheduling.

FIG. 28 is an explanatory diagram of a transmission probability of a congestion control request message.

Figure 1:
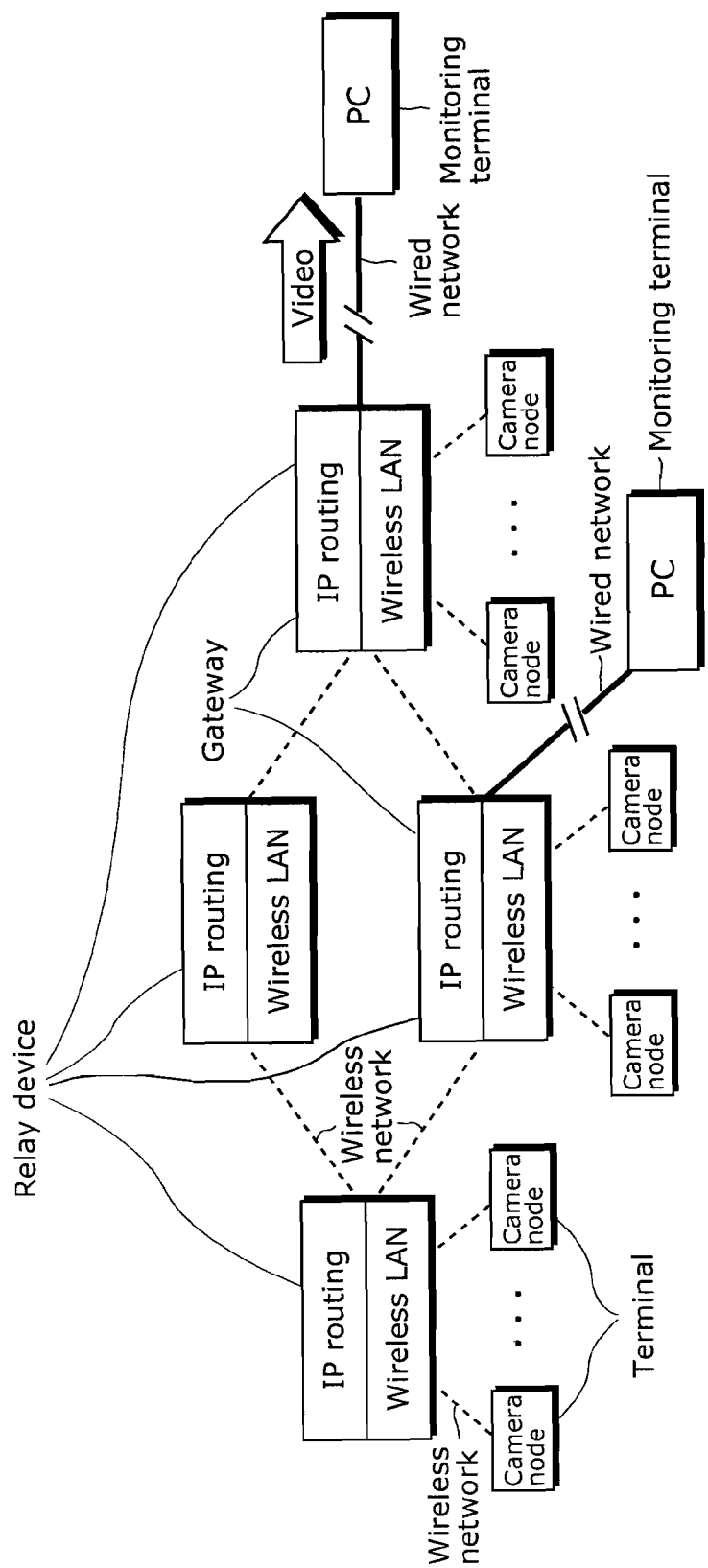
FIG. 1 is an explanatory diagram of a structure of a network to which the present invention is applied.

NUMERICAL REFERENCES 201 display unit
202 decoding unit
203 input unit
204 coding unit
205 wireless quality management unit
206 congestion state management unit
208 error correction code processing unit
209 transmission/reception unit
301 reception unit
302 reception buffer management unit
303 destination sorting processing unit
304 transmission buffer management unit
305 wireless quality management unit
306 congestion state management unit
307 routing processing unit
308 transmission flow management unit
309 transmission unit
310 reception buffer
311 transmission buffer
501-508 traffic light
1601 buffer remaining amount acquisition unit
1602 buffer remaining amount communication unit
1603 self-optimization flow control unit
1604 total optimization flow control unit
1605 balance adjustment unit
1606 cooperative party determination unit
1607 transmission flow information management unit
1608 optimization coefficient storage unit

BEST MODE FOR CARRYING OUT THE INVENTION

The following describes an embodiment of the present invention with reference to drawings.

A structure of a network to which the present invention is applied is described below, with reference to FIG. 1.

A plurality of terminals (camera nodes in FIG. 1) are connected to relay devices via a wireless network. A network is constructed between relay devices by a wireless ad hoc network, and connected to a monitoring terminal PC on a wired network. A relay device that is connected to the monitoring terminal PC, that is, a relay device that interconnects the wireless network and the wired network, is called a gateway. The number of gateways may be two or more, or no gateway may be provided. Also, the relay devices may be fixed terminals installed at predetermined positions, or mobile terminals capable of being moved.

Each relay device has a routing function of detecting and determining an optimal path for data transmission, and realizes the interconnection within the wireless ad hoc network and the interconnection of the wireless ad hoc network and the wired network.

The routing function mentioned here is a function of selecting an optimal path for transmitting data from a transmission terminal to a reception terminal via relay devices. The routing function may be realized in an IP packet level, or in a data link layer as in the case of IEEE 802.11s.

In FIG. 1, each terminal is either a camera or a monitoring terminal PC (personal computer), but there is no limitation on a type, performance, and the like of the terminal. For example, a television receiver used in a fixed position, a mobile phone or a car navigation system usable while moving, and so on are applicable, too.

Also, there is no limitation on a type and performance of a wireless network medium for connecting between a terminal and a relay device and between relay devices. For example, a wireless LAN, a Dedicated Short Range Communication (DSRC) system, a mobile phone network, and so on are applicable. Likewise, there is no limitation on a type and performance of a wired network medium. For example, an optical fiber, a Public Switched Telephone Network (PSTN), a LAN, and so on are applicable.

The network shown in FIG. 1 can be used for transmission of various media that include not only video and audio but also text, still images, music, control data, and the like. Also, the network is not limited to a particular place of use, and is intended for high-quality media transmission both indoors and outdoors.

Though the following description of the present invention mainly focuses on a wireless ad hoc network, the same problems as a wireless ad hoc network can also be found in a wired network or a mixed wired and wireless network. The present invention has the same effect not only for a wireless ad hoc network but also for a wired network and a mixed wired and wireless network.

Also, when each relay device in FIG. 1 is regarded as a functional module for a process such as coding or image processing which constitutes a Large Scale Integration (LSI) circuit or a Digital Signal Processor (DSP) and each transmission path (wireless network, wired network) in FIG. 1 is regarded as a communication bus for linking between functional modules, the present invention can be used for controlling transmission bandwidth allocation to a communication bus between functional modules in the LSI or DSP.

Especially, consider the case where, for a task to be processed by functional modules in the LSI or DSP, the LSI or DSP is provided with a routing function of determining a path for transfer of data necessary for processing the task between the functional modules via a communication bus. In such a case, the present invention has an effect of adjusting communication bus bandwidth allocation so as to suppress an imbalance in task processing amount (operating rate or task remaining amount) between functional modules on the path determined by the routing function, in the same way as it suppresses an imbalance in data remaining amount between transmission buffers of relay devices in a wireless ad hoc network. Here, the data remaining amount corresponds to an amount of unprocessed data.

Figure 2:
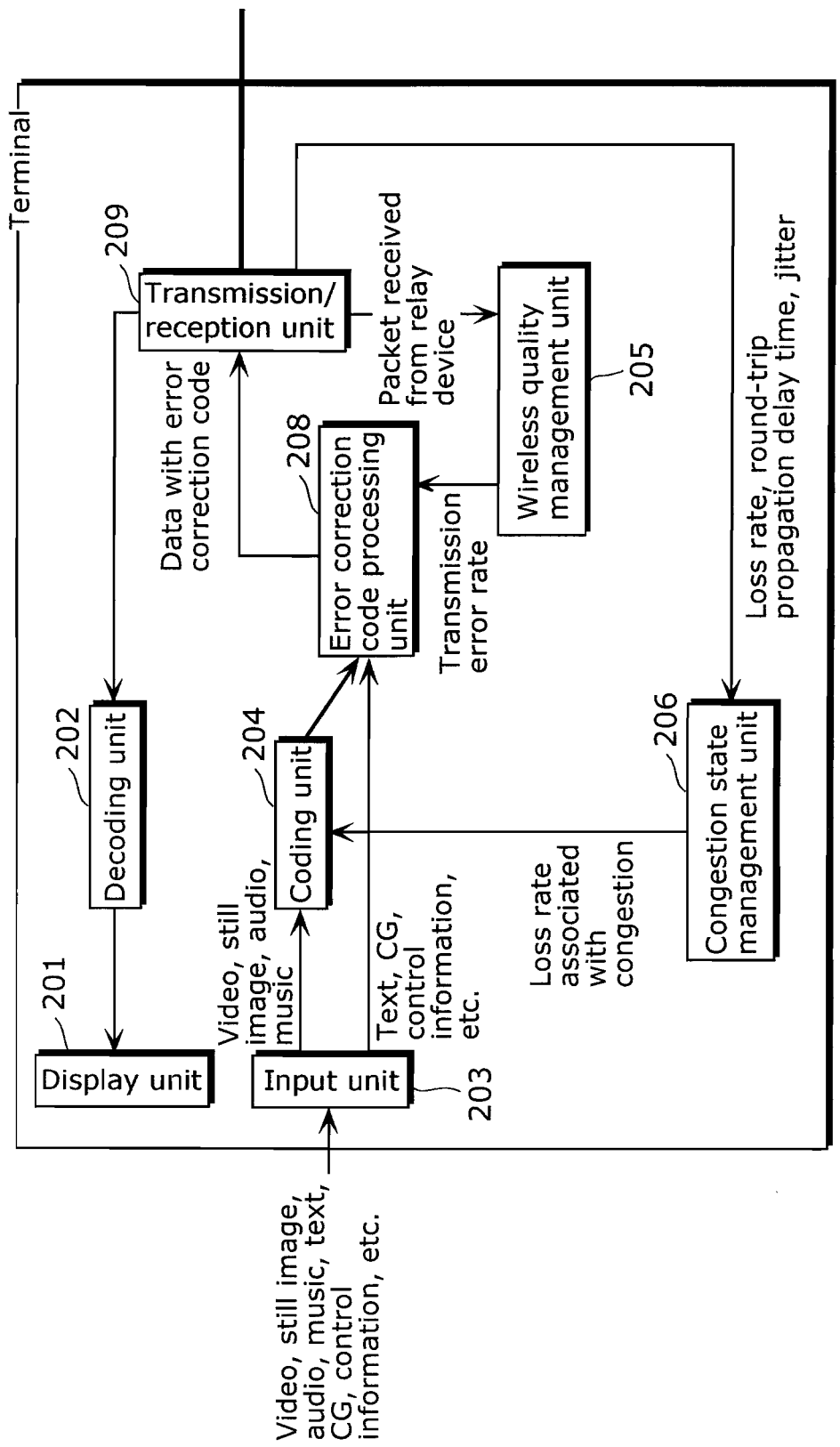
FIG. 2 is an explanatory diagram of a structure of a terminal.

FIG. 2 is an explanatory diagram of a structure of a terminal.

The terminal (transmission/reception terminal) includes a display unit 201, a decoding unit 202, an input unit 203, a coding unit 204, a wireless quality management unit 205, an error correction code processing unit 208, a congestion state management unit 206, and a transmission/reception unit 209.

The display unit 201 is a processing unit that displays decoded data. As one example, the display unit 201 is composed of a display and the like.

The decoding unit 202 is a processing unit that decodes data, such as video and audio, that needs decoding.

The input unit 203 is a processing unit that receives a data input of various media such as video, still images, audio, music, text, computer graphics (CG), control information, and the like.

The coding unit 204 is a processing unit that codes various data inputted by the input unit 203.

The wireless quality management unit 205 is a processing unit that calculates a transmission error rate based on a loss rate of reception data between the terminal and another terminal or a relay device.

The error correction code processing unit 208 is a processing unit that determines a transmission error correction code method and strength based on the transmission error rate received from the wireless quality management unit 205, and adds a transmission error correction code to the data coded by the coding unit 204.

The congestion state management unit 206 is a processing unit that obtains transmission quality information (expressed by a loss rate, a delay time, jitter) between the transmission and reception terminals, by performing communication between the transmission and reception terminals using a quality recording protocol (for example, Realtime Transport Protocol (RTP)/RTP Control Protocol (RTCP) of the Internet).

The transmission/reception unit 209 is a processing unit that performs data transmission/reception.

Figure 3:
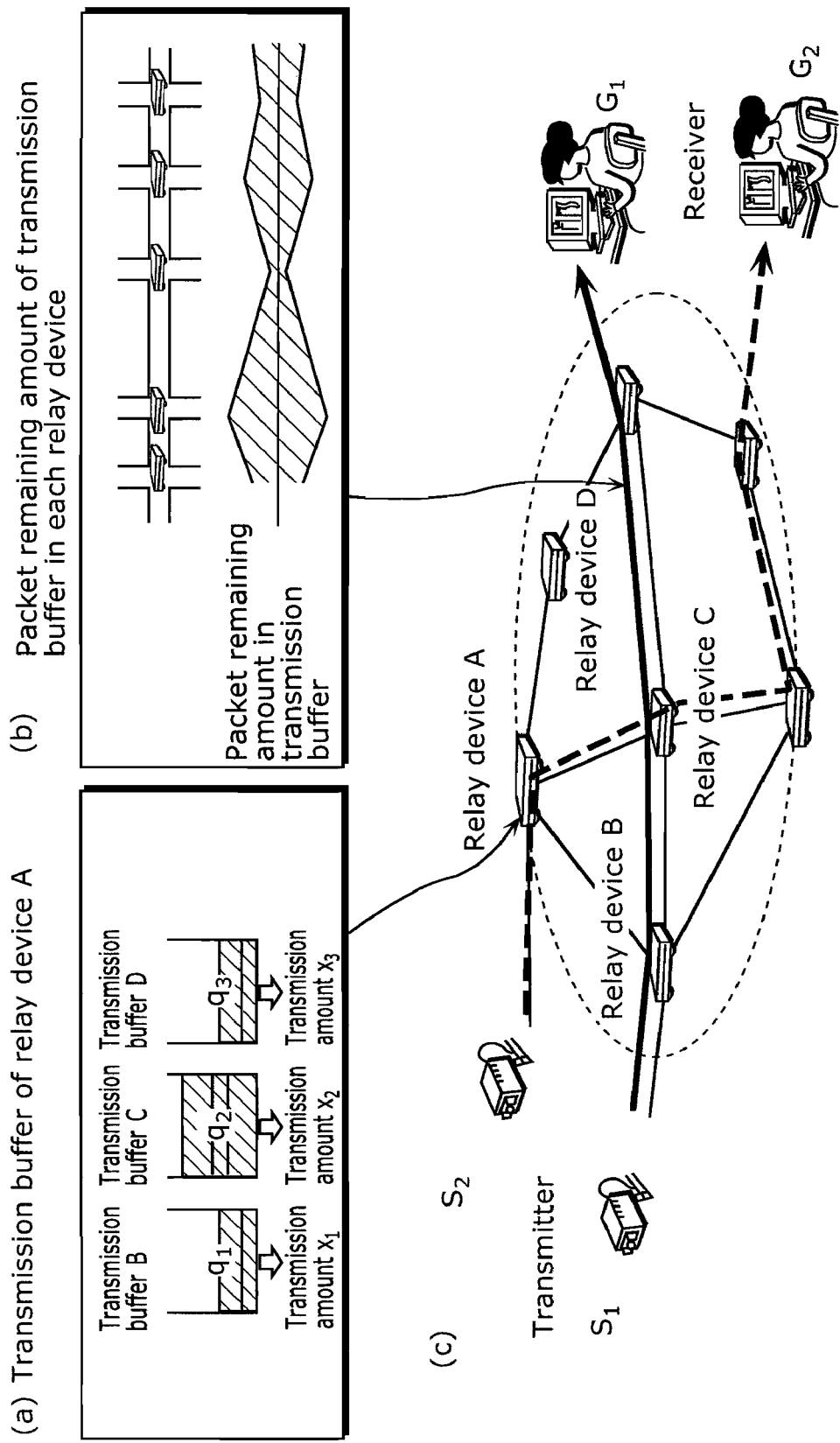
FIG. 3 is an explanatory diagram of a structure of a relay device.
Figure 4:
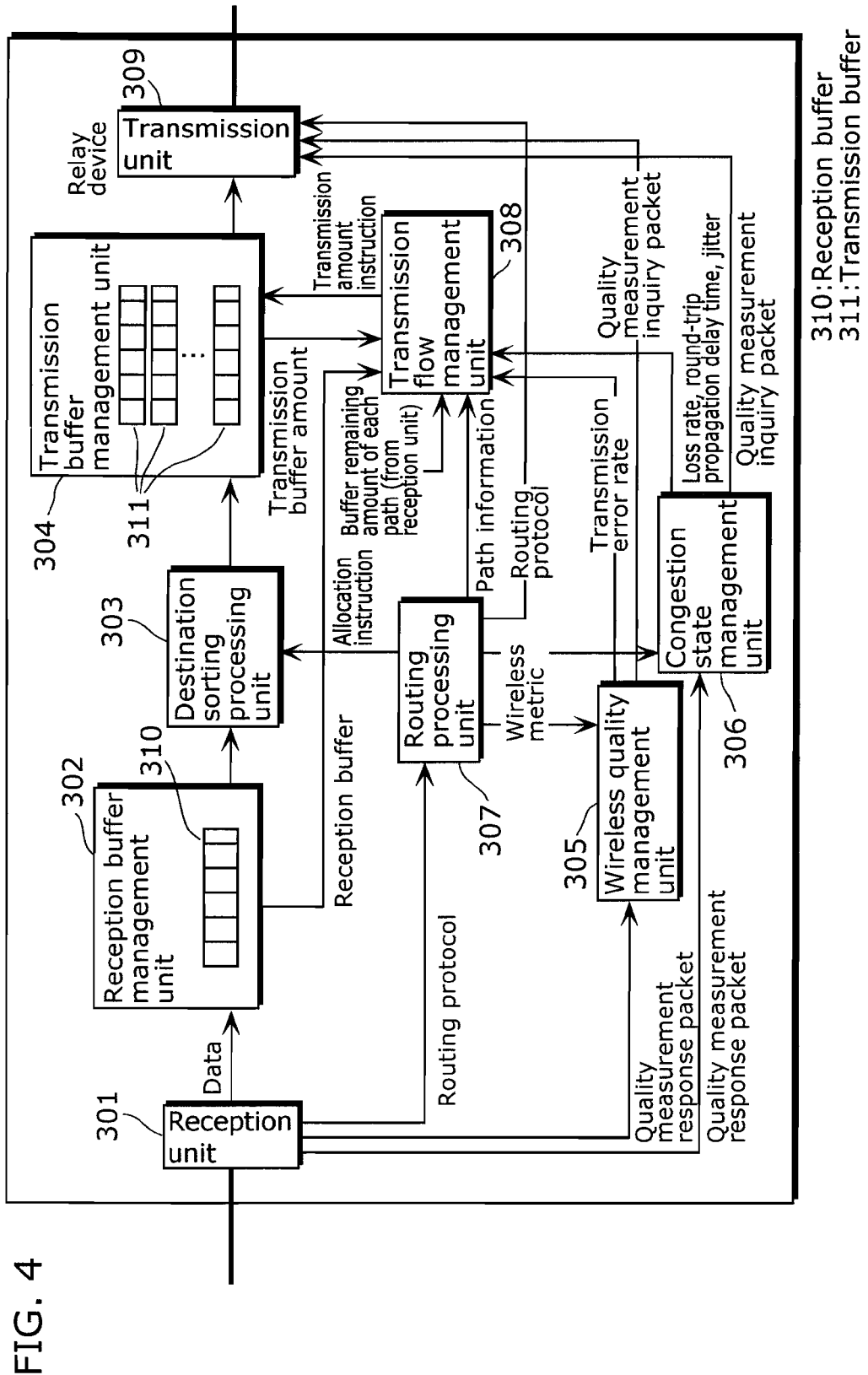
FIG. 4 is an explanatory diagram of a structure of a relay device.

FIGS. 3 and 4 are explanatory diagrams of a structure of a relay device.

An overview of a structure of a relay device is given first, by referring to FIG. 3. FIG. 3 shows an example where data is transmitted from a transmission terminal connected with a relay device, to a reception terminal connected with a relay device, via a plurality of relay devices. In detail, data is transmitted from transmitter S1 or S2 to receiver G1 or G2, with a line connecting S1 to G1 (or S2 to G2) indicating a transmission path.

Each relay device has buffers corresponding to different forwarding destinations of packets. In FIG. 3, relay device A is connected with relay devices B, C, and D. Relay device A sorts packets according to the connected forwarding destinations (relay devices B, C, and D) and stores the packets to the corresponding buffers (buffer B corresponding to relay device B, buffer C corresponding to relay device C, and buffer D corresponding to relay device D). Relay device A further controls a transmission amount of each buffer to the corresponding forwarding destination (for example, transmission amount $X_1$ of buffer B, transmission amount $X_2$ of buffer C, and transmission amount $X_3$ of buffer D). Note here that the relay device may not need to physically have a plurality of buffers, as it can also be implemented by a structure that allows a plurality of buffers to be distinguished logically.

FIG. 3(b) shows a packet remaining amount between buffers of relay devices on the transmission path from S1 to G1. In FIG. 3(b), the width of the line showing the packet remaining amount corresponds to a packet remaining amount in a buffer of each relay device, which differs between the relay devices. This indicates that, as a result of traffic flows from various directions joining together and causing traffic interference, the packet remaining amount (packet storage time) varies between buffers corresponding to different forwarding destinations within each relay device and between buffers of relay devices on the same transmission path.

Also, a packet loss or a delay occurs when a packet that exceeds a buffer capacity is transmitted to a relay device.

A structure of a relay device is described next, by referring to FIG. 4.

The relay device includes a reception unit 301, a reception buffer management unit 302, a destination sorting processing unit 303, a transmission buffer management unit 304, a wireless quality management unit 305, a congestion state management unit 306, a routing processing unit 307, a transmission flow management unit 308, and a transmission unit 309.

The reception unit 301 is a processing unit that receives data transmitted from another relay device or a terminal.

The reception buffer management unit 302 is a processing unit that, when a reception buffer for temporarily storing the received data is about to overflow, performs packet discard according to a predetermined rule (for example, discard transmission packets randomly when ⅔ of the capacity of the reception buffer is reached).

The destination sorting processing unit 303 is a processing unit that executes a transmission path sorting instruction, to sort data into a transmission queue (a first-in first-out (FIFO) queue) of a corresponding destination.

The transmission buffer management unit 304 is a processing unit that provides transmission queues for different forwarding destinations, and transmits transmission packets based on a transmission amount allocated to each transmission queue by the transmission flow management unit 308 described later.

The wireless quality management unit 305 is a processing unit that performs transmission error rate collection according to a quality measurement protocol, and obtains a transmission error rate based on a wireless metric (scale representing a transmission quality, which will be described in detail later).

The congestion state management unit 306 is a processing unit that, based on a wireless metric, discovers a congested relay device and calculates a congestion-related loss (loss rate, delay time, jitter) according to a transmission error rate and quality measurement protocol.

The routing processing unit 307 is a processing unit that generates a routing table about data forwarding destinations and paths from a routing protocol received by the reception unit 301, and extracts a wireless metric.

The transmission flow management unit 308 is a processing unit that determines a transmission amount and timing for each transmission destination, based on a reception buffer amount, a transmission error rate, a congestion-related loss (loss rate, delay time, jitter) of each transmission destination, and a buffer remaining amount of each path.

The transmission unit 309 is a processing unit that transmits data.

The reception unit 301 or the transmission unit 309 in the relay device performs, based on an instruction from the error correction code processing unit 208 in the transmission terminal, at least one of judgment on the presence or absence of a forward error correction code added to data transmitted between relay devices, selection of an error correction code method, and selection of an error correction code strength.

It should be noted that the structure of the relay device may have any of a form (IP router) of processing in an IP packet level or a form (bridge) of processing in a packet level (frame) of a data link layer.

(Network Congestion)

The following describes a method of reducing the cause of congestion for achieving high-quality transmission in a wireless ad hoc network. In the present invention, the cause of congestion is reduced by minimizing the amount of packets remaining in the entire network.

As mentioned earlier in the Background Art section, for example, congestion is a state where, as a result of data that exceeds a buffer capacity being transmitted to a relay device, a buffer overflow occurs and a data loss or a time delay in transmitting to a forwarding destination ensues. When the amount of data transmitted from a transmission terminal or another relay device exceeds a network transmission capacity, excessive data is discarded in the relay device. This accounts for a degradation in transmission quality of images or audio (a degradation in image or audio quality due to a packet loss, a display delay due to a transmission delay).

To reduce such congestion, the relay device adjusts a transmission amount in proportion to a data amount of a buffer in a transmission destination relay device, to suppress an imbalance in buffer remaining amount between relay devices on a same transmission path (a specific method for this will be described in detail later). In this way, the amount of packets remaining in the entire network can be minimized.

(Solution of Network Congestion)

As a method of simultaneously realizing self-optimization and total optimization, there is a vehicle traffic jam alleviation method in which each traffic light installed at a plurality of intersections in a town performs self-optimization control and total optimization control simultaneously (Non-patent Reference 2). To explain self-optimization control and total optimization control, the vehicle traffic jam alleviation method of Non-patent Reference 2 is described below, with reference to FIG. 5.

Figure 5:
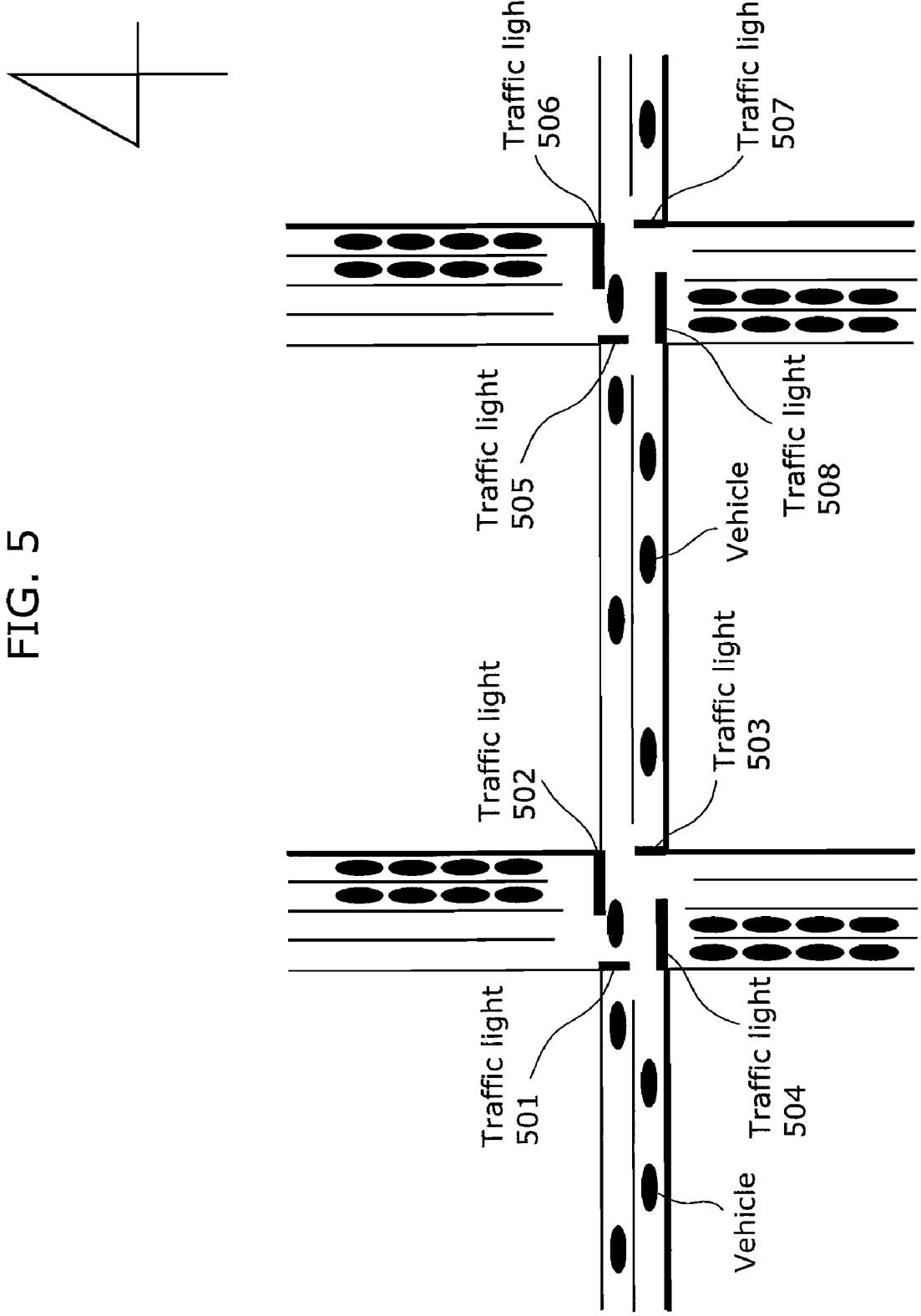
FIG. 5 is an explanatory diagram of a method of minimizing the number of packets remaining in an entire network.

Vehicle traffic jam suppression control is the following. FIG. 5 shows intersections of an east-west road and north-south roads, and flows of vehicles running on these roads. In FIG. 5, traffic lights 502, 504, 506, and 508 facing the north-south roads are red, while traffic lights 501, 503, 505, and 507 facing the east-west road are green. The method of Non-patent Reference 2 for alleviating traffic jams at such intersections is described in detail below.

Consider the case of controlling traffic light switching timings by focusing on one intersection, for traffic jam alleviation. In this case, it is necessary to perform such traffic light switching timing control that minimizes the number of vehicles stopping at a red light at the intersection. To do so, it is desirable to adjust, through the traffic light switching timing control, a time duration of each east-west traffic light being green and a time duration of each north-south traffic light being green in proportion to the number of vehicles coming from the east-west direction and the number of vehicles coming from the north-south direction. This traffic light switching timing control is self-optimization control for traffic jam alleviation, which is performed by traffic lights installed at each intersection independently.

On the other hand, consider the case of controlling traffic light switching timings by focusing on one vehicle, for traffic jam alleviation. In this case, it is desirable to perform such traffic light switching timing control that keeps the vehicle from stopping as much as possible by switching traffic lights situated on a running path of the vehicle to green in accordance with a running direction and speed of the vehicle. This traffic light switching timing control is total optimization control for traffic jam alleviation, which is performed cooperatively by traffic lights situated on a vehicle running path in accordance with a flow of traffic.

Each traffic light at the plurality of intersections simultaneously executes the self-optimization control which is performed at each intersection independently for alleviating traffic jams and the total optimization control which is performed cooperatively by traffic lights on the same vehicle running path for alleviating traffic jams. As a result, traffic jams (flow amounts) of vehicles on the entire roads can be eased.

These two types of traffic light switching timing control can be realized not by centralized control, but by distributed control which defines self-optimization control and total optimization control for each traffic light so that each traffic light adjusts its own switching timing according to a switching timing of an adjacent traffic light in an autonomous cooperative manner. This enables overall control to be performed with less information (the adjacent traffic light switching timing in this example) than the centralized control, and enhances responsiveness to a vehicle flow amount variation, extensibility with regard to the number of traffic lights and roads, and fault tolerance of traffic lights.

It is to be noted here that, in the traffic light switching timing control, a fixed ratio of self-optimization control and total optimization control of each traffic light is used in consideration of a number and placement of intersections which are subject to traffic jam alleviation, a distance between intersections, and the like.

The following describes an application of the vehicle traffic jam control method using self-optimization control and total optimization control to network congestion control and, as a characteristic feature of the present invention, adjustment of a ratio of self-optimization control and total optimization control.

A relation between vehicle traffic jam control and network congestion control is described first, with reference to FIGS. 3 and 5. The relay devices (such as relay devices A, B, C, and D) in FIG. 3 correspond to the traffic lights at the intersections in FIG. 5, and data (packet) transmitted on the network corresponds to a vehicle running on a road.

Each relay device has a transmission buffer for storing data (packet) which is to be forwarded to a next relay device, until a next transmission timing. Data (packet) temporarily stored in the transmission buffer corresponds to a vehicle stopping at a red light at an intersection.

In the vehicle traffic jam control, each traffic light on a vehicle running path performs total optimization control to reduce the number of vehicles stopping at a red light at each intersection, thereby suppressing traffic jams on the entire road. In the network congestion control, control of adjusting a packet transmission amount in cooperation with, for example, a one-hop neighbor relay device according to a data (packet) forwarding destination so as to reduce an amount of data remaining in a transmission buffer (hereafter referred to as a buffer remaining amount) of each relay device is defined as total optimization control.

As self-optimization control in each relay device, a method of controlling a packet transmission amount of each transmission buffer in the relay device according to an amount of packet remaining in the transmission buffer so as to equalize data remaining amounts (packet storage times) of transmission buffers in the relay device corresponding to different forwarding destinations, is formalized.

This makes it possible for the relay device to forward a packet to each forwarding destination with a same delay time. As a result, an effect of suppressing an increase in forwarding delay on a transmission path having a large amount of transmission can be attained.

As total optimization control in each relay device, a method of adjusting a packet transmission amount of each transmission buffer so as to equalize data remaining amounts (packet storage times) of transmission buffers of relay devices on a same path to a transmission destination, is formalized.

This produces an effect of solving a congested part on a transmission path of each communication flow, and reducing a delay caused by packet retransmission or the like at the congested part. Also, since the transmission buffer remaining amount of each relay device increases/decreases at an approximately same level, the cause of congestion can be reduced. As a result, data transmission that makes maximum use of the transmission buffer capacity on the transmission path can be conducted. Hence an effect of reducing a data loss rate can be achieved.

By equalizing the data remaining amount of each transmission buffer through such self-optimization control and total optimization control, it is possible to prevent a situation where a packet remains in a transmission buffer of a relay device for an extremely long time. Consequently, an increase in delay caused by a packet remaining in a transmission buffer for an extremely long time, jitter caused by a significant difference in transmission timing of each packet, and a packet loss caused by a buffer overflow can be avoided. That is, data can be transmitted without a quality decrease (data loss or delay).

The reception buffer management unit 302 is a processing unit that manages a reception buffer 310 for storing a transmission packet received from a neighbor relay device, irrespective of its destination. The reception buffer management unit 302 acquires a packet remaining amount in the reception buffer 310, and adjusts an amount of packet outputted from the reception buffer 310 to the destination sorting processing unit 303. The reception buffer 310 is mainly used for bridging a difference in communication speed between a transmission side and a reception side. Transmission packets accumulated in the reception buffer management unit 302 are passed to the destination sorting processing unit 303 in an accumulation order, and sorted according to their destinations in the destination sorting processing unit 303. The transmission packets are then passed to the transmission buffer management unit 304.

The transmission buffer management unit 304 is a processing unit that manages transmission buffers 311 which correspond to different destinations of transmission packets and are used for temporarily holding transmission packets. The transmission buffer management unit 304 acquires a packet remaining amount in each transmission buffer 311, and adjusts an amount of packet outputted from each transmission buffer 311 to the transmission unit 309.

Also, the transmission buffer management unit 304 stores a packet passed from the destination sorting processing unit 303 into a corresponding transmission buffer 311, based on a result of sorting by the destination sorting processing unit 303. The transmission buffer management unit 304 can adjust a packet transmission amount for each relay destination, by adjusting an amount of packet transmitted from each transmission buffer 311.

The transmission buffer management unit 304 may be physically provided with one buffer in which transmission packets are stored in virtual buffers that logically correspond to different destinations.

It should be noted that, unless otherwise stated, the following description uses an example of controlling a transmission amount of a relay device based on a data remaining amount of a transmission buffer 311.

(Structure for Transmission Flow Control)

Figure 6:
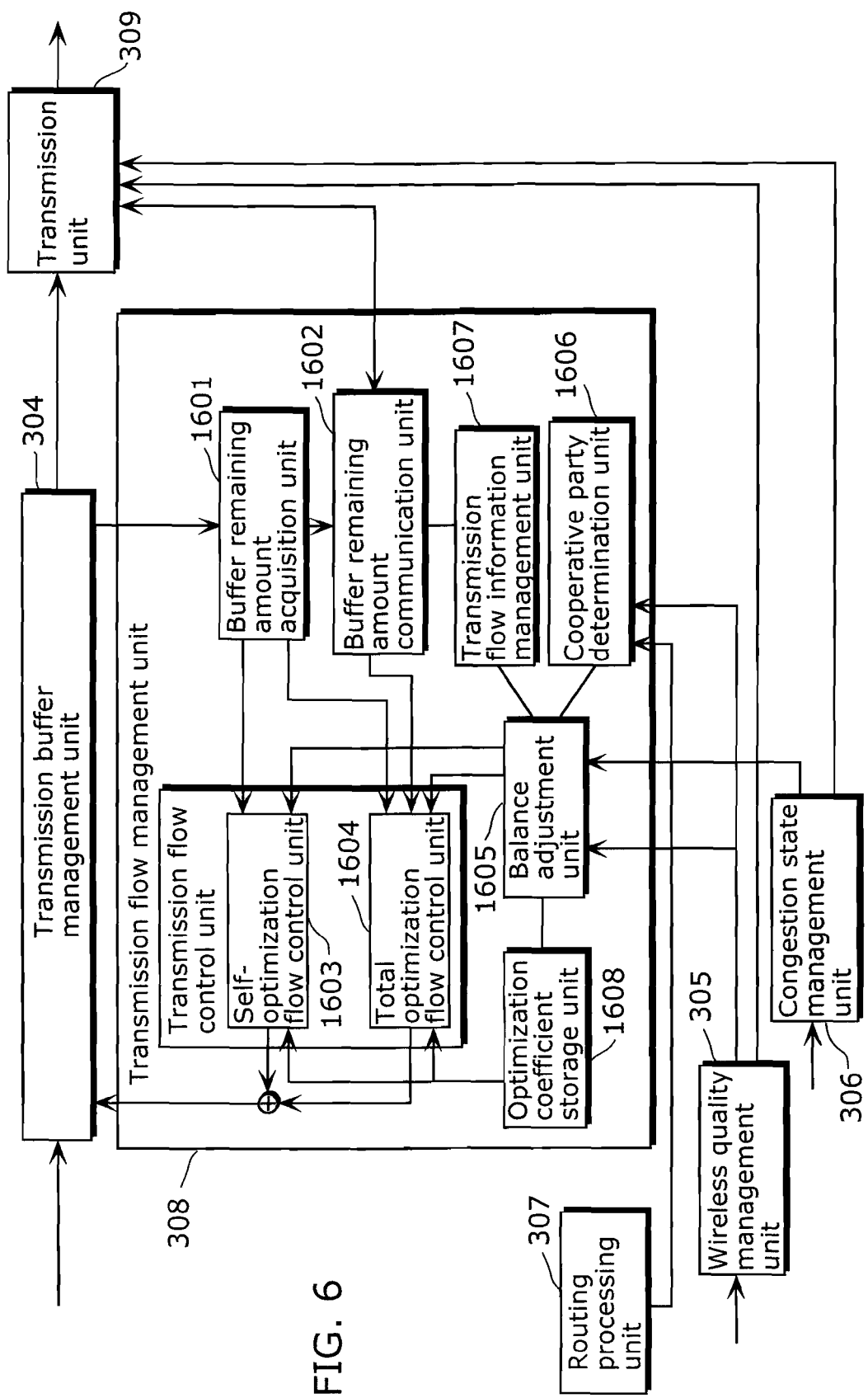
FIG. 6 is an explanatory diagram of a detailed structure of a transmission flow management unit 308 in the relay device.

FIG. 6 is an explanatory diagram of a detailed structure of the transmission flow management unit 308 in each relay device, which adjusts a packet forwarding amount through self-optimization control and total optimization control.

The transmission flow management unit 308 includes a buffer remaining amount acquisition unit 1601, a buffer remaining amount communication unit 1602, a self-optimization flow control unit 1603, a total optimization flow control unit 1604, a balance adjustment unit 1605, a cooperative party determination unit 1606, a transmission flow information management unit 1607, and an optimization coefficient storage unit 1608.

The buffer remaining amount acquisition unit 1601 acquires a buffer remaining amount of a transmission buffer, which is recorded by the transmission buffer management unit 304.

The buffer remaining amount communication unit 1602 communicates information about the buffer remaining amount acquired by the buffer remaining amount acquisition unit 1601, with a one-hop neighbor relay device. The buffer remaining amount communication unit 1602 holds information about a buffer remaining amount of the one-hop neighbor relay device.

The self-optimization flow control unit 1603 autonomously controls a transmission amount of each transmission buffer, based on a buffer remaining amount of each transmission buffer acquired by the buffer remaining amount acquisition unit 1601. Which is to say, the self-optimization flow control unit 1603 determines an adjustment amount for the transmission amount of each transmission buffer so as to approach a self-optimization state in terms of transmission amount.

The total optimization flow control unit 1604 controls a transmission amount of each transmission buffer so that a buffer remaining amount of the transmission buffer acquired by the buffer remaining amount acquisition unit 1601 approaches an equal level to a buffer remaining amount of a one-hop neighbor relay device acquired by the buffer remaining amount communication unit 1602, thereby equalizing buffer remaining amounts of relay devices on a transmission path from a transmission terminal to a reception terminal. Which is to say, the total optimization flow control unit 1604 determines an adjustment amount for the transmission amount of each transmission buffer so as to approach a total optimization state in terms of transmission amount.

The balance adjustment unit 1605 adjusts a balance of transmission amount control between self-optimization and total optimization, based on a transmission error rate obtained by the wireless quality management unit 305 or a loss (loss rate, delay time, jitter) obtained by the congestion state management unit 306.

The cooperative party determination unit 1606 determines another relay device with which the relay device is to cooperate with.

The transmission flow information management unit 1607 exchanges, with the other relay device determined by the cooperative party determination unit 1606, information including an amount of data held in a buffer of the other relay device.

The optimization coefficient storage unit 1608 stores an initial value of a self-optimization coefficient and an initial value of a total optimization coefficient, which have been determined in advance from a propagation state specified based on a communication method between relay devices and a transmission distance between relay devices.

Here, to approach a self-optimization state means that packet remaining amounts of transmission buffers which are provided in each relay device in correspondence with different forwarding destinations are equalized.

Also, to approach a total optimization state means that packet remaining amounts of transmission buffers of relay devices on a same transmission path are equalized.

The transmission unit 309 (see FIG. 4) transmits a transmission packet outputted from the transmission buffer management unit 304 to another relay device, based on a transmission amount allocated to each forwarding destination transmission queue by the transmission flow management unit 308.

The transmission buffer management unit 304 adjusts a transmission amount of the relay device so as to approach a state that simultaneously satisfies the two types of optimization, by changing the transmission amount of the relay device based on an adjustment amount which is a sum of the adjustment amount for approaching the self-optimization state provided from the self-optimization flow control unit 1603 and the adjustment amount for approaching the total optimization state provided from the total optimization flow control unit 1604.

Note here that the adjustment amount for the transmission amount of the relay device may not be the sum of the adjustment amount provided from the self-optimization flow control unit 1603 and the adjustment amount provided from the total optimization flow control unit 1604. For instance, the transmission buffer management unit 304 may perform the transmission amount control by using an average of the adjustment amount provided from the self-optimization flow control unit 1603 and the adjustment amount provided from the total optimization flow control unit 1604, or by comparing the two adjustment amounts and using only a larger adjustment amount (ignoring a smaller adjustment amount).

Specific examples of the transmission amount adjustment amounts determined by the self-optimization flow control unit 1603 and the total optimization flow control unit 1604 include adjustment amounts of scheduling processing or packet discard processing relating to IP layer transmission amount control, and adjustment amounts of packet transmission intervals relating to MAC layer transmission amount control, which will be described in detail later.

Also, relay devices may be connected by a wired network, or by a wireless network as in the above case.

The self-optimization coefficient initial value and the total optimization coefficient initial value stored in the optimization coefficient storage unit 1608 are typically determined from a transmission state (for example, a transmission quality characteristic such as a loss rate and a delay obtained by simulation) which is specified based on a communication method between relay devices and a connection structure between relay devices (a connection relation between relay devices, a number of connected relay devices, a physical distance between relay devices).

In the case of taking a dynamic environmental change (a photographing subject, a number of users, a radio propagation) surrounding a system into consideration, the self-optimization coefficient initial value and the total optimization coefficient initial value that satisfy a predetermined condition are determined through trial and error, by performing a computer simulation of an influence of an expected environmental change in a system designing and implementation stage.

(Operation Flow for Transmission Amount Control)

Figure 7:
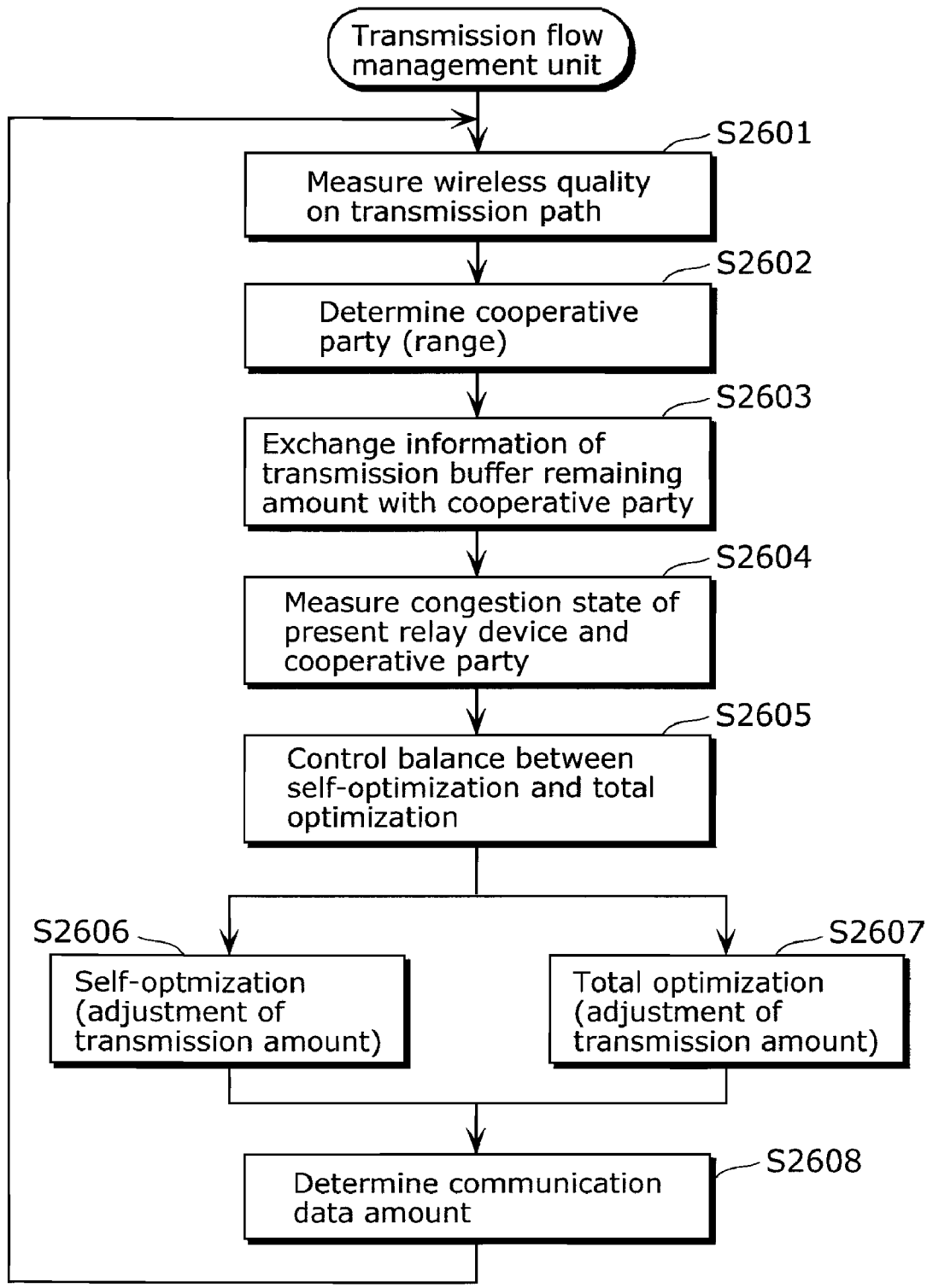
FIG. 7 is a flowchart of a series of operation for transmission flow control.

FIG. 7 is a flowchart of a series of transmission flow control operation by the transmission flow management unit 308 in the relay device.

The following describes an overview of the series of transmission flow control operation by the transmission flow management unit 308 with reference to FIG. 7, and then the detailed contents of each operation.

The balance adjustment unit 1605 and the cooperative party determination unit 1606 acquire a transmission error rate calculated by the wireless quality management unit 305 (Step S2601).

Next, the cooperative party determination unit 1606 determines a cooperative party with which the relay device adjusts a transmission amount in cooperation, from among neighbor relay devices (Step S2602). The determination of the cooperative party may be performed in consideration of the transmission error rate obtained in Step S2601. A detailed operation will be described later.

Next, the buffer remaining amount communication unit 1602 exchanges a buffer remaining amount with the relay device selected as the cooperative party, and stores information about a buffer remaining amount of the cooperative relay device in the transmission flow information management unit 1607 (Step S2603).

Following this, the balance adjustment unit 1605 acquires a loss (loss rate, delay time, jitter) obtained by the congestion state management unit 306 (Step S2604).

The balance adjustment unit 1605 then determines a ratio of control (balance control) between self-optimization and total optimization based on the transmission error rate acquired in Step S2601 or the loss acquired in Step S2604, and modifies the self-optimization coefficient and the total optimization coefficient stored in the optimization coefficient storage unit 1608 (Step S2605).

After this, the self-optimization flow control unit 1603 adjusts a transmission amount by self-optimization control, based on the self-optimization coefficient stored in the optimization coefficient storage unit 1608 (Step S2606).

In parallel with the self-optimization flow control unit 1603, the total optimization flow control unit 1604 adjusts a transmission amount by total optimization control, based on the total optimization coefficient stored in the optimization coefficient storage unit 1608 (Step S2607).

The transmission buffer management unit 304 determines an amount of data to be actually transmitted, based on the transmission amount adjusted by self-optimization control by the self-optimization flow control unit 1603 and the transmission amount adjusted by total optimization control by the total optimization flow control unit 1604 (Step S2608).

The transmission flow management unit 308 adjusts the transmission amount of the relay device, by repeating Steps S2601 to S2608.

The processing contents of each step shown in FIG. 7 are described in detail below.

(Measurement of Wireless Quality on Transmission Path (Step S2601))

The balance adjustment unit 1605 and the cooperative party determination unit 1606 acquire the transmission error rate calculated by the wireless quality management unit 305. The calculation of the transmission error rate in the wireless quality management unit 305 is described below.

Figure 8:
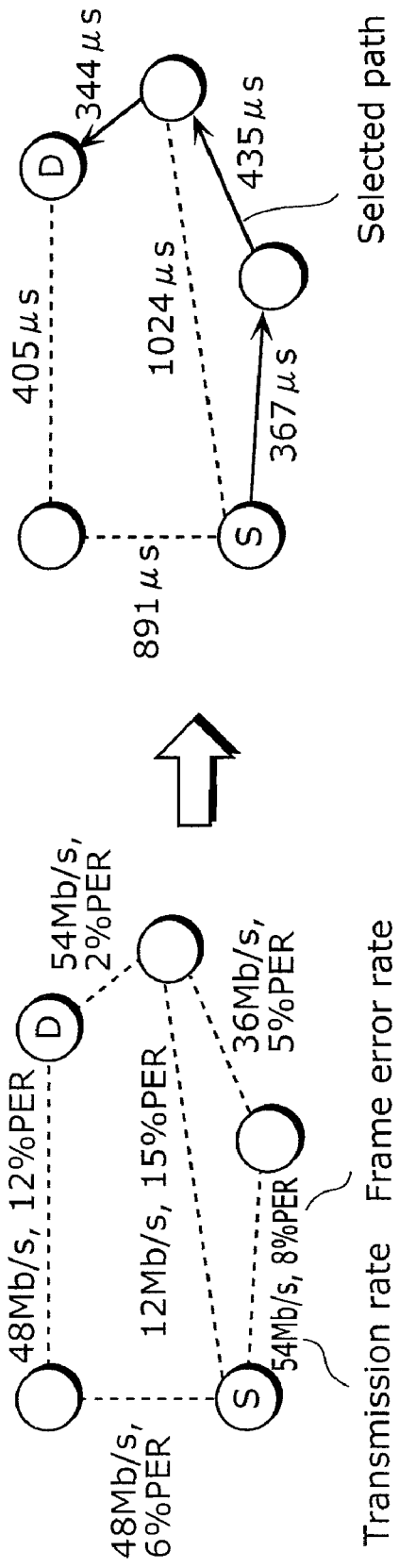
FIG. 8 is an explanatory diagram of a specific method of obtaining a data loss rate from routing information.

The following describes a specific method of obtaining a data loss rate from routing information by the wireless quality management unit 305, with reference to FIG. 8. In detail, the following information is stored in the routing processing unit 307 (see FIG. 4) in the relay device.

In the present invention, the routing information includes not only information (a transmission destination IP address, a transmission source IP address, a sequence number, a lifetime, a hop count, etc.) exchanged in a routing protocol when establishing a path as mentioned earlier, but also information relating to a transmission quality. As one example, IEEE 802.11s which is currently under standardization defines routing information as follows (for example, see Non-patent Reference: Shiro Sakata "Mobile Ad Hoc Networks and Wireless LAN Mesh Networks", IEICE Transactions on Communications, Vol. 389-B, No. 6, pp. 811-823). Basic elements that influence a quality of a wireless LAN mesh network are a wireless quality, interference, and a wireless resource utilization ratio. Airtime has been proposed as a wireless metric that reflects all of these conditions and is easy to implement. In IEEE 802.11s, the airtime metric ($C_a$) is defined as shown in Expression 1.

$$C_a = \left[O_{ca} + O_p + \frac{B_t}{r}\right]\frac{1}{1-e_{pt}} \qquad \text{[Expression 1]}$$

In Expression 1, $O_{ca}$, $O_p$, and $B_t$ denote an overhead necessary for channel access, a protocol overhead, and a frame length of a test packet used for obtaining a frame error rate, as shown in the table of FIG. 8(*a*). Also, r denotes a transmission rate, and $e_{pt}$ denotes the frame error rate. When $C_a$, $O_{ca}$, $O_p$, and $B_t$ are known, it is possible to calculate transmission error rate (frame error rate) $e_{pt}$.

The wireless quality management unit 305 in each relay device calculates the wireless metric (i.e. solves Expression 1) in advance. This being the case, when a transmitting relay device transmits data to a receiving relay device, routing needs to be performed. Upon performing routing, the transmitting relay device broadcasts an inquiry packet for routing, to all terminals. Each relay device which relays the packet adds its own wireless metric value and a wireless metric value written in the inquiry packet together, and writes the sum over the wireless metric value in the inquiry packet.

The receiving relay device receives a plurality of inquiry packets via various transmission paths, and returns a response packet to the transmitting relay device through a transmission path of an inquiry packet having a smallest wireless metric value, to establish routing.

These information are measured by exchanging, between relay devices, a test packet to which an error cyclic code such as Cyclic Redundancy Checking (CRC) used for obtaining a frame error rate (transmission packet error rate) is added, when routing is performed between relay devices. For the test packet transmitted for observation, an error position and an error count are detected in units of bits by using the error cyclic code, and the transmission error rate (frame error rate) is determined from a ratio between the information amount of the test packet and the information amount of the error detection. In detail, the transmission error rate is defined as follows.

(transmission error rate)=(number of error bits in the whole test packet)/(number of bits of the whole test packet)

Likewise, the transmission error rate (frame error rate) can be obtained between a transmission/reception terminal and a relay device, by exchanging the test packet.

FIG. 8 shows examples of specific values of each parameter when IEEE 802.11a or IEEE 802.11b is used. According to the method shown in FIG. 8, there is a possibility that a plurality of routing candidates emerge. However, by using the wireless metric employed in the aforementioned IEEE 802.11s, a high-quality route can be selected.

The balance adjustment unit 1605 and the cooperative party determination unit 1606 acquire the transmission error rate (frame error rate) determined in this manner.

(Cooperative Party (Party to be Communicated with) Selection (Step S2602))

The following describes an operation of the cooperative party determination unit 1606.

Once the routing processing unit 307 (see FIG. 4) has determined a relay device which is a forwarding destination for the present relay device, the cooperative party determination unit 1606 acquires path information from the routing processing unit 307, and selects any of the forwarding destination relay device and a relay device which is a forwarding source for the present relay device, as a cooperative party. For example, a routing protocol such as Ad hoc On-Demand Distance Vector (AODV) or Optimized Link State Routing (OLSR) for ad hoc networks may be used as a routing method.

FIG. 9 is an explanatory diagram of cooperative party (range) selection conditions.

Other than selecting any of the forwarding destination relay device determined by the routing processing unit 307 and the forwarding source relay device as a cooperative party, the cooperative party determination unit 1606 can also select a cooperative party (range) by using the selection conditions shown in FIG. 9.

(Cooperative Party Selection Based on State of Other Relay Device)

Among cooperative party candidates, a neighbor relay device that exceeds the present relay device in at least one of an airtime metric ($C_a$), a transmission error rate, a forward error correction strength, a retransmission count, a retransmission time, and a number of accommodated terminals or that shares a transmission path having a smaller reception electric field intensity, is not selected as a cooperative party for buffer remaining amount equalization control. By promptly isolating a faulty network component in this way, transmission can be performed on a stable network.

With the provision of this function, there is no need to determine a cooperative party of each relay device beforehand, as each relay device can automatically determine such a cooperative party that enables stable transmission in accordance with structures of surrounding terminals and other relay devices or a transmission state between relay devices. Hence the present invention can be applied not only to a network system composed of fixed terminals and a wired network, but also to a network system composed of mobile terminals such as vehicles and portable devices and a wireless network, with which it is difficult to predict a network structure or transmission path state and determine a cooperative party suitable for stable transmission beforehand.

(Cooperative Party Selection Based on Buffer Remaining Amount)

In the case when a buffer remaining amount (load) of the present relay device is larger than a predetermined threshold, that is, when the transmission buffer in the present relay device is crowded or congested, a cooperative party range may be widened from one-hop neighbor relay devices which are the forwarding source and forwarding destination for the present relay device, to relay devices which are 2 or more hops away from the present relay device.

This makes it possible to adjust, in accordance with a degree of congestion occurring in a relay device in a network, the number of relay devices which cooperate with the relay device to suppress the congestion. As a result, the congestion can be suppressed more speedily.

For instance, when the buffer remaining amount of the present relay device is equal to or smaller than 50% of a buffer size, one-hop neighbor relay devices are selected as cooperative parties. When the buffer remaining amount is larger than 50% but equal to or smaller than 80% of the buffer size, one-hop and two-hop neighbor relay devices are selected as cooperative parties. When the buffer remaining amount is larger than 80% of the buffer size, one-hop to three-hop neighbor relay devices are selected as cooperative parties.

To communicate information for cooperation with a relay device at least 2 hops away, for example, a method of unicasting the cooperative information directly to the relay device, or a method of broadcasting the cooperative information to neighbor relay devices by using a Time To Live (TTL) value, which defines the number of relays of a packet, as the number of hops corresponding to the cooperative party range, may be used.

Also, a relay device that has a large buffer remaining amount and has no free space for accommodating the buffer remaining amount of the present relay device (for example, a relay device whose buffer remaining amount exceeds 80%) is excluded from the cooperative party selection, even when that relay device belongs to the above cooperative party range determined according to the buffer remaining amount of the present relay device.

In the case where the number of relay devices that can be selected as cooperative parties is limited, a relay device having a smaller buffer remaining amount is selected with a higher priority as a cooperative party capable of accommodating the buffer remaining amount of the present relay device, from among relay devices which belong to the cooperative party range determined according to the buffer remaining amount of the present relay device.

Each relay device selected as a cooperative party adds, upon receiving the cooperative information from the present relay device whose buffer is in a congested state, the present relay device as its cooperative party and performs total optimization.

Here, in the case when a transmission buffer of the relay device selected as the cooperative party is crowded (for example, a transmission buffer whose buffer remaining amount exceeds 80% of a buffer size is defined as crowded) or congested, that relay device does not need to add the present relay device which transmits the cooperative information, as its cooperative party. Moreover, the relay device selected as the cooperative party may or may not notify its own buffer remaining amount to the present relay device which transmits the cooperative information.

(Cooperative Party Selection Based on Buffer Remaining Amount Variation)

A relay device whose buffer remaining amount variation is larger than a threshold may be excluded from the cooperative party selection. This makes it possible to prevent a situation where, as a result of performing transmission amount control in cooperation with another relay device whose buffer remaining amount variation is larger than the threshold, the transmission amount control of the present relay device fluctuates greatly and consequently a transmission quality (loss rate, delay time, jitter) deteriorates.

For example, the buffer remaining amount variation of another relay device can be measured in the following manner. The present relay device keeps record of the contents and time of cooperative information (buffer remaining amount) transmitted from the other relay device, and calculates a median value or a mode value within a predetermined time period from the recorded history. Having set the median value or the mode value as a threshold, when the buffer remaining amount of the other relay device is larger than the threshold, the present relay device judges the other relay device as having a large buffer remaining amount variation. When the buffer remaining amount of the other relay device is equal to or smaller than the threshold, the present relay device judges the other relay device as having a small buffer remaining amount variation.

(Cooperative Party Selection Based on Physical Buffer Size)

In the case where the cooperative party candidates differ in performance (physical buffer size), a relay device having higher performance (larger physical buffer size) may be selected with a higher priority as a cooperative party. For instance, when each relay device has a different physical buffer size, a relay device having a larger buffer size is capable of storing more packets. Accordingly, by prioritizing a relay device having a larger buffer size as a cooperative party for transmission amount control, the buffer remaining amount of the present relay device can be accommodated more into the cooperative party. Hence buffer crowding can be suppressed speedily.

Here, the judgment as to whether the buffer size is large or small can be made as follows. The present relay device collects buffer sizes of other relay devices, and calculates a median value or a mode value from the collection result. Having set the median value or the mode value as a threshold, when a buffer size of a relay device is larger than the threshold, the present relay device judges the relay device as having a large buffer size. When the buffer size of the relay device is equal to or smaller than the threshold, the present relay device judges the relay device as having a small buffer size.

When a relay device has a significant disparity in physical buffer size from the present relay device, congestion is likely to occur in a relay device having a smaller buffer size. Accordingly, the relay device having such a significant disparity may be excluded from the cooperative party selection. In this way, a failure of optimization control between relay devices having a large disparity can be avoided.

(Cooperative Party Selection Based on Maximum Transmission Rate Difference)

When a relay device has a significant disparity in maximum transmission rate from the present relay device (for example, when an absolute difference in maximum transmission rate between the present relay device and the relay device is larger than a predetermined threshold), congestion is likely to occur in a relay device having a smaller maximum transmission rate. Accordingly, the relay device having such a significant disparity may be excluded from the cooperative party selection. In this way, a failure of optimization control between relay devices having a large disparity can be avoided.

Here, the judgment on the difference in buffer remaining amount or maximum transmission rate can be made as follows. The present relay device periodically collects information about buffer remaining amounts or maximum transmission rates of other relay devices, and calculates a difference from the buffer remaining amount or the maximum transmission rate of the present relay device based on the collection result. A relay device having a largest difference in buffer remaining amount or maximum transmission rate from the present relay device is excluded from the cooperative party selection for the above reason.

(Mutual Notification of Buffer Remaining Amount with Cooperative Party (Step S2603))

The following describes an example of buffer remaining amount which is mutually notified between the present relay device and a relay device selected as a cooperative party, and a frequency of information notification (i.e. a time interval of information notification).

The example of buffer remaining amount is described first.

Information stored in the transmission flow information management unit 1607 is described below, with reference to FIG. 10.

FIG. 10(a) is an explanatory diagram of the contents of data communicated by the buffer remaining amount communication unit 1602. The data communicated by the buffer remaining amount communication unit 1602 includes a transmission source address for identifying a transmission source, a transmission time at which a transmission buffer state is transmitted, and an average buffer remaining amount of transmission buffers as cooperative information. The buffer remaining amount communication unit 1602 periodically notifies the cooperative relay device of this information, by broadcasting or unicasting.

FIG. 10(b) is an explanatory diagram of information about transmission buffer states of cooperative relay devices, which is held in the buffer remaining amount communication unit 1602.

Upon receiving information about a transmission buffer state from a neighbor relay device, the buffer remaining amount communication unit 1602 updates, when data corresponding to a transmission source address included in the received information is present in the list of FIG. 10(b), a transmission time and an average buffer remaining amount of transmission buffers in the neighbor relay device as cooperative information.

When no data corresponding to the transmission source address included in the received information is present, the buffer remaining amount communication unit 1602 newly registers the transmission source address, and stores the transmission time and the average buffer remaining amount.

<When Each Relay Device Differs in Performance>

FIG. 11 is an explanatory diagram of the contents of data communicated by the buffer remaining amount communication unit 1602, to notify another relay device of information relating to the performance of the present relay device.

As shown in FIG. 11(a), the present relay device notifies the other relay device of performance information showing the performance of the present relay device in addition to the information shown in FIG. 10(a), at the time of cooperative party determination/change or at a fixed time interval.

The performance information notified to the neighbor relay device may include a physical buffer size and a maximum transmission rate of the present relay device, a maximum packet storage time calculated from the physical buffer size and the maximum transmission rate, and the like.

FIG. 11(b) is an explanatory diagram of information about transmission buffer states of neighbor relay devices, which is held in the buffer remaining amount communication unit 1602 in the case where performance differs between relay devices.

The buffer remaining amount communication unit 1602 stores, in addition to the information shown in FIG. 10(b), information showing performance of a cooperative relay device. Though only a physical buffer size is stored as performance information in the example of FIG. 11(b), a maximum transmission rate may be stored in addition to the physical buffer size as the performance information of each relay device.

(Definition of Buffer Remaining Amount)

The above description uses an example where an amount of packet (data) remaining in a buffer is defined as a "buffer remaining amount" which is exchanged between relay devices. Alternatively, information obtained based on an amount of packet (data) remaining in a buffer may be defined as a "buffer remaining amount" and exchanged between relay devices.

Figure 12:
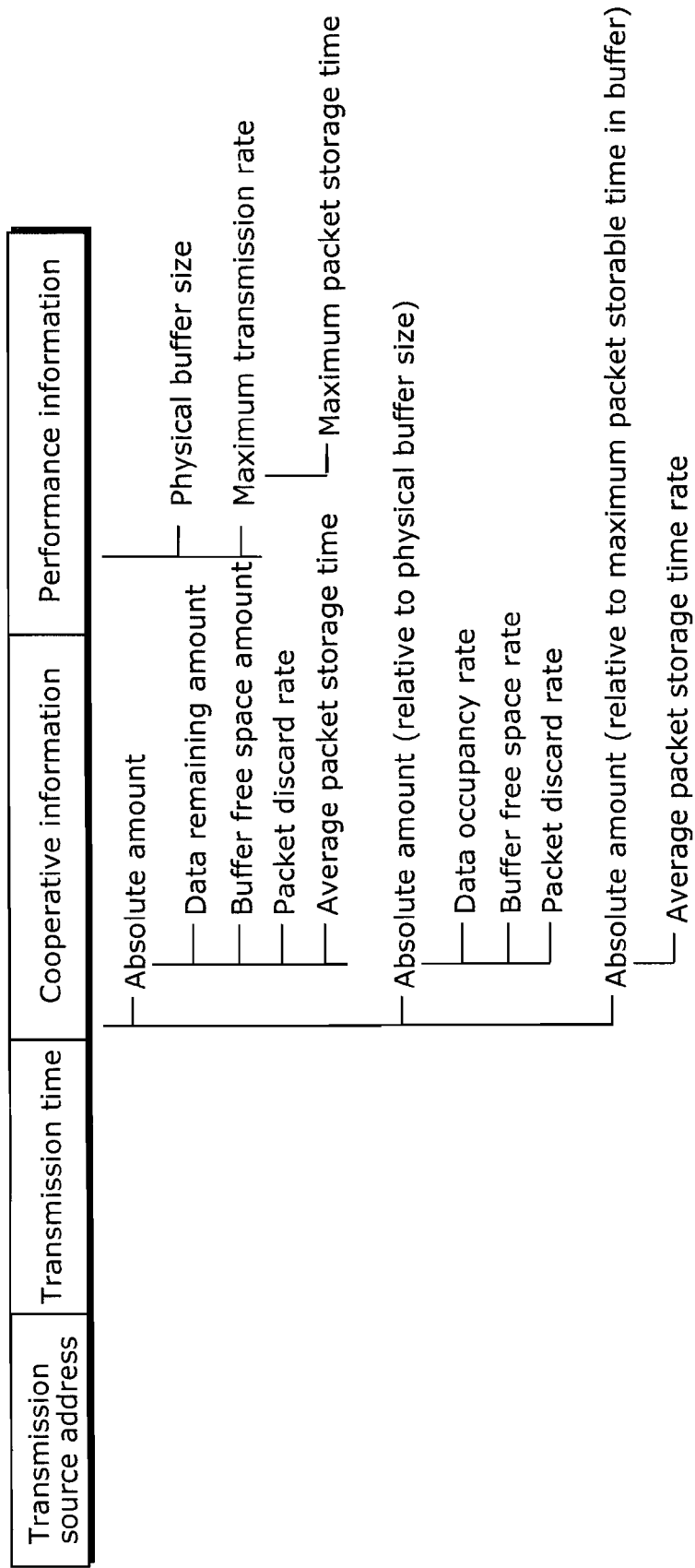
FIG. 12 is an explanatory diagram of cooperative information notified between relay devices.

FIG. 12 shows examples of other cooperative information and performance information that are mutually notified between relay devices.

For instance, a buffer free space amount (or a buffer free space rate relative to an overall physical buffer size) may be used instead of an amount of packet (data) remaining in a buffer, to produce the same effect as above. In the case of using a buffer free space amount, even when each relay device differs in physical buffer size, transmission amount control can be performed in consideration of an amount of data that can be further stored in a buffer, according to the same method.

Also, an amount of packet remaining in a buffer (or a buffer occupancy rate relative to an overall physical buffer size) may be estimated based on a packet discard rate exchanged between relay devices.

Typically, each relay device may implement an algorithm for adaptively discarding packets according to a buffer occupancy rate. As one example, transmission packets are randomly discarded with a probability of ½ when ⅓ of the reception buffer capacity is reached, and with a probability of ⅔ when ½ of the reception buffer capacity is reached. This being so, an amount of packet remaining in a buffer can be estimated based on a packet discard rate exchanged between relay devices.

However, when each relay device differs in performance, especially when each relay device differs significantly in physical buffer size, the use of a relative value of a buffer remaining amount or a packet discard rate may cause a failure of optimization control between neighbor relay devices, since a substantive buffer acceptable amount differs between relay devices.

In view of this, the present relay device exchanges a physical buffer size with its neighbor relay device beforehand, and calculates a difference in physical buffer size between the present relay device and the neighbor relay device based on the collection result. When the calculated difference is larger than a median value or a mode value of buffer size differences between the present relay device and other relay devices, the present relay device judges that there is a large difference in physical buffer size. Also, by modifying information of a buffer remaining amount (or a buffer free space amount) or a packet discard rate received from the neighbor relay device based on the physical buffer size exchanged beforehand, the problem associated with the case when each relay device differs in performance can be solved.

(Use of Time Average Value of Buffer Remaining Amount)

Also, a time average of an amount of data remaining in a buffer may be defined as a "buffer remaining amount" and exchanged between relay devices. By using an average data remaining amount in a predetermined time, even when the amount of data remaining in the buffer varies greatly or frequently, an influence of such a data amount variation on transmission amount adjustment can be reduced.

Also, information about an average packet storage time in a buffer and a time period during which a delay time of each packet is collected for calculating the average packet storage time may be exchanged between relay devices. Since such information is an absolute value, it can be directly used for buffer remaining amount calculation, even when each relay device differs in performance and especially in physical buffer size.

When each relay device differs in maximum transmission rate, there is no proportional relation between the average packet storage time and the buffer remaining amount. In such a case, a maximum packet storage time in a buffer is calculated from a physical buffer size and a maximum transmission rate, so that a ratio of the average packet storage time to the maximum packet storage time, which is a relative value, can be directly used for buffer remaining amount calculation.

(Use of Remaining Amount Evaluation Function)

Also, a value calculated from an amount of data in a buffer by using a predetermined evaluation function, such as a linear function of computing a constant multiple of the data amount or a quadratic function of computing a square of the data amount, may be defined as a "buffer remaining amount" and exchanged between relay devices.

By designing such an evaluation function, it is possible to perform such control that changes a transmission amount adjustment range according to an amount of data remaining in a buffer.

<When Each Relay Device Differs in Performance (Buffer Size)>

In the case where each relay device differs in performance, a buffer remaining amount used for total optimization control between relay devices may be converted from an absolute amount to a relative amount or from a relative amount to an absolute amount based on performance information of each relay device, depending on the intended use.

Performance information is information relating to physical performance of a relay device. In detail, the performance information may be a physical size of a transmission buffer, or a maximum transmission amount in data transmission.

An absolute amount of a buffer remaining amount is an amount expressed using a same reference value (byte, μsec) as other relay devices, such as an amount of packet in a buffer, a buffer free space amount, and an average packet storage time.

A relative amount of a buffer remaining amount is an amount expressed relative to performance of a relay device, such as a data occupancy rate in a buffer, a buffer free space rate, and a ratio of a time period during which a packet is actually stored in a buffer to a time period during which the packet can be stored in the buffer.

A relation between an absolute amount and a relative amount of a buffer remaining amount is defined as shown in Expression 2.

$$q_{absolute} = q_{relative} * \text{Buffer\_size} \qquad \text{[Expression 2]}$$

In Expression 2, $q_{absolute}$ denotes an absolute amount of a buffer remaining amount, $q_{relative}$ denotes a relative amount of the buffer remaining amount, and Buffer_size denotes a physical buffer size. When the physical buffer size is known, the buffer remaining amount expressed by the absolute amount (or the relative amount) can be converted to the relative amount (or the absolute amount), by using Expression 2.

Examples of using the absolute amount and the relative amount depending on the intended use are given below. When real-time communication is required as in the case of video transmission or audio transmission using User Datagram Protocol (UDP), a transmission amount of each relay device is adjusted so that a physical buffer remaining amount in each relay device is equalized, by using a buffer remaining amount expressed by an absolute amount.

This makes a packet storage time in each relay device equal, with it being possible to reduce a transmission delay in real-time communication.

When communication with a minimum data loss is required rather than real-time communication as in the case of file transfer using TCP, a transmission amount of each relay device is adjusted so that a data occupancy rate in each relay device is equalized, by using a buffer remaining amount expressed by a relative amount. This allows for such a relay operation that holds data in a buffer as much as possible depending on a physical buffer size of each relay device. Hence communication can be performed with a minimum loss caused by packet discard on a transmission path.

Note that information indicating whether the absolute amount expression or the relative amount expression is used is included in a transmission packet and mutually notified between relay devices at the start of communication.

As cooperative information notified to a cooperative party, in addition to a transmission buffer state used for transmission amount adjustment, information used for cooperative party selection and ratio control between self-optimization and total optimization, such as an airtime metric, a transmission error, a forward error correction strength, a retransmission count, a retransmission time, a number of accommodated terminals, and a reception electric field intensity, is notified to the cooperative party at a regular time interval or when these values change.

(Adjustment of Cooperative Information Notification Frequency)

A frequency (time interval) of information notification is described below.

FIG. 13 is an explanatory diagram of conditions for adjusting an information notification frequency.

The frequency of exchanging cooperative information (for example, a buffer remaining amount) is controlled according to a congestion state and a load variation of the present relay device, a distance to its cooperative party, a load state and a load variation of the cooperative party, or a difference in physical buffer size or maximum transmission rate from the cooperative party.

(Frequency Adjustment Based on Buffer Remaining Amount)

When the load state of the present relay device is high, the cooperative information is exchanged with a high frequency, to reduce the load as early as possible. When the load state of the present relay device is low, on the other hand, the cooperative information is exchanged with a low frequency, to reduce overhead in communication and processing performed in the present relay device.

In the case of adjusting the frequency in consideration of the load state of the cooperative party too, when the load state of the cooperative party is high, the cooperative information exchange frequency is decreased because an effect of reducing the load of the present relay device cannot be expected much. When the load state of the cooperative party is low, the cooperative information exchange frequency is increased because a significant effect of reducing the load of the present relay device can be expected.

Here, the load state may be judged as high when the buffer remaining amount is larger than a predetermined threshold, and low when the buffer remaining amount is equal to or smaller than the predetermined threshold. The threshold may be set individually for each of the present relay device and the cooperative party.

(Frequency Adjustment Based on Buffer Remaining Amount Variation)

When the load variation of the present relay device is large, the cooperative information is exchanged with a high frequency, to keep up with a rapid load variation. When the load variation of the present relay device is small, the cooperative information is exchanged with a low frequency, since high responsiveness incurs overhead in communication and processing performed in the present relay device.

In the case of adjusting the frequency in consideration of the load variation of the cooperative party too, when the load variation of the cooperative party is large, the cooperative information exchange frequency is decreased to prevent the control of the present relay device from becoming unstable. When the load variation of the cooperative party is small, the cooperative information exchange frequency is increased since stable control of the present relay device can be expected.

One example of the load variation is a buffer remaining amount variation. The buffer remaining amount variation can be measured as follows. The present relay device keeps record of the contents and time of buffer remaining amount, and calculates a median value or a mode value within a predetermined time period from the recorded history. Having set the median value or the mode value as a threshold, when a buffer remaining amount of a relay device is larger than the threshold, the present relay device judges the relay device as having a large buffer remaining amount variation. When the buffer remaining amount is equal to or smaller than the threshold, the present relay device judges the relay device as having a small buffer remaining amount variation.

(Frequency Adjustment Based on Communication Distance)

When the distance to the cooperative party is longer (when the number of hops to the cooperative party is larger), the cooperative information exchange frequency is increased. When the distance to the cooperative party is shorter, the cooperative information exchange frequency is decreased. In this way, even when more relay devices relay the cooperative information for total optimization (i.e. the distance to the cooperative party increases), an influence of a connection relation or status change between relay devices, such as an influence of a processing load delay or a packet loss during relay, can be prevented.

<Information Exchange Frequency Adjustment According to Performance Difference Between Relay Devices>

(Frequency Adjustment Based on Physical Buffer Size Difference)

The cooperative information exchange frequency may also be changed according to a difference in performance (physical buffer size) between the present relay device and the cooperative party.

For example, in the case where the amount of data transmitted to a relay device varies, a variation in data occupancy rate of a buffer in the relay device is larger when the physical buffer size is small than when the physical buffer size is large.

This being so, when the physical buffer size of the present relay device is smaller than the physical buffer size of the cooperative party, a variation in data occupancy rate in the buffer of the present relay device is large relative to that of the cooperative party. Accordingly, the frequency of communicating the cooperative information to the cooperative party is increased. This enables the cooperative party to perform transmission amount control with high responsiveness to the variation in buffer remaining amount of the present relay device having a smaller physical buffer size.

When the physical buffer size of the present relay device is larger than the physical buffer size of the cooperative party, on the other hand, the variation in data occupancy rate in the buffer of the present relay device is small relative to that of the cooperative party. Accordingly, the frequency of communicating the cooperative information to the cooperative party is decreased. This has an effect of reducing the amount of communication required for the information notification to the cooperative party.

(Frequency Adjustment Based on Maximum Transmission Rate Difference (Party on Transmission Path))

Consider the case where each relay device on a transmission path of an arbitrary data flow differs in maximum transmission rate, due to a difference in transmission power of each relay device, a difference in distance between relay devices, and the like. When the buffer of the present relay device has a smaller maximum transmission rate than the buffer of the cooperative party on the transmission path of the data flow, the frequency of communicating the cooperative information to the cooperative party is increased because the present relay device is likely to have a larger buffer remaining amount than the cooperative party. This enables the cooperative party to perform transmission amount control with high responsiveness to the variation in buffer remaining amount of the present relay device having a smaller maximum transmission rate.

When the buffer of the present relay device has a higher maximum transmission rate than the cooperative party on the transmission path of the data flow, on the other hand, the frequency of communicating the cooperative information to the cooperative party is decreased because the present relay device is unlikely to have a larger buffer remaining amount than the cooperative party. This has an effect of reducing the amount of communication required for the information notification to the cooperative party.

(Frequency Adjustment Based on Maximum Transmission Rate Difference (Bidirectional Communication with Cooperative Party))

Consider the case where bidirectional communication is performed between the present relay device and the cooperative party. When the present relay device and the cooperative party significantly differ in maximum transmission rate due to a difference in transmission power and the like, there is a possibility that optimization control may fail, since an influence of transmission amount control for buffer remaining amount equalization greatly differs between the present relay device and the cooperative party. In view of this, to prioritize total optimization control with a cooperative party whose maximum transmission rate is not so significantly different from that of the present relay device, the frequency of communicating the cooperative information to the cooperative relay device having a significantly different maximum transmission rate is decreased. The judgment as to whether or not the maximum transmission rate difference is significantly large can be made based on whether or not an absolute value of the maximum transmission rate difference is larger than a predetermined threshold.

The above describes the case where the cooperative information exchange frequency is determined based on individual information such as the congestion state and the load variation of the present relay device, the distance to the cooperative party, the load state and the load variation of the cooperative party, or the difference in physical buffer size or maximum transmission rate from the cooperative party. However, these information may be selected adaptively and combined to determine the cooperative information exchange frequency.

(Self-Optimization Control (Step S2606) and Total Optimization Control (Step S2607))

The following describes self-optimization control and total optimization control performed for transmission amount control in each relay device, and formulation of self-optimization control and total optimization control. The congestion state measurement (Step S2604) and the balance control between self-optimization control and total optimization control (Step S2605) will be described after the description of self-optimization control and total optimization control.

Figure 14:
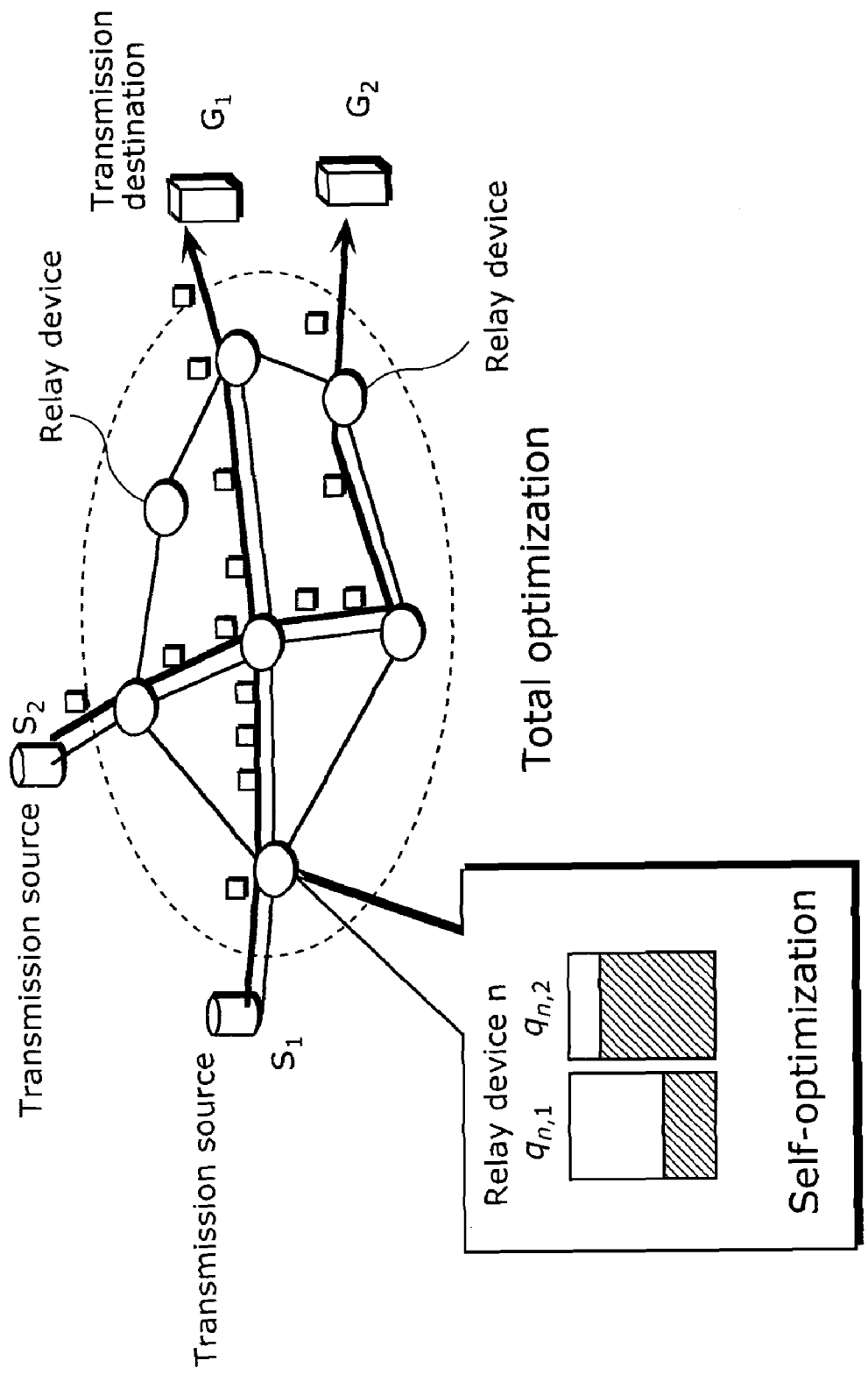
FIG. 14 is an explanatory diagram of formulation of each operation (self-optimization control and total optimization control).
Figure 15:
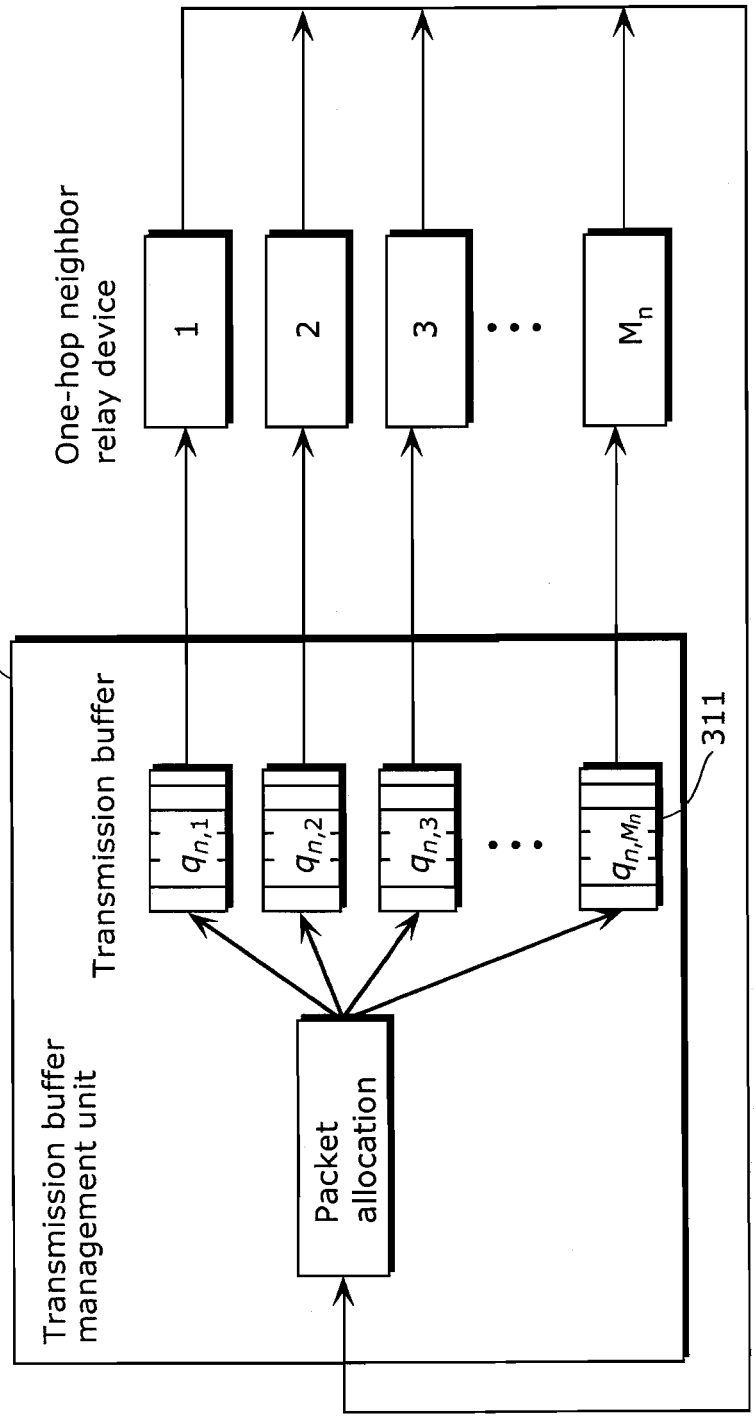
FIG. 15 is an explanatory diagram of formulation of each operation (self-optimization control and total optimization control).

FIGS. 14 and 15 are explanatory diagrams of the formulation of self-optimization control and total optimization control for transmission flow control in each relay device.

FIG. 14 shows a structure of an ad hoc network formed by a plurality of relay devices.

In FIG. 14, S1 and S2 are data transmission sources, and G1 and G2 are data transmission destinations. Each relay device has a plurality of transmission buffers corresponding to different forwarding destinations of packets to be relayed, as shown in the balloon drawing in FIG. 14. The balloon drawing in FIG. 14 shows that a plurality of transmission buffers $q_{n,1}$ and $q_{n,2}$ are provided in relay device A, where an amount of data remaining in each transmission buffer is indicated by hatching.

FIG. 15 is an explanatory diagram of a relation between a plurality of transmission buffers in relay device n and one-hop neighbor relay devices to which relay device n forwards data.

In FIG. 15, $M_n$ relay devices are the one-hop neighbor relay devices to which relay device n forwards data. A dedicated transmission buffer is provided in relay device n for each of the $M_n$ relay devices.

When a packet is transmitted to relay device n from a terminal or another relay device, relay device n specifies, by means of the transmission buffer management unit 304, a relay device that is a forwarding destination by referring to the contents of a MAC header or the like in the packet, and allocates the packet to a transmission buffer corresponding to the specified relay device.

The allocation of packets into different transmission buffers and the adjustment of the transmission amount of each transmission buffer are performed by the transmission buffer management unit 304. As a result, relay device n can adjust the transmission flow amount to each packet forwarding destination individually.

Let n be a number identifying a relay device, i be a number identifying a transmission buffer in relay device n, and $x_{n,i}$ be a transmission amount of the i-th transmission buffer in relay device n. Each relay device adjusts transmission amount $x_{n,i}$ of each transmission buffer by the self-optimization flow control unit 1603 and the total optimization flow control unit 1604, to thereby suppress a delay time, a loss rate, and jitter of each data flow.

(Formulation of Self-Optimization Control)

As self-optimization control in each relay device, the self-optimization flow control unit 1603 in relay device n adjusts transmission amount $x_{n,i}$ to each individual forwarding destination, based on a buffer remaining amount (denoted by $q_{n,i}$) of each transmission buffer in relay device n. In detail, the self-optimization control by the self-optimization flow control unit 1603 can be formulated in the following manner.

Expression 3 is an evaluation function for evaluating a transmission buffer state of relay device n.

$$F(\vec{q}_n) = \left(q_{n,i} - \frac{1}{M_n}\sum_{j}^{M_n} q_{n,j}\right)^2 \qquad \text{[Expression 3]}$$

$$\vec{q}_n \qquad \text{[Expression 4]}$$

Expression 4 in Expression 3 is a set of buffer remaining amounts of transmission buffers in relay device n. Expression 6 provides a definition of Expression 5.

$$\vec{q}_n \qquad \text{[Expression 5]}$$

$$\vec{q}_n = \{q_{n,1}, q_{n,2}, \ldots, q_{n,M_n}\} \qquad \text{[Expression 6]}$$

In Expressions 3 and 6, n is a number for identifying a relay device, and i and j are each a number for identifying a transmission buffer in a relay device. $M_n$ is the number of one-hop neighbor relay devices to which relay device n forwards data.

Function F in Expression 3 is a minimum value when the buffer remaining amount of the i-th transmission buffer in relay device n is equal to an average buffer remaining amount of the $M_n$ transmission buffers in relay device n corresponding to the one-hop neighbor relay devices, and monotonically increases with a difference between the buffer remaining amount of the i-th transmission buffer in relay device n and the average buffer remaining amount of the $M_n$ transmission buffers in relay device n corresponding to the one-hop neighbor relay devices.

Expression 7 is a control expression of data transmission amount $x_{n,i}$ which is adjusted by the self-optimization flow control unit 1603.

$$\frac{dx_{n,i}}{dt} = -\alpha \frac{\partial F(\vec{q}_n)}{\partial x_{n,i}} = -2\alpha \left(q_{n,i} - \frac{1}{M} \sum_{j}^{M_n} q_{n,j}\right) \frac{\partial q_{n,i}}{\partial x_{n,i}} \quad \text{[Expression 7]}$$

In Expression 7, n is a number for identifying a relay device, i and j are each a number for identifying a transmission buffer in a relay device, $M_n$ is the number of one-hop neighbor relay devices to which relay device n forwards data, and $\alpha$ is a coefficient.

Expression 7 is a control expression whose right-hand side includes a derivative obtained by partially differentiating the function of Expression 3 with respect to data transmission amount $x_{n,i}$. This expression is used by the self-optimization flow control unit 1603 to calculate data transmission amount $x_{n,i}$ so that function F approaches the minimum value.

On the right-hand side of Expression 7, $\partial q_{n,i}/\partial x_{n,i}$ is a term that represents a relation of a variation of the buffer remaining amount to an adjustment amount of transmission amount $x_{n,i}$. In general, the buffer remaining amount decreases when transmission amount $x_{n,i}$ increases, so that $\partial q_{n,i}/\partial x_{n,i}$ is negative as shown in Expression 8.

$$\frac{\partial q_{n,i}}{\partial x_{n,i}} < 0 \quad \text{[Expression 8]}$$

According to Expressions 7 and 8, the transmission amount of the i-th transmission buffer in relay device n is controlled as follows. When buffer remaining amount $q_{n,i}$ is larger than the average buffer remaining amount of the transmission buffers in relay device n, the transmission amount is increased. When buffer remaining amount $q_{n,i}$ is smaller than the average buffer remaining amount of the transmission buffers in relay device n, the transmission amount is decreased.

This transmission amount control based on Expression 7 is performed by the self-optimization flow control unit 1603. By adjusting data transmission amount $x_{n,i}$ so that buffer remaining amount $q_{n,i}$ of each transmission buffer in relay device n is equalized, a more uniform quality (delay, loss rate) of a data flow transmitted to each forwarding destination can be achieved.

(Formulation of Total Optimization Control)

As total optimization control between relay devices, the total optimization flow control unit 1604 adjusts a packet transmission amount so that buffer remaining amount $q_{n,i}$ is equalized between relay devices on a path from a transmission source to a transmission destination. The total optimization control by the total optimization flow control unit 1604 can be formulated as shown in Expression 9.

Expression 9 is an evaluation function for evaluating a difference in buffer remaining amount between transmission buffers of relay device n and its cooperative relay device.

$$G(q_{n,i}, \vec{Q}_{next(n)}) = \left(q_{n,i} - \frac{1}{N_n} \sum_{k \in next(n)} Q_k\right)^2 \quad \text{[Expression 9]}$$

In Expression 9, n is a number for identifying a relay device.

Also, i and j are each a number for identifying a transmission buffer in a relay device.

Also, next(n) is a set of numbers each for identifying a cooperative relay device of relay device n.

Also, $N_n$ is the number of cooperative relay devices of relay device n

Expression 10 represents a set of statistics of buffer remaining amounts of transmission buffers in the cooperative relay devices of relay device n.

$$\vec{Q}_{next(n)} = \{Q_k | k \in next(n)\} \quad \text{[Expression 10]}$$

Expression 11 is an expression for calculating statistics of buffer remaining amounts in Expression 10. An average buffer remaining amount of transmission buffers is given in Expression 11.

$$Q_k = \frac{1}{M_n} \sum_{i}^{M_n} q_{k,i} \quad \text{[Expression 11]}$$

In Expressions 9 and 11, n is a number for identifying a relay device

Also, i and k are each a number for identifying a transmission buffer in a relay device.

In Expression 11, $Q_n$ is an average buffer remaining amount of transmission buffers in relay device n.

Expression 12 in Expression 10 denotes the following.

$$\vec{Q}_{next(n)} \quad \text{[Expression 12]}$$

Expression 12 is a set of average buffer remaining amounts $Q_k$ of the cooperative relay devices of relay device n. $M_n$ is the number of one-hop neighbor relay devices to which relay device n forwards data. Function G in Expression 9 is a minimum value (0) when the buffer remaining amount of the i-th transmission buffer in relay device n is equal to an average value of average buffer remaining amounts $Q_k$ of the $N_n$ cooperative relay devices, and monotonically increases with a difference between the buffer remaining amount of the i-th transmission buffer in relay device n and the average value of average buffer remaining amounts $Q_k$ of the $N_n$ cooperative relay devices.

$$\frac{dx_{n,i}}{dt} = -\beta \frac{\partial G(q_{n,i}, \vec{Q}_{next(n)})}{\partial x_{n,i}} \quad \text{[Expression 13]}$$

$$= -2\beta \left(q_{n,i} - \frac{1}{N_n} \sum_{k \in next(n)} Q_k\right) \frac{\partial q_{n,i}}{\partial x_{n,i}}$$

In Expression 13, n is a number for identifying a relay device.

Also, i and k are each a number for identifying a transmission buffer in a relay device.

Also, next(n) is a set of numbers each for identifying a cooperative relay device of relay device n.

Also, $N_n$ is the number of cooperative relay devices of relay device n.

Also, $\beta$ is a coefficient.

Expression 13 is a control expression whose right-hand side includes a derivative obtained by partially differentiating the function of Expression 9 with respect to data transmission amount $x_{n,i}$. This expression is used by the total optimization flow control unit 1604 to calculate data transmission amount $x_{n,i}$ so that function G approaches the minimum value.

On the right-hand side of Expression 13, $\partial q_{n,i}/\partial x_{n,i}$ is the same as Expression 8 which has been explained earlier with regard to the self-optimization control.

According to Expression 13, the transmission amount of the i-th transmission buffer in relay device n is controlled as follows. When buffer remaining amount $q_{n,i}$ is larger than the average value of the average buffer remaining amounts of the cooperative relay devices, the transmission amount is increased. When buffer remaining amount $q_{n,i}$ is smaller than the average value of the average buffer remaining amounts of the cooperative relay devices, the transmission amount is decreased.

This transmission amount control based on Expression 13 is performed by the total optimization flow control unit 1604. By adjusting the transmission amount so that buffer remaining amount $q_{n,i}$ approaches an equal level to average buffer remaining amount $Q_k$ of the cooperative relay devices, an occurrence of buffer congestion in a relay device on a path from a transmission source to a transmission destination can be prevented.

Note that the transmission amount control based on Expression 13 can also be used for equalizing buffer remaining amounts between relay devices each of which has only one transmission buffer.

A typical relay device has a structure of including only a single FIFO queue as a transmission buffer.

In the case where each relay device has a plurality of buffers, an average buffer remaining amount of the plurality of buffers is notified to a cooperative relay device. In the case where each relay device has only a single FIFO queue, on the other hand, a remaining amount of the FIFO queue is notified to a cooperative relay device.

Even when the number of transmission buffers is one, the cooperative party (range) and the communication frequency can be determined by using the aforementioned cooperative party (range) determination method and communication frequency adjustment method.

(Operation Flow of Self-Optimization Control)

Figure 16:
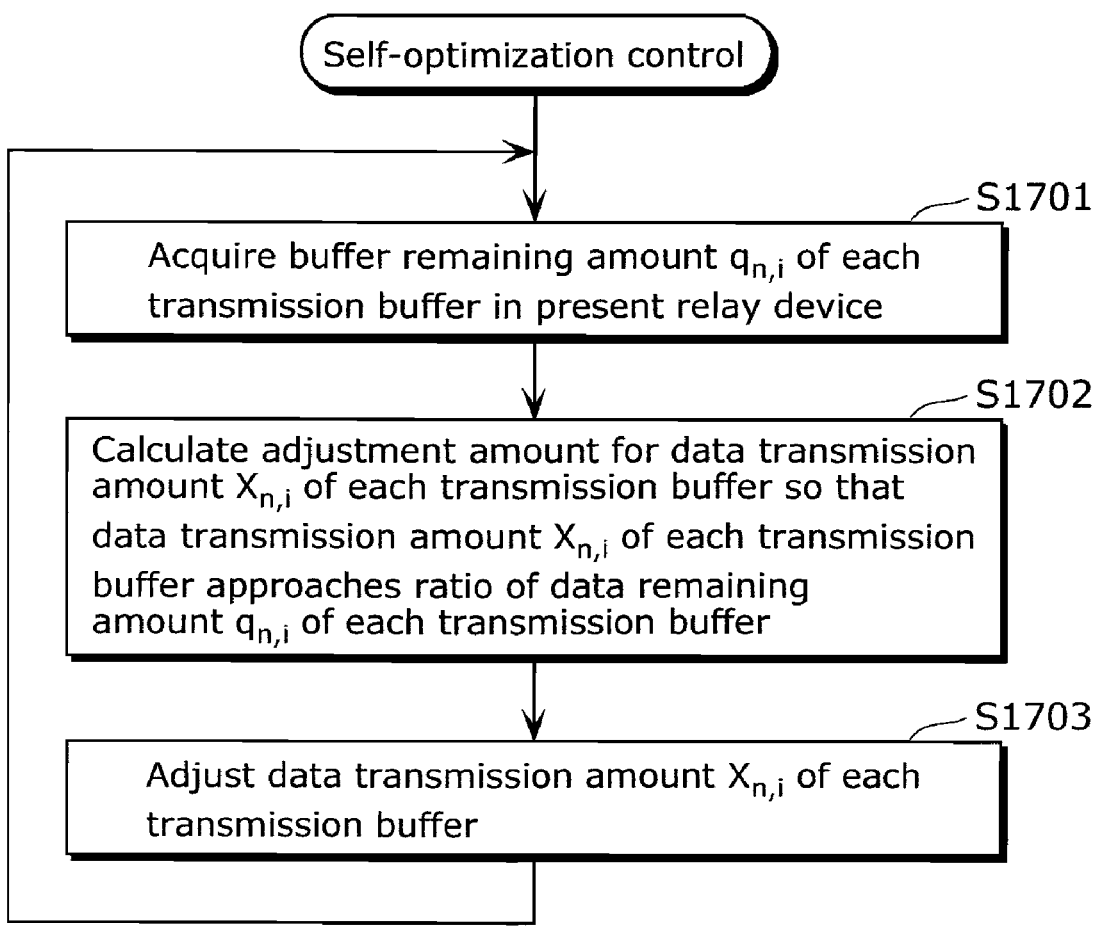
FIG. 16 is a flowchart of a procedure of self-optimization control in the relay device.

FIG. 16 is a flowchart of a procedure of self-optimization control in each relay device.

The self-optimization flow control unit 1603 acquires a buffer remaining amount of each transmission buffer from the buffer remaining amount acquisition unit 1601 (Step S1701).

The self-optimization flow control unit 1603 then calculates an adjustment amount for a transmission amount of each transmission buffer, based on Expression 7 (Step S1702).

Following this, the self-optimization flow control unit 1603 changes data transmission amount $x_{n,i}$ of each transmission buffer (Step S1703).

By repeating Steps S1701 to S1703, the self-optimization flow control unit 1603 autonomously adjusts the transmission amount of each transmission buffer in accordance with a difference in crowding state between transmission buffers.

(Operation Flow of Total Optimization Control)

Figure 17:
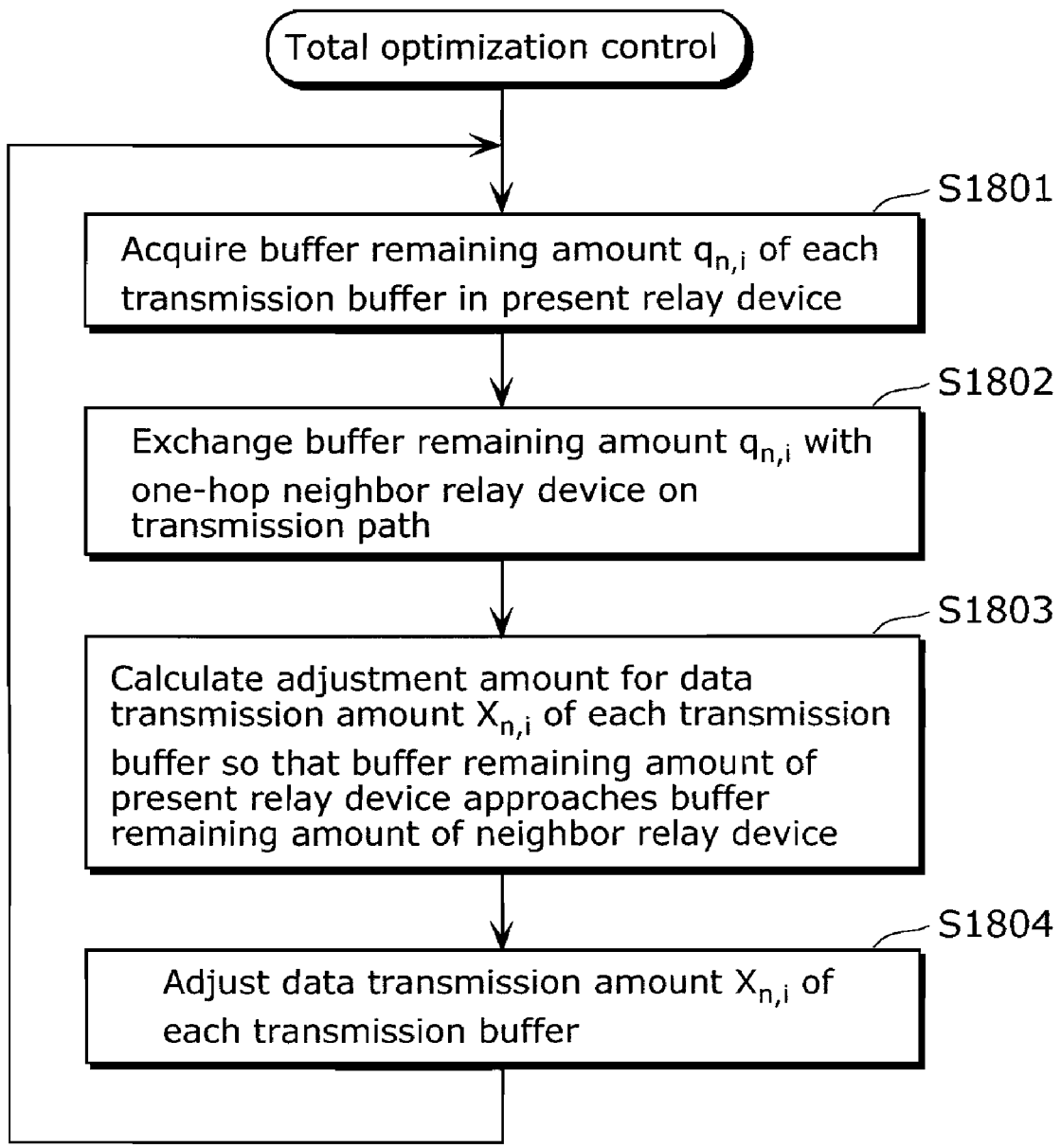
FIG. 17 is a flowchart of a procedure of total optimization control in the relay device.

FIG. 17 is a flowchart of a procedure of total optimization control in each relay device.

The total optimization flow control unit 1604 acquires a buffer remaining amount of each transmission buffer from the buffer remaining amount acquisition unit 1601 (Step S1801).

The total optimization flow control unit 1604 then acquires information about a buffer remaining amount of transmission buffers in a one-hop neighbor relay device on a transmission path, via the buffer remaining amount communication unit 1602 (Step S1802).

It is assumed here that the total optimization flow control unit 1604 acquires an average buffer remaining amount, as specific information about the buffer remaining amount of the transmission buffers in the one-hop neighbor relay device.

Furthermore, it is assumed here that the communication between the buffer remaining amount communication unit 1602 and the neighbor relay device is performed at a fixed time interval independently of the operation of the total optimization flow control unit 1604, so that the total optimization flow control unit 1604 acquires most recent information about the buffer remaining amount of the neighbor relay device held in the buffer remaining amount communication unit 1602.

Next, the total optimization flow control unit 1604 calculates an adjustment amount for a transmission amount of each transmission buffer, based on Expression 13 (Step S1803).

The total optimization flow control unit 1604 notifies the transmission buffer management unit 304 of the adjustment amount for data transmission amount $x_{n,i}$ of each transmission buffer, and changes data transmission amount $x_{n,i}$ (Step S1804).

By repeating Steps S1801 to S1804, the total optimization flow control unit 1604 cooperatively adjusts the transmission amount of each transmission buffer so that the buffer remaining amount approaches an equal level between relay devices on a transmission path.

(Formulation of Transmission Amount Optimization Control)

Expression 14 is a control expression that combines the control expression of Expression 7 by the self-optimization flow control unit 1603 and the control expression of Expression 13 by the total optimization flow control unit 1604.

$$\frac{dx_{n,i}}{dt} = -\alpha \frac{\partial F(\vec{q}_{n,i})}{\partial x_{n,i}} - \beta \frac{\partial G(q_{n,i}, \vec{Q}_{next(n)})}{\partial x_{n,i}} \quad \text{[Expression 14]}$$

In Expression 14, the first term of the right-hand side defines a transmission amount adjusted by self-optimization control by the self-optimization flow control unit 1603, whereas the second term of the right-hand side defines a transmission amount adjusted by total optimization control by the total optimization flow control unit 1604

In Expression 14, coefficient $\alpha$ of the first term and coefficient $\beta$ of the second term indicate a ratio of self-optimization control and total optimization control in transmission amount control. By changing these coefficients, balance control between self-optimization and total optimization can be adjusted.

In the case where each relay device has only one transmission buffer, Expression 14 can be used as a transmission amount control expression only for total optimization control of equalizing the buffer remaining amount between relay devices, where $\alpha$ is 0.

(Balance Control of Self-Optimization Control and Total Optimization Control (Step S2605))

As shown in FIG. 6, each relay device includes the transmission flow control unit made up of the self-optimization flow control unit 1603 and the total optimization flow control unit 1604, and the balance adjustment unit 1605.

The transmission flow control unit starts operation based on the initial values of the self-optimization coefficient and the total optimization coefficient stored in the optimization coefficient storage unit 1608 beforehand, and determines an amount of data transmitted from a transmission terminal to a reception terminal during the operation of the relay device. That is, the self-optimization flow control unit 1603 is controlled based on the self-optimization coefficient, and the total optimization flow control unit 1604 is controlled based on the total optimization coefficient.

The balance adjustment unit 1605 increases the self-optimization coefficient so as to increase the ratio of the self-optimization control when the buffer remaining amount of the present relay device is larger than the buffer remaining amount of the other relay device, and increases the total optimization coefficient so as to increase the ratio of the total optimization control when the buffer remaining amount of the present relay device is smaller than the buffer remaining amount of the other relay device.

When the balance adjustment unit 1605 performs such a change that increases the self-optimization coefficient or the total optimization coefficient, the transmission flow control unit determines the amount of data to be transmitted to the reception terminal, based on the changed self-optimization coefficient and total optimization coefficient.

Figure 18:
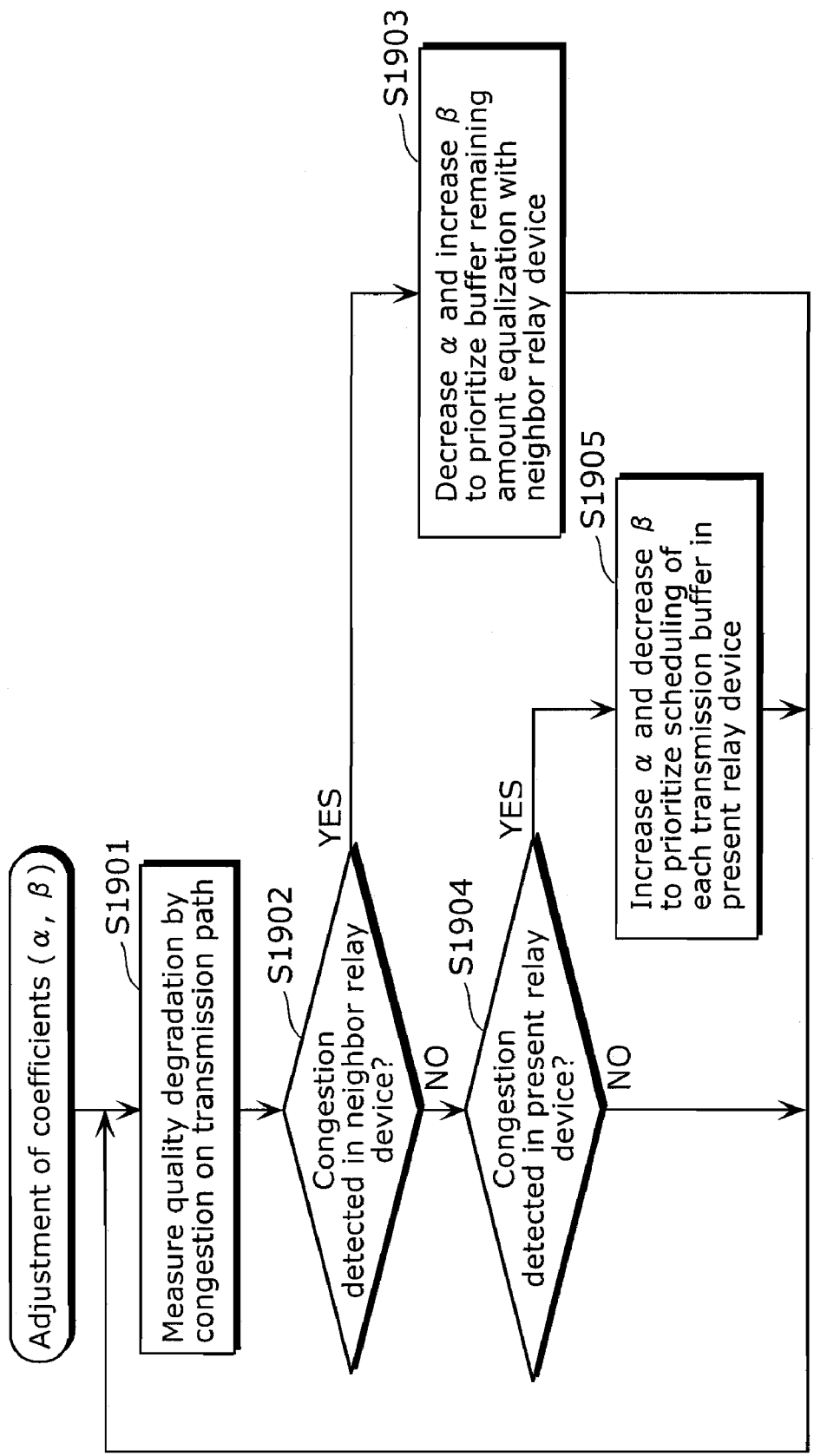
FIG. 18 is a flowchart of a method of adjusting coefficients α and β in the relay device.

FIG. 18 is a flowchart of a method of adjusting coefficients $\alpha$ and $\beta$ in each relay device.

In a conventional method (for example, see Patent Reference 2), the ratio of each of self-optimization control and total optimization control is fixed based on experience. However, when an environment surrounding a device continues to change dynamically, the conventional method has a problem in terms of responsiveness to such an environmental change in the process of solving resource allocation contention between devices. Accordingly, there is a need for a specific method (method of adjusting coefficients $\alpha$ and $\beta$ in the relay device) of dynamically determining the ratio of each of self-optimization control and total optimization control, for an application that requires high responsiveness to an environmental change, such as a network where a number of transmission flows or a transmission error rate changes.

The following (1) and (2) are basic concepts of the method of adjusting coefficients $\alpha$ and $\beta$ in the relay device.

(1) The relay device and its cooperative relay device mutually notify a congestion-related loss (loss rate, delay time, jitter), to compare a degree of influence of resource (transmission bandwidth) allocation contention.

(2) The relay device increases the ratio of transmission amount control by self-optimization control when a loss (loss rate, delay time, jitter) occurs due to congestion in the relay device, and increases the ratio of transmission amount control by total optimization control when a loss (loss rate, delay time, jitter) occurs due to congestion in the other relay device on the transmission path.

(Operation Flow for Changing Coefficients $\alpha$ and $\beta$)

Each relay device measures a loss (loss rate, delay time, jitter) on a transmission path, by means of the congestion state management unit 306 (Step S1901).

The relay device judges whether or not congestion occurs in a one-hop neighbor relay device (Step S1902). When congestion occurs in the neighbor relay device (Step S1902: YES), the operation proceeds to Step S1903. When no congestion occurs in the neighbor relay device (Step S1902: NO), the operation proceeds to Step S1904 (Step S1902).

When congestion occurs in the neighbor relay device (Step S1902: YES), the relay device decreases coefficient $\alpha$ for determining the degree of self-optimization control and increases coefficient $\beta$ for determining the degree of total optimization control, to increase the ratio of total optimization control over self-optimization control for suppressing the congestion in the neighbor relay device (Step S1903).

When no congestion occurs in the neighbor relay device (Step S1902: NO), the relay device judges whether or not congestion occurs in its own transmission buffer (Step S1904). When congestion occurs in the transmission buffer of the relay device itself (Step S1904: YES), the operation proceeds to Step S1905. When no congestion occurs in the transmission buffer of the relay device (Step S1904: NO), the operation returns to Step S1901 (Step S1904).

When congestion occurs in the relay device (Step S1904: YES), the relay device increases coefficient $\alpha$ for determining the degree of self-optimization control and decreases coefficient $\beta$ for determining the degree of total optimization control, to prioritize the suppression of the congestion in its own transmission buffer over the total optimization control with the neighbor relay device (Step S1905). By repeating Steps S1901 to S1905, the relay device automatically adjusts the balance between self-optimization control and total optimization control depending on where congestion occurs.

Though FIG. 18 uses an example of prioritizing the suppression of congestion occurring in the neighbor relay device over the suppression of congestion occurring in the transmission buffer of the relay device itself, Steps S1902 and S1904 may be replaced with each other so that coefficients $\alpha$ and $\beta$ are adjusted by prioritizing the suppression of congestion occurring in the transmission buffer of the relay device itself over the suppression of congestion occurring in the neighbor relay device.

Figure 19:
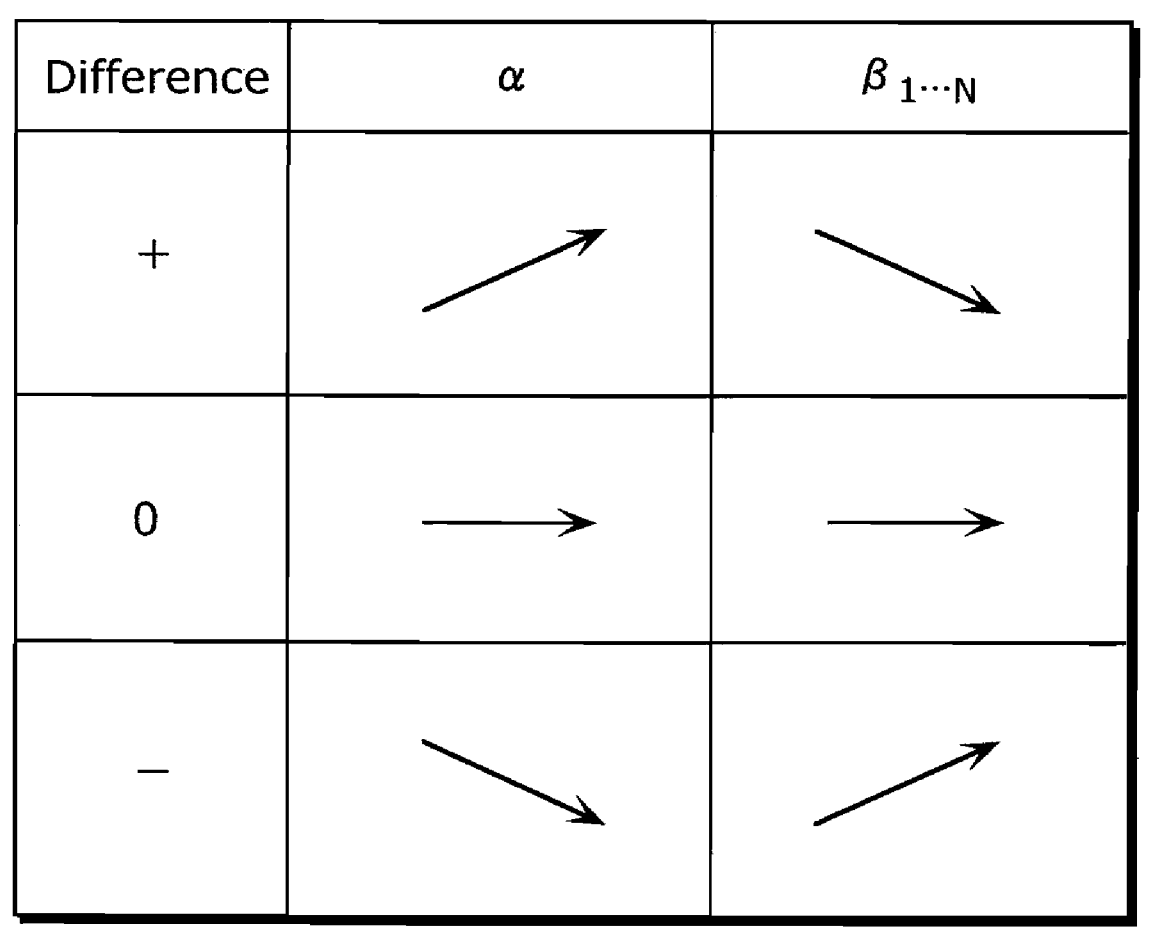

FIG. 19 is an explanatory diagram of a method of determining control amounts of $\alpha$ and $\beta$ from a difference in buffer remaining amount between the present relay device and its neighbor relay device.

The present relay device checks whether or not there is an imbalance in congestion state between the present relay device and its neighbor relay device on a path, by using a buffer remaining amount used for relay processing by each relay device. The present relay device collects a buffer remaining amount of the neighbor relay device and compares it with a buffer remaining amount of the present relay device, to judge whether the present relay device or the neighbor relay device is in a heavier congestion state. In the example of FIG. 19, when a difference in buffer remaining amount between the present relay device and the neighbor relay device (value obtained by subtracting the buffer remaining amount of the neighbor relay device from the buffer remaining amount of the present relay device) is plus "+", the present relay device increases coefficient $\alpha$ for the present relay device, and decreases coefficient $\beta$ for the neighbor relay device. When the difference is minus "−", on the other hand, the present relay device decreases coefficient $\alpha$ for the present relay device, and increases coefficient $\beta$ for the neighbor relay device. By dynamically determining coefficients $\alpha$ and $\beta$ in this way, the balance between self-optimization control and total optimization control can be controlled. Hence the present relay device can eliminate the imbalance of congestion between the present relay device and the neighbor relay device on the same path, while preventing an occurrence of congestion in the present relay device. Note here that, since $M_n$ neighbor relay devices corresponding to different forwarding destinations need to perform optimization control in cooperation with the present relay device, it is necessary for the present relay device to perform $M_n$ total optimization control operations corresponding to the forwarding destinations. Furthermore, coefficients α and β may be determined according to a value of plus "+" or minus "−".

The adjustment of α and β is defined as shown in Expressions 15, 16, and 17, based on the degree of influence, on the present relay device, of resource (transmission bandwidth) allocation contention with the other relay device.

$$I_n = \left(C_{self} - \frac{1}{N_n} \sum_{k \in next(n)} C_k\right)^2 \quad \text{[Expression 15]}$$

Expression 15 is a function of comparing the degree of influence of resource (transmission bandwidth) allocation contention between the present relay device and its cooperative relay device.

In Expression 15, $C_{self}$ is a degree of influence of resource (transmission bandwidth) allocation contention on the present relay device, and $C_k$ is a degree of influence of resource (transmission bandwidth) allocation contention on the cooperative relay device.

Also, next(n) is a set of numbers each for identifying a cooperative relay device of relay device n.

Also, $N_n$ is the number of cooperative relay devices of relay device n.

Function I in Expression 15 is a minimum value when the degree of influence of resource (transmission bandwidth) allocation contention on the present relay device is equal to an average degree of influence on the cooperative relay devices, and increases with a difference between the degree of influence on the present relay device and the average degree of influence on the cooperative relay devices.

$$\begin{cases} \frac{\partial \alpha}{\partial t} = +\gamma \frac{\partial I_n}{\partial \alpha} \\ \frac{\partial \beta}{\partial t} = -\gamma \frac{\partial I_n}{\partial \beta} \end{cases} \quad \text{[Expression 16]}$$

Expression 16 is a control expression whose right-hand side includes a derivative obtained by partially differentiating function I of Expression 15 with respect to α or β. Expression 16 is used to adjust α or β so that the degree of influence caused by resource (transmission bandwidth) allocation contention approaches an equal level between the present relay device and the cooperative relay device.

In Expression 16, γ is a coefficient for determining an adjustment speed of α or β.

For a more detailed explanation of Expression 16, an expression that expands Expression 16 is shown in Expression 17.

$$\begin{cases} \frac{\partial \alpha}{\partial t} = +2\gamma \left(C_{self} - \frac{1}{M_n} \sum_{k \in next(n)} C_k\right) \frac{\partial C_{self}}{\partial \alpha} \\ \frac{\partial \beta}{\partial t} = -2\gamma \left(C_{self} - \frac{1}{M_n} \sum_{k \in next(n)} C_k\right) \frac{\partial C_{self}}{\partial \beta} \end{cases} \quad \text{[Expression 17]}$$

According to Expression 17, when the degree of influence of resource (transmission bandwidth) allocation contention on the present relay device is larger than the average degree of influence on the cooperative relay devices, α is increased and β is decreased, so that the ratio of self-optimization control increases to alleviate the congestion state in the present relay device.

When the degree of influence of resource (transmission bandwidth) allocation contention on the present relay device is smaller than the average degree of influence on the cooperative relay devices, α is decreased and β is increased, so that the ratio of total optimization control increases to alleviate the degree of influence of resource (transmission bandwidth) allocation contention on the cooperative relay devices.

In Expressions 15, 16, and 17 relating to the adjustment of α and β, a value other than a loss (loss rate, delay time, jitter) caused by congestion may be used as degree of influence $C_{self}$ of resource (transmission bandwidth) allocation contention on the present relay device and degree of influence $C_k$ of resource (transmission bandwidth) allocation contention on the cooperative relay device. Examples of such a value for indicating a degree of influence of resource (transmission bandwidth) allocation contention include an airtime metric, a transmission error, a forward error correction strength, a retransmission count, a retransmission time, a number of accommodated terminals, a reception electric field intensity, a buffer remaining amount, and a buffer remaining amount variation.

Figure 20:
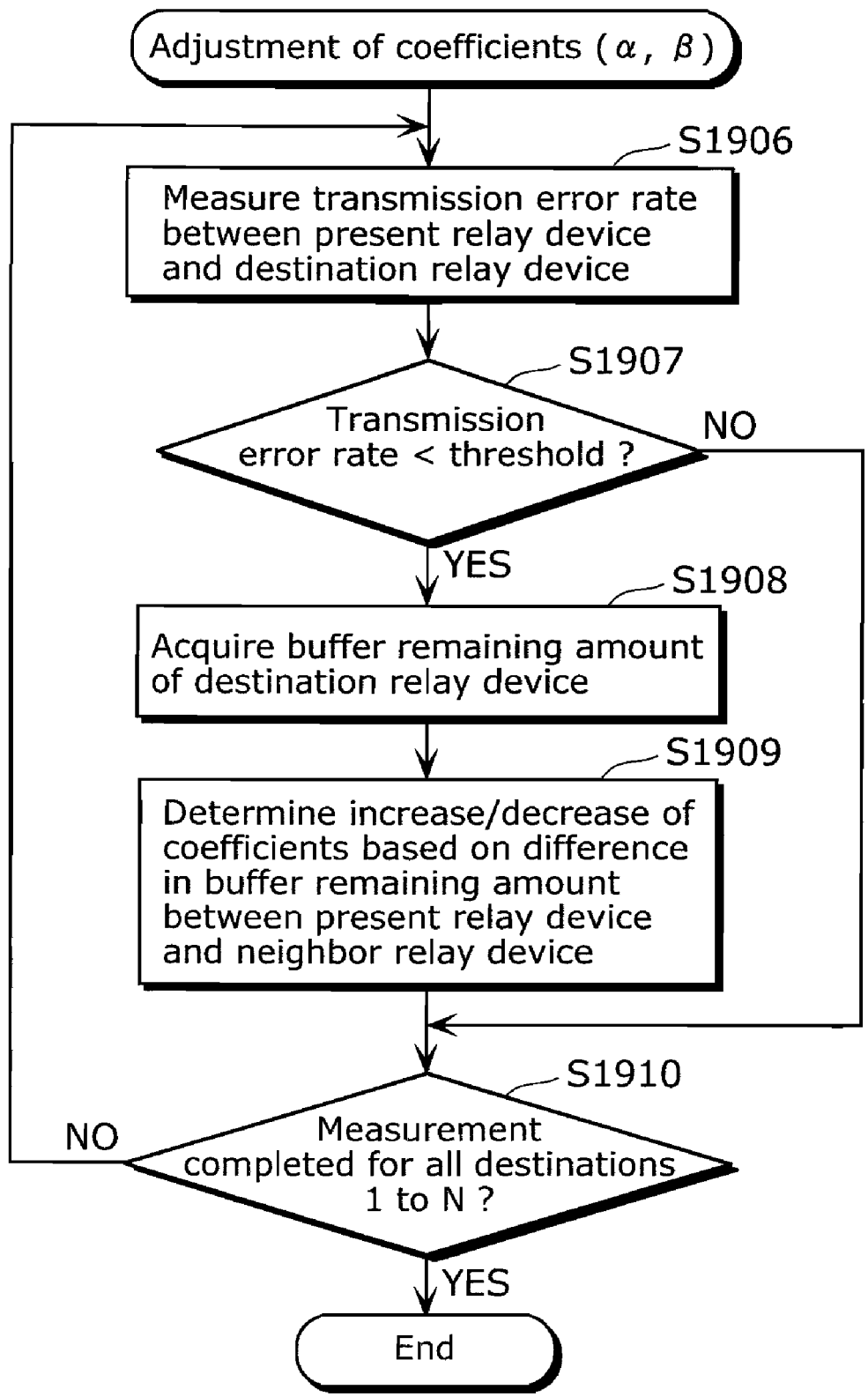
FIG. 20 is a flowchart of a method of determining control amounts of α and β in consideration of a transmission error rate.

FIG. 20 is an explanatory diagram of a method of determining control amounts of α and β in consideration of transmission errors.

To take transmission errors into consideration, the wireless quality management unit 305 in the present relay device measures a transmission error rate between the present relay device and its forwarding destination relay device (Step S1906). The wireless quality management unit 305 judges whether the transmission error rate between the present relay device and the forwarding destination relay device is smaller than a threshold (Step S1907). When the transmission error rate is equal to or larger than the threshold (Step S1907: NO), the adjustment of parameters α and β is not performed. This enables the transmission terminal to detect a fault in the transmission path and select another transmission path promptly. Hence an effect of accelerating recovery from a quality degradation due to a transmission error can be expected. When the transmission error rate is smaller than the threshold (Step S1907: YES), the present relay device acquires a buffer remaining amount of the forwarding destination relay device (Step S1908), and determines the control amounts of α and β based on a difference in buffer remaining amount between the present relay device and the neighbor relay device (Step S1909), as shown in FIG. 19. The present relay device performs the above process for all forwarding destinations 1 to $M_{n,i}$ (Step S1910). Here, the threshold of the transmission error rate may be determined based on experiment, or based on a difference in average transmission error rate measured in each of a network interface for input to the present relay device and a network interface for output from the present relay device.

In the case of a high incidence of transmission errors, β is increased by a larger amount than in the case where transmission errors do not occur, in order to increase the transmission amount. In this way, congestion caused by a transmission error can be suppressed.

Moreover, not only the transmission error rate but also a retransmission count or a forward error correction strength which has been set for each forwarding destination may be used to estimate a transmission path quality and judge whether to adjust parameters α and β. As one example, a transmission path having a high forward error correction strength or a high retransmission count is judged as having a low transmission quality.

So far the method of controlling the balance between self-optimization control and total optimization control in each relay device by adjusting α and β has been described. However, the ratio of α and β may also be used to prioritize a specific path. In detail, the determination of the ratio of α and β may be used for a method in which a user specifies a camera he/she wants to assign a higher priority so that a specific transmission stream is prioritized, or a method in which the existence of a subject is automatically judged by a camera through image processing or a sensor and, if the subject exists, a higher priority is automatically assigned.

EXAMPLES

FIG. 21 is an explanatory diagram of specific examples of transmission amount control for self-optimization and total optimization based on Expression 14 (Expressions 7 and 13), and assumed conditions of these examples.

A first example relates to a method of suppressing an imbalance in data remaining amount between transmission buffers in the present relay device (self-optimization) and suppressing an imbalance in data remaining amount between transmission buffers of the present relay device and its cooperative party (total optimization), by adjusting a transmission amount of each transmission buffer through scheduling based on Expression 14 (Expressions 7 and 13).

In the self-optimization of the first example, scheduling (transmission amount) is adjusted by using a data remaining amount of each transmission buffer in the present relay device as a present relay device transmission buffer state.

In the total optimization of the first example, scheduling (transmission amount) is adjusted by selecting relay devices which are a data forwarding source and a data forwarding destination for the present relay device as cooperative parties, and using a data remaining amount of each transmission buffer in the present relay device as a present relay device transmission buffer state and an average data remaining amount of transmission buffers in each cooperative relay device as a cooperative party transmission buffer state.

A second example relates to a method of suppressing an imbalance in data remaining amount between transmission buffers in the present relay device (self-optimization) and suppressing an imbalance in data remaining amount between transmission buffers of the present relay device and its cooperative party (total optimization), by adjusting a transmission amount of each transmission buffer through packet discard based on Expression 14 (Expressions 7 and 13).

In the self-optimization of the second example, packet discard is adjusted by using a data remaining amount of each transmission buffer in the present relay device as a present relay device transmission buffer state.

In the total optimization of the second example, packet discard (transmission amount) is adjusted by selecting relay devices which are a data forwarding source and a data forwarding destination for the present relay device as cooperative parties, and so using a data remaining amount of each transmission buffer in the present relay device as a present relay device transmission buffer state and an average data remaining amount of transmission buffers in each cooperative relay device as a cooperative party transmission buffer state.

A third example relates to a method of suppressing an imbalance in data remaining amount between transmission buffers of the present relay device and its cooperative party (total optimization), by adjusting a transmission amount of each transmission buffer through MAC layer access control based on Expression 14 (Expressions 7 and 13).

In the total optimization of the third example, MAC layer access control (transmission amount) is adjusted by selecting one-hop neighbor relay devices which allow for direct communication as cooperative parties, and using a total data remaining amount of transmission buffers in the present relay device as a present relay device transmission buffer state, and a total data remaining amount of transmission buffers in each cooperative relay device as a cooperative party transmission buffer state.

Meanwhile, in the self-optimization of the third example, the scheduling of the first example or the packet discard of the second example is used.

A fourth example relates to a method of suppressing an imbalance in data remaining amount between transmission buffers in the present relay device (self-optimization) and suppressing an imbalance in data remaining amount between transmission buffers of the present relay device and its cooperative party (total optimization), by adjusting a transmission amount of each transmission buffer through MAC layer access control based on Expression 14 (Expressions 7 and 13), where a structure capable of performing MAC layer access control independently for each of a plurality of transmission buffers is employed.

In the self-optimization of the fourth example, MAC layer access control (transmission amount) is adjusted by using a data remaining amount of each transmission buffer in the present relay device as a present relay device transmission buffer state.

In the total optimization of the fourth example, MAC layer access control (transmission amount) is adjusted by selecting one-hop neighbor relay devices which allow for direct communication as cooperative parties, and using a data remaining amount of each transmission buffer in the present relay device as a present relay device transmission buffer state, and an average data remaining amount of transmission buffers in each cooperative relay device as a cooperative party transmission buffer state.

A fifth example relates to a method of suppressing an imbalance in data remaining amount between transmission buffers in the present relay device (self-optimization) and suppressing an imbalance in data remaining amount between transmission buffers of the present relay device and its cooperative party (total optimization), by estimating a cooperative party transmission buffer state through the use of a Congestion Control Request (CCR) message and adjusting a transmission amount based on Expression 14 (Expressions 7 and 13), with there being no need to mutually notify a buffer remaining amount directly with the cooperative party. The CCR message is employed in IEEE 802.11s which is currently under development for standardization of technologies to deploy wireless LAN mesh networks.

The fifth example also relates to a method of estimating a transmission amount of the cooperative party by using a CCR message, and adjusting a transmission amount based on Expression 14 (Expressions 7 and 13) by comparing transmission amounts between the present relay device and the cooperative party, instead of comparing transmission buffer states between the present relay device and the cooperative party.

First Example

Transmission Amount Control by Scheduling

FIG. 22 is an explanatory diagram of a method of adjusting a transmission amount by transmission buffer scheduling.

As the method of transmission amount adjustment by transmission buffer scheduling, a method such as Weighted Round Robin (WRR) can be used to adjust the amount of data transmitted from each transmission buffer.

WRR is a method of adjusting transmission amount $x_{n,i}$ of each transmission buffer in accordance with weight $w_{n,i}$ assigned to the transmission buffer.

In FIG. 22, when an amount of data transmitted from relay device n is denoted by $x_n$, an amount of data transmitted from each transmission buffer is obtained by dividing transmission amount $x_n$ in proportion to weight $w_{n,i}$ assigned to each transmission buffer.

Accordingly, control of transmission amount $x_{n,i}$ by scheduling can be realized by adjusting weight $w_{n,i}$ of each transmission buffer based on the control expressions of Expressions 7 and 13.

A control expression of the self-optimization flow control unit 1603 based on Expression 7 is described first.

$$\frac{dw_{n,i}}{dt} = -\alpha \frac{\partial F_i(\vec{q}_n)}{\partial w_{n,i}}$$ [Expression 18]

In Expression 18, the control target of Expression 7 is substituted with weight $w_{n,i}$ of each transmission buffer. A control expression obtained by partially differentiating function F of Expression 18 with respect to weight $w_{n,i}$ is shown in Expression 19.

$$\frac{\partial F_i(\vec{q}_n)}{\partial w_{n,i}} = -2\alpha \left( q_{n,i} - \frac{1}{M_n} \sum_j^{M_n} q_{n,j} \right) \frac{\partial q_{n,i}}{\partial w_{n,i}}$$ [Expression 19]

On the right-hand side of Expression 19, $\partial q_{n,i}/\partial w_{n,i}$ is an adjustment term that represents a relation of a buffer remaining amount variation to a weight variation.

Let $x_{n,i}$ be a transmission amount in data transmission in relay device n. Buffer remaining amount variation $q_{n,i}$ of the i-th transmission buffer per unit time $\Delta T$ is expressed by a relational expression shown in Expression 20.

$$q_{n,i} = x_{n,i}\Delta T = (x_{n,i,in} - x_{n,i,out})\Delta T$$ [Expression 20]

In Expression 20, $x_{n,i,in}$ is an amount of data transmitted to relay device n, and $x_{n,i,out}$ is an amount of data transmitted from relay device n.

Suppose the amount of data transmitted to relay device n is unaffected by a variation in weight $w_{n,i}$ of the transmission buffer. In this case, a variation of $x_{n,i,in}$ with respect to a variation of $w_{n,i}$ is 0 (Expression 21).

$$\frac{\partial x_{n,i,in}}{\partial w_{n,i}} = 0$$ [Expression 21]

Meanwhile, a relation of a variation of data transmission amount $x_{n,i,out}$ from relay device n and a variation in weight $w_{n,i}$ of the transmission buffer is given by Expression 22.

$$\frac{\partial x_{n,i,out}}{\partial w_{n,i}} = \frac{\partial}{\partial w_{n,i}} \frac{w_{n,i}}{W_n} x_{n,out}$$ [Expression 22]

In Expression 22, $x_{n,out}$ is an amount of data transmitted from all transmission buffers in relay device n.

Also, $W_n$ is a sum of weights $w_{n,i}$ assigned to the transmission buffers in relay device n (Expression 23).

$$W_n = \sum_i^{M_n} w_{n,i}$$ [Expression 23]

For a more detailed explanation of the right-hand side of Expression 22, a control expression obtained by partially differentiating the right-hand side with respect to $w_{n,i}$ is shown in Expression 24, where $w_{else}$ is a sum of weights assigned to the transmission buffers other than the i-th transmission buffer.

$$\frac{\partial x_{n,i,out}}{\partial w_{n,i}} = \frac{W_n - w_{n,i}}{W_n^2} x_{n,out}$$
$$= \frac{w_{n,i,else}}{(w_{n,i} + w_{n,i,else})^2} x_{n,out}$$ [Expression 24]

In Expression 24, constant $w_{n,i,else}$ is a sum of weights other than $w_{n,i}$ in relay device n, and is defined as shown in Expression 25.

$$w_{n,i,else} = \sum_j^{M_n} w_{n,j} - w_{n,i}$$ [Expression 25]

According to Expression 24, the variation of the data transmission amount with respect to the adjustment of the weight assigned to the transmission buffer has the following relation. When $w_{n,i}$ is smaller than sum $w_{n,i,else}$ of the weights of the other transmission buffers, the variation of the data transmission amount has an approximately constant relation of about 1 divided by a square of $w_{n,i,else}$. When $w_{n,i}$ is larger than $W_{n,i,else}$, on the other hand, the variation of the data transmission amount is adjusted in inverse proportion to a square of weight $w_{n,i}$ assigned to the transmission buffer.

Which is to say, when the weight assigned to the transmission buffer is large, an influence of the weight adjustment on the transmission amount adjustment decreases in inverse proportion to about a square of the weight.

From Expressions 19 and 24, a control expression of scheduling (weighting) by the self-optimization flow control unit 1603 is defined by Expression 26.

$$\frac{dw_{n,i}}{dt} = \alpha_{w,i} \left( q_{n,i} - \frac{1}{M} \sum_j^{M_n} q_{n,j} \right) \frac{W_n - w_{n,i}}{W_n^2} x_{n,out}$$ [Expression 26]

In Expression 26, $\alpha_{w,i}$ is a coefficient, which is defined as shown in Expression 27.

$$\alpha_{w,i} = 2 \ast \alpha \ast \Delta T$$ [Expression 27]

According to Expression 26, weight $w_{n,i}$ of each transmission buffer used in WRR is controlled as follows. When data remaining amount $q_{n,i}$ of the i-th transmission buffer as the control target is larger than the average buffer remaining amount of all transmission buffers in the relay device, weight $w_{n,i}$ of the i-th transmission buffer is increased. When data remaining amount $q_{n,i}$ of the i-th transmission buffer as the control target is smaller than the average buffer remaining amount of all transmission buffers in the relay device, weight $w_{n,i}$ of the i-th transmission buffer is decreased.

This control of $w_{n,i}$ based on Expression 26 is performed by the self-optimization flow control unit 1603. By adjusting the weight of each transmission buffer according to Expression 26, each relay device can perform transmission buffer scheduling so that data remaining amount $q_{n,i}$ of each transmission buffer approaches an equal level, thereby providing a more uniform transmission quality (delay, loss rate) of each relay path.

That is, each relay device controls the transmission amount so as to make buffer remaining amount $q_{n,i}$ of each transmission buffer equal, as a result of which the transmission quality (delay, loss rate) corresponding to each forwarding destination can be brought to a uniform level.

A control expression of the total optimization flow control unit 1604 based on Expression 13 is described next.

In Expression 28, the control target of Expression 13 is substituted with weight $w_{n,i}$ of each transmission buffer.

$$\frac{dw_{n,i}}{dt} = -\beta \frac{\partial G(q_{n,i}, \vec{Q}_{next(n)})}{\partial w_{n,i}} \quad \text{[Expression 28]}$$

To provide a more specific control expression from Expression 28, a control expression obtained by partially differentiating function G with respect to weight $w_{n,i}$ assigned to the transmission buffer is shown in Expression 29.

$$\frac{dw_{n,i}}{dt} = -2\beta \left( q_{n,i} - \frac{1}{N_n} \sum_{k \in next(n)} Q_k \right) \frac{\partial q_{n,i}}{\partial w_{n,i}} \quad \text{[Expression 29]}$$

In Expression 29, $N_n$ is the number of cooperative relay devices of relay device n.

Also, $\partial q_{n,i}/\partial w_{n,i}$ on the right-hand side of Expression 29 is the same as Expression 24 shown in the control expression of the self-optimization flow control unit 1603.

From Expressions 29 and 24, a control expression of scheduling (weighting) by the total optimization flow control unit 1604 is formulated as shown in Expression 30.

$$\frac{dw_{n,i}}{dt} = \beta_{w,i} \left( q_{n,i} - \frac{1}{N_n} \sum_{k \in next(n)} Q_k \right) \frac{W_n - w_{n,i}}{W_n^2} x_{n,out} \quad \text{[Expression 30]}$$

In Expression 30, $N_n$ is the number of cooperative relay devices of relay device n.

Also, $\beta_{w,i}$ is a coefficient, which is defined as shown in Expression 31.

$$\beta_{w,i} = 2*\beta*\Delta T \quad \text{[Expression 31]}$$

According to Expression 30, weight $w_{n,i}$ of each transmission buffer used in WRR is controlled as follows. When data remaining amount $q_{n,i}$ of the i-th transmission buffer as the control target is larger than the average value of the average buffer remaining amounts of the cooperative relay devices, weight $w_{n,i}$ of the i-th transmission buffer is increased. When data remaining amount $q_{n,i}$ of the i-th transmission buffer as the control target is smaller than the average value of the average buffer remaining amounts of the cooperative relay devices, weight $w_{n,i}$ of the i-th transmission buffer is decreased.

This control of $w_{n,i}$ based on Expression 30 is performed by the total optimization flow control unit 1604. By adjusting the weight of each transmission buffer according to Expression 30, transmission buffer scheduling can be performed so that buffer remaining amount $q_{n,i}$ of the transmission buffer in the present relay device and average buffer remaining amount $Q_n$ of transmission buffers in its cooperative relay device are equalized, thereby suppressing an imbalance in buffer remaining amount on the transmission path.

The first example describes the case where Expression 26 for controlling weight $w_{n,i}$ of each transmission buffer based on Expression 7 is used as a method of self-optimization by scheduling, and Expression 30 for controlling weight $w_{n,i}$ of each transmission buffer based on Expression 13 is used as a method of total optimization by scheduling. However, other control expressions for controlling the weight of each transmission buffer so as to make the buffer remaining amount equal between transmission buffers in one relay device and between relay devices may also be used.

The first example describes the case where the control of the weight used in WRR is employed as a method of transmission amount control by scheduling, but a scheduling method other than WRR, such as Weighted Fair Queuing (WFQ), for adjusting the transmission amount according to the weight assigned to the transmission buffer, may also be used.

Also, in the case where the relation of the buffer remaining amount variation to the weight adjustment shown in Expression 22 can be regarded as constant irrespective of the size of the weight, Expression 22 may be used as a constant.

Second Example

Transmission Amount Control by Packet Discard

Figure 23:
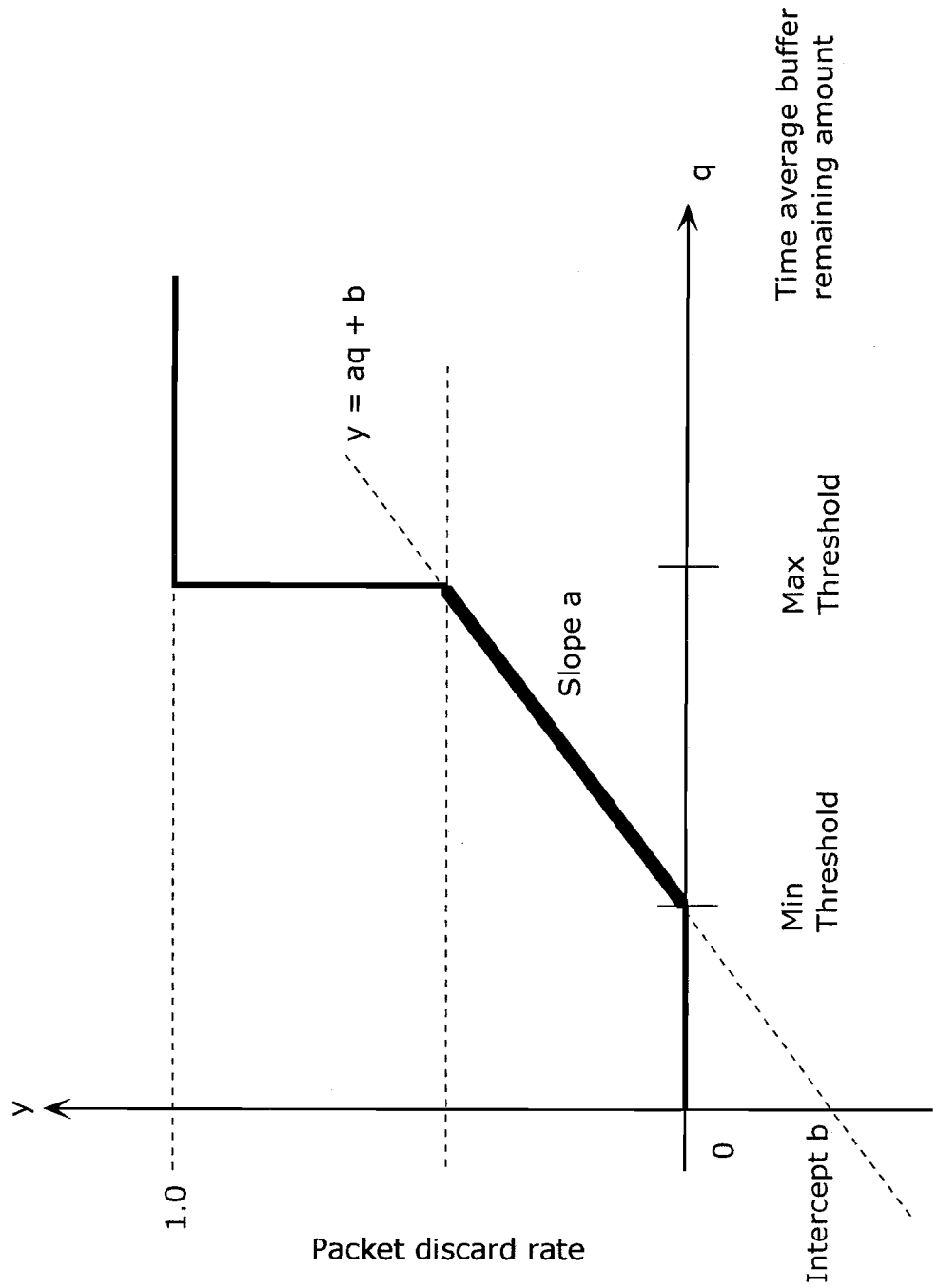
FIG. 23 is an explanatory diagram of packet discard in a transmission buffer.

FIG. 23 is an explanatory diagram of packet discard in a transmission buffer.

The adjustment of the buffer remaining amount of each transmission buffer in the relay device can be achieved not only by controlling the data transmission amount, but also by using a packet discard method such as Random Early Detection (RED).

RED is a technique of randomly selecting a packet in a transmission buffer and discarding the selected packet in advance by adjusting discard rate y in accordance with a buffer remaining amount (time average) of the transmission buffer, to thereby avoid congestion.

FIG. 23 is a graph showing a relation between the buffer remaining amount (time average) of the transmission buffer and the probability of packet discard (packet discard rate) by RED.

In FIG. 23, the horizontal axis represents the buffer remaining amount (time average) of the transmission buffer in the relay device, and the vertical axis represents the packet discard rate of the transmission buffer.

In RED, an upper limit (Max Threshold) and a lower limit (Min Threshold) of the buffer remaining amount are determined with respect to the physical size of the transmission buffer. As shown in the graph of FIG. 23, when the time average buffer remaining amount exceeds the lower limit (Min Threshold), packet discard rate y is increased at a constant rate (slope a). When the time average buffer remaining amount exceeds the upper limit (Max Threshold), packet discard rate y is changed to 1.

When the time average buffer remaining amount is in the range of the lower limit (Min Threshold) to the upper limit (Max Threshold), packet discard rate y is obtained as shown in Expression 32.

$$y = aq + b \qquad \text{[Expression 32]}$$

In Expression 32, y is the packet discard rate, q is the time average buffer remaining amount in a predetermined time, a is the slope (an amount of increase of the packet discard rate with respect to the time average buffer remaining amount), and b is an intercept (a value for determining the lower limit (Min Threshold)).

By adjusting slope a and intercept b in Expression 32, the extent of packet discard in the transmission buffer can be modified. By performing this adjustment for each of the plurality of transmission buffers in the relay device, it is possible to equalize the data remaining amount (buffer remaining amount) between transmission buffers in one relay device, and equalize the data remaining amount (buffer remaining amount) between transmission buffers of relay devices.

Accordingly, packet discard rate y of each transmission buffer is controlled by adjusting slope a and intercept b which determine packet discard rate y of the transmission buffer, based on Expressions 7 and 13.

A control expression of the self-optimization flow controlling unit 1603 based on Expression 7 is described first.

$$\frac{d a_{n,i}}{dt} = -\alpha \frac{\partial F_i(\vec{q}_n)}{\partial a_{n,i}} \qquad \text{[Expression 33]}$$

$$\frac{d b_{n,i}}{dt} = -\alpha \frac{\partial F_i(\vec{q}_n)}{\partial b_{n,i}} \qquad \text{[Expression 34]}$$

In Expression 33, the control target of Expression 7 is substituted with slope $a_{n,i}$ for determining discard rate y. Also, in Expression 34, the control target of Expression 7 is substituted with intercept $b_{n,i}$ for determining discard rate $y_{n,i}$.

Furthermore, a control expression obtained by partially differentiating function F of Expression 33 with respect to weight $a_{n,i}$ assigned to the transmission buffer is shown in Expression 35.

$$\frac{\partial F_i(\vec{q}_n)}{\partial a_{n,i}} = -2\alpha \left( q_{n,i} - \frac{1}{M_n} \sum_{j}^{M_n} q_{n,j} \right) \frac{\partial q_{n,i}}{\partial a_{n,i}} \qquad \text{[Expression 35]}$$

Also, a control expression obtained by partially differentiating function F of Expression 34 with respect to weight $b_{n,i}$ assigned to the transmission buffer is shown in Expression 36.

$$\frac{\partial F_i(\vec{q}_n)}{\partial b_{n,i}} = -2\alpha \left( q_{n,i} - \frac{1}{M_n} \sum_{j}^{M_n} q_{n,j} \right) \frac{\partial q_{n,i}}{\partial b_{n,i}} \qquad \text{[Expression 36]}$$

The buffer remaining amount after packet discard is performed at discard rate $y_{n,i}$ is shown in Expression 37.

$$q_{n,i} = (1 - y_{n,i}) q_{n,i} = (1 - a_{n,i} q_{n,i} - b_{n,i}) q_{n,i} \qquad \text{[Expression 37]}$$

This being so, partially differentiating $q_{n,i}$ with respect to slope $a_{n,i}$ and intercept $b_{n,i}$ yields Expressions 38 and 39, respectively.

$$\frac{\partial q_{n,i}}{\partial a_{n,i}} = -q_{n,i}^2 \qquad \text{[Expression 38]}$$

$$\frac{\partial q_{n,i}}{\partial b_{n,i}} = -q_{n,i} \qquad \text{[Expression 39]}$$

From Expressions 35 and 38, a control expression of slope $a_{n,i}$ for determining discard rate $y_{n,i}$ in an IP layer by the self-optimization flow control unit 1603 is defined by Expression 40.

$$\frac{\partial F_i(\vec{q}_n)}{\partial a_{n,i}} = 2\alpha \left( q_{n,i} - \frac{1}{M_n} \sum_{j}^{M_n} q_{n,j} \right) q_{n,i}^2 \qquad \text{[Expression 40]}$$

From Expressions 36 and 39, a control expression of intercept $b_{n,i}$ for determining discard rate $y_{n,i}$ in the IP layer by the self-optimization flow control unit 1603 is defined by Expression 41.

$$\frac{\partial F_i(\vec{q}_n)}{\partial b_{n,i}} = 2\alpha \left( q_{n,i} - \frac{1}{M_n} \sum_{j}^{M_n} q_{n,j} \right) q_{n,i} \qquad \text{[Expression 41]}$$

According to Expression 40, slope $a_{n,i}$ for determining $y_{n,i}$ is controlled as follows. When data remaining amount $q_{n,i}$ of the i-th transmission buffer as the control target is larger than the average data remaining amount (buffer remaining amount) of the transmission buffers in the relay device, slope $a_{n,i}$ is increased. When data remaining amount $q_{n,i}$ of the i-th transmission buffer as the control target is smaller than the average data remaining amount (buffer remaining amount) of the transmission buffers in the relay device, slope $a_{n,i}$ is decreased.

Also, according to Expression 41, intercept $b_{n,i}$ for determining $y_{n,i}$ is controlled as follows. When data remaining amount $q_{n,i}$ of the i-th transmission buffer as the control target is larger than the average data remaining amount (buffer remaining amount) of the transmission buffers in the relay device, intercept $b_{n,i}$ is increased. When data remaining amount $q_{n,i}$ of the i-th transmission buffer as the control target is smaller than the average data remaining amount (buffer remaining amount) of the transmission buffers in the relay device, intercept $b_{n,i}$ is decreased.

This control of slope $a_{n,i}$ and intercept $b_{n,i}$ based on Expressions 40 and 41 is performed by the self-optimization flow control unit 1603. By adjusting slope $a_{n,i}$ and intercept $b_{n,i}$ according to Expressions 40 and 41, each relay device can perform packet discard of each transmission buffer so that data remaining amount (buffer remaining amount) $q_{n,i}$ of each transmission buffer approaches an equal level, thereby providing a more uniform transmission quality (delay, loss rate) of each relay path.

That is, each relay device controls the packet discard so as to make buffer remaining amount $q_{n,i}$ of each transmission buffer equal, as a result of which the transmission quality (delay, loss rate) corresponding to each forwarding destination can be brought to a uniform level.

A control expression of the total optimization flow control unit 1604 based on Expression 13 is described below.

Expression 42 is a result of substituting the control target of Expression 13 with slope $a_{n,i}$ for determining packet discard rate $y_{n,i}$.

$$\frac{da_{n,i}}{dt} = -\beta \frac{\partial G(q_{n,i}, \vec{Q}_{next(n)})}{\partial a_{n,i}} \quad \text{[Expression 42]}$$

Expression 43 is a result of substituting the control target of Expression 13 with intercept $b_{n,i}$ for determining packet discard rate $Y_{n,i}$.

$$\frac{db_{n,i}}{dt} = -\beta \frac{\partial G(q_{n,i}, \vec{Q}_{next(n)})}{\partial b_{n,i}} \quad \text{[Expression 43]}$$

To provide a more specific control expression from Expression 42, a control expression obtained by partially differentiating function G with respect to slope $a_{n,i}$ for determining packet discard rate $y_{n,i}$ is shown in Expression 44.

$$\frac{da_{n,i}}{dt} = 2\beta \left( q_{n,i} - \frac{1}{N_n} \sum_{k \in next(n)} Q_k \right) q_{n,i}^2 \quad \text{[Expression 44]}$$

To provide a more specific control expression from Expression 43, a control expression obtained by partially differentiating function G with respect to intercept $b_{n,i}$ for determining packet discard rate $y_{n,i}$ is shown in Expression 45.

$$\frac{db_{n,i}}{dt} = 2\beta \left( q_{n,i} - \frac{1}{N_n} \sum_{k \in next(n)} Q_k \right) q_{n,i} \quad \text{[Expression 45]}$$

According to Expression 44, slope $a_{n,i}$ for determining packet discard rate $y_{n,i}$ is controlled as follows. When data remaining amount $q_{n,i}$ of the i-th transmission buffer as the control target is larger than the average value of the average data remaining amounts (average buffer remaining amounts) of the cooperative relay devices, slope $a_{n,i}$ is increased. When data remaining amount $q_{n,i}$ of the i-th transmission buffer as the control target is smaller than the average value of the average data remaining amounts (average buffer remaining amounts) of the cooperative relay devices, slope $a_{n,i}$ is decreased.

Also, according to Expression 45, intercept $b_{n,i}$ for determining packet discard rate $y_{n,i}$ is controlled as follows. When data remaining amount $q_{n,i}$ of the i-th transmission buffer as the control target is larger than the average value of the average data remaining amounts (average buffer remaining amounts) of the cooperative relay devices, intercept $b_{n,i}$ is increased. When data remaining amount $q_{n,i}$ of the i-th transmission buffer as the control target is smaller than the average value of the average data remaining amounts (average buffer remaining amounts) of the cooperative relay devices, intercept $b_{n,i}$ is decreased.

This control of slope $a_{n,i}$ and intercept $b_{n,i}$ for determining packet discard rate $y_{n,i}$ based on Expressions 44 and 45 is performed by the total optimization flow control unit 1604. By adjusting slope $a_{n,i}$ and intercept $b_{n,i}$ according to Expressions 44 and 45, packet discard of each transmission buffer can be performed so that data remaining amount $q_{n,i}$ of the transmission buffer and average data remaining amount $Q_n$ of the cooperative relay devices are equalized, thereby suppressing an imbalance in data remaining amount (buffer remaining amount) between transmission buffers of relay devices on the transmission path.

The second example describes the case where Expressions and 41 for controlling packet discard rate $y_{n,i}$ of each transmission buffer based on Expression 7 are used as a method of self-optimization by packet discard, and Expressions 44 and 45 for controlling packet discard rate $y_{n,i}$ of each transmission buffer based on Expression 13 are used as a method of total optimization by packet discard. However, other control expressions of the packet discard rate for controlling the weight of each transmission buffer so as to equalize the buffer remaining amount between transmission buffers in one relay device and between relay devices, are also applicable.

Third Example

Transmission Amount Control by Mac Layer Access Control

The third example relates to a total optimization method of adjusting a transmission amount between relay devices and suppressing an imbalance in buffer remaining amount between relay devices, by adjusting MAC layer access control based on Expression 13.

Note that the third example is predicated on a structure in which common access control is performed on each transmission buffer in a relay device. In such a structure, it is impossible to adjust transmission of each transmission buffer individually. Accordingly, the scheduling of the first example or the packet discard of the second example is used for self-optimization of the third example, to perform the self-optimization and the total optimization simultaneously.

Total optimization by MAC layer access control is described below.

Figure 24:
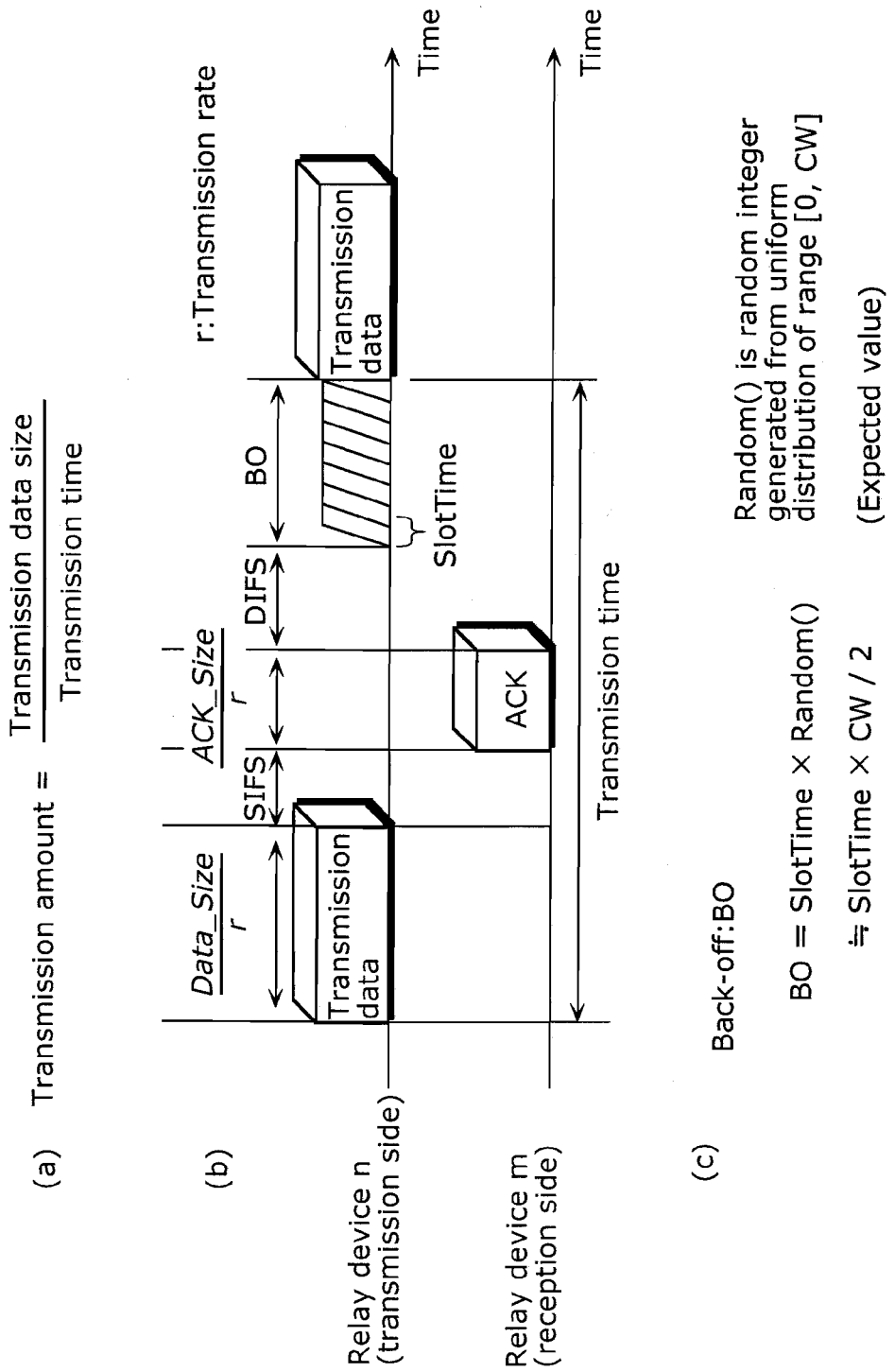
FIG. 24 is an explanatory diagram of how to compute a throughput of data transmitted from the relay device.

FIG. 24 is an explanatory diagram of a relation between a data transmission timing and a data transmission amount in a relay device according to Carrier Sense Multiple Access with Collision Avoidance (CSMA/CA) which is used for wireless LANs and the like as a MAC layer access control method.

FIG. 24(*a*) shows an expression for computing an amount of data transmitted from relay device n. The data transmission amount from relay device n is computed by dividing a data size of transmission data by a transmission time that is required from transmission of transmission data to transmission of next transmission data.

FIG. 24(*b*) is an explanatory diagram of a transmission timing of data (packet) in CSMA/CA, A method of calculating the transmission time required from the transmission of transmission data to the transmission of next transmission data is described below with reference to FIG. 24(*b*), using an example where relay device n transmits data to relay device m according to CSMA/CA.

When transmission data is correctly transmitted from relay device n to relay device m, relay device m waits a Short Interframe Space (SIFS) time after the completion of the data transmission, and then transmits ACK data indicating the correct data transmission to relay device n. Upon receiving the ACK data from relay device m, relay device n waits a DCF Interframe Space (DIFS) time and a Back Off (BO) time, and then performs next data transmission. This being so, the transmission amount of relay device n can be computed according to Expression 46.

$$x_{n,out} = \frac{\text{DATA\_Size}}{\frac{\text{DATA\_Size}}{r} + SIFS + \frac{\text{ACK\_Size}}{r} + DIFS + BO}$$ [Expression 46]

In Expression 46, DATA_Size is a size of transmission data, ACK_Size is a size of ACK data, SIFS, DIFS, and BO are times to wait before data transmission, r is a data transmission rate, Data_Size/r is a time taken to transmit the transmission data, and ACK_Size/r is a time taken to transmit the ACK data.

In FIG. 24(b), the difference between the DIFS time and the BO time is the following. As the DIFS time, relay device n waits a given period of time until the next transmission. As the BD time, relay device n waits a period of time computed by multiplying SlotTime, which is a minimum unit of time in access control, by a random integer generated from a uniform distribution of a range from 0 to a Contention Window (CW) until the next data transmission, as shown in FIG. 24(c). The provision of randomness to the BO wait time produces an effect of avoiding simultaneous data transmission with another relay device. Also, since an expected value of the BO wait time changes in proportion to the CW as shown in FIG. 24(c), the BO time (its expected value) can be adjusted by changing the CW.

For the MAC layer data transmission amount control, the DIFS time and the CW are adjusted based on Expressions 7 and 13.

A control expression of the CW based on Expression 13 by the total optimization flow control unit 1604 is described first.

In Expression 47, the control target of Expression 13 is substituted with $CW_n$ of relay device n.

$$\frac{dCW_n}{dt} = -\beta \frac{\partial G(q_n, \vec{q}_{next(n)})}{\partial x_{n,i}}$$ [Expression 47]

In the MAC layer data transmission amount control cooperatively performed between relay devices, a total data remaining amount (total buffer remaining amount) of all transmission buffers in each relay device is used as shown in Expression 48.

$$q_n = \sum_{i}^{M_n} q_{n,i}$$ [Expression 48]

In Expression 47, next(n) is a set of numbers for identifying cooperative relay devices of relay device n. Expression 49 represents a set of total data remaining amounts (total buffer remaining amounts) of the cooperative relay devices of relay device n.

$$\vec{q}_{next(n)} = \{q_k | k \in next(n)\}$$ [Expression 49]

As a more specific control expression of the total optimization flow control unit 1604, a control expression obtained by partially differentiating function G with respect to the CW of relay device n is shown in Expression 50.

$$\frac{dCW_n}{dt} = -2\beta \left(q_n - \frac{1}{N_n} \sum_{k \in next(n)} q_k\right) \frac{\partial q_n}{\partial CW_n}$$ [Expression 50]

In Expression 50, $\partial q_n/\partial CW_n$ on the right-hand side is an adjustment term that indicates a relation of a variation of total data remaining amount (total buffer remaining amount) $q_n$ of the transmission buffers in relay device n, to a variation of the CW. Also, $N_n$ is the number of cooperative relay devices of relay device n.

When a data transmission amount of relay device n is denoted by $x_n$, variation $q_n$ in total data remaining amount with respect to an adjustment amount of the CW in relay device n per unit time $\Delta T$ is shown by a relational expression in Expression 51.

$$\frac{\partial q_n}{\partial CW_n} = \frac{\partial x_n \Delta T}{\partial CW_n} = \frac{\partial (x_{n,in} - x_{n,out}) \Delta T}{\partial CW}$$ [Expression 51]

In Expression 51, $x_{n,in}$ is an amount of data transmitted to relay device n, and $x_{n,out}$ is an amount of data transmitted from relay device n.

Suppose the amount of data transmitted to relay device n is unaffected by a change of $CW_n$ of relay device n. That is, a variation of $x_{n,in}$ with respect to a variation of $CW_n$ is 0 (Expression 52).

$$\frac{\partial x_{n,in}}{\partial CW_n} = 0$$ [Expression 52]

Meanwhile, a relation of a variation of data transmission amount $x_{n,out}$ from relay device n to a variation of $CW_n$ of relay device n is given by Expression 53, using Expression 46 which has been explained earlier with reference to FIG. 24(b).

$$\frac{\partial x_{n,out}}{\partial CW_n} = \frac{\partial}{\partial CW_n} \frac{\text{DATA\_Size}}{\frac{\text{DATA\_Size}}{r} + SIFS + \frac{\text{ACK\_Size}}{r} + DIFS + BO}$$ [Expression 53]

Here, according to the expression shown in FIG. 24(c) and Expression 54, the BO time can be substituted with a form that includes the CW.

$$BO = SlotTime * \text{Random}() = SlotTime * \frac{CW_n}{2}$$ [Expression 54]

Partially differentiating Expression 53 with respect to the CW yields Expression 55.

$$\frac{\partial x_{n,out}}{\partial CW_n} = \text{DATA\_Size} * \frac{\partial}{\partial CW_n} \frac{1}{\frac{SlotTime}{2} * CW_n + T_{CW}}$$
$$= \frac{2 * \text{DATA\_Size} * SlotTime}{(SlotTime * CW_n + 4T_{CW})^2}$$ [Expression 55]

In Expression 55, $T_{CW}$ is a constant, which is defined as shown in Expression 56.

$$T_{CW} = SIFS + DIFS + \frac{ACK\_Size + DATA\_Size}{r} \quad \text{[Expression 56]}$$

According to Expression 55, the variation of the data transmission amount from relay device n with respect to the adjustment amount of $CW_n$ of relay device n has the following relation. When $CW_n$ is smaller than other $T_{CW}$, the variation of the data transmission amount has an approximately constant relation of about 1 divided by a square of $T_{CW}$. When $CW_n$ is larger than $T_{CW}$, the variation of the data transmission amount is adjusted in inverse proportion to a square of weight $CW_n$ assigned to relay device n.

Which is to say, when $CW_n$ of relay device n is large, an influence of the adjustment of $CW_n$ on the transmission amount adjustment decreases in inverse proportion to about a square of $CW_n$.

From Expressions 50 and 55, a control expression of the CW by total optimization control in relay device n and its one-hop neighbor relay devices is formulated as Expression 57.

$$\frac{dCW_n}{dt} = -\beta_{cw}\left(q_n - \frac{1}{M_n}\sum_{k \in next(n)} q_k\right)\frac{1}{\left(\frac{SlotTime*}{CW_n + 4T_{CW}}\right)^2} \quad \text{[Expression 57]}$$

In Expression 57, $\beta_{CW}$ is a coefficient, which is defined as shown in Expression 58.

$$\beta_{CW} = 2\beta * \Delta T * DATA\_Size * SlotTime \quad \text{[Expression 58]}$$

According to Expression 57, $CW_n$ of relay device n is controlled as follows. When the total data remaining amount (total buffer remaining amount) of the transmission buffers in the relay device is larger than the average value of the total data remaining amounts (total buffer remaining amounts) of the cooperative relay devices, $CW_n$ is decreased. When the total data remaining amount (total buffer remaining amount) of the transmission buffers in the relay device is smaller than the average value of the total data remaining amounts (total buffer remaining amounts) of the cooperative relay devices, $CW_n$ is increased.

This control of the CW based on Expression 57 is performed by the total optimization flow control unit 1604. By controlling the CW based on Expression 57 so that total data remaining amount (total buffer remaining amount) $q_n$ of transmission buffers is equalized between the relay device and its cooperative relay device, an imbalance in total data remaining amount (total buffer remaining amount) of transmission buffers on the transmission path can be suppressed.

In CSMA/CA, in the case where correct data transmission fails, such as when transmission data transmitted from one relay device collides with transmission data transmitted from another relay device or a transmission buffer in a forwarding destination relay device is congested, the relay device waits a predetermined time and then retransmits the transmission data. Here, to reduce a probability of the retransmitted data colliding with transmission data from another relay device again, the CW is changed based on a rule called a backoff algorithm.

When changing the CW by the backoff algorithm, a process of doubling the CW is performed at each retransmission until an upper limit $CW_{max}$ is reached, beginning with $CW_{min}$ as an initial value.

This being so, to perform the MAC layer data transmission amount control based on Expression 13 in a relay device in which the CW is controlled by the backoff algorithm, it is desirable to adjust initial value $CW_{min}$ and upper limit $CW_{max}$ of the CW, instead of using Expression 57.

Expression 59 represents a control expression of $CW_{min}$, whereas Expression 60 represents a control expression of $CW_{max}$.

$$\frac{dCW_{min,n}}{dt} = -\beta_{cw}\left(q_n - \frac{1}{N_n}\sum_{k \in next(n)} q_k\right)\frac{1}{\left(\frac{SlotTime*}{CW_{min,n} + 4T_{CW}}\right)^2} \quad \text{[Expression 59]}$$

$$\frac{dCW_{max,n}}{dt} = -\beta_{cw}\left(q_n - \frac{1}{N_n}\sum_{k \in next(n)} q_k\right)\frac{1}{\left(\frac{SlotTime*}{CW_{max,n} + 4T_{CW}}\right)^2} \quad \text{[Expression 60]}$$

According to Expression 59, $CW_{min}$ of relay device n is controlled as follows. When the total data remaining amount (total buffer remaining amount) of the transmission buffers in the relay device is larger than the average value of the total data remaining amounts (total buffer remaining amounts) of the cooperative relay devices, $CW_{min}$ is decreased. When the total data remaining amount (total buffer remaining amount) of the transmission buffers in the relay device is smaller than the average value of the total data remaining amounts (total buffer remaining amounts) of the cooperative relay devices, $CW_{min}$ is increased.

Also, according to Expression 60, $CW_{max}$ of relay device n is controlled as follows. When the total data remaining amount (total buffer remaining amount) of the transmission buffers in the relay device is larger than the average value of the total data remaining amounts (total buffer remaining amounts) of the cooperative relay devices, $CW_{max}$ is decreased. When the total data remaining amount (total buffer remaining amount) of the transmission buffers in the relay device is smaller than the average value of the total data remaining amounts (total buffer remaining amounts) of the cooperative relay devices, $CW_{max}$ is increased.

This control of $CW_{min}$ and $CW_{max}$ based on Expressions 59 and 60 is performed by the total optimization flow control unit 1604. By adjusting $CW_{min}$ and $CW_{max}$ of each transmission buffer according to Expressions 59 and 60, MAC layer access control can be performed so that the total data remaining amount (total buffer remaining amount) of the transmission buffers in the relay device and the total data remaining amount (total buffer remaining amount) of the transmission buffers in its cooperative relay device are equalized, thereby providing a more uniform transmission quality (delay, loss rate) of each relay path.

The adjustment of the DIFS instead of the CW can be equally formulated by substituting the CW with the DIFS. Expression 61 represents a control expression of the DIFS.

$$\frac{dDIFS_n}{dt} = -\beta_{DIFS}\left(q_n - \frac{1}{N_n}\sum_{k \in next(n)} q_k\right)\frac{1}{\left(\frac{DIFS_n + }{T_{DIFS}}\right)^2} \quad \text{[Expression 61]}$$

In Expression 61, $\beta_{DIFS}$ is a coefficient, which is defined as shown in Expression 62.

$$\beta_{DIFS}=2\beta^*\Delta T^*DATA\_Size \quad \text{[Expression 62]}$$

In Expression 61, $T_{DIFS}$ is a constant, which is defined as shown in Expression 63.

$$T_{DIFS} = SIFS + BO + \frac{ACK\_Size + DATA\_Size}{r} \quad \text{[Expression 63]}$$

According to Expression 61, the DIFS of relay device n is controlled as follows. When the total data remaining amount (total buffer remaining amount) of the transmission buffers in the relay device is larger than the average value of the total data remaining amounts (total buffer remaining amounts) of the cooperative relay devices, the DIFS is decreased. When the total data remaining amount (total buffer remaining amount) of the transmission buffers in the relay device is smaller than the average value of the total data remaining amounts (total buffer remaining amounts) of the cooperative relay devices, the DIFS is increased.

This control of the DIFS based on Expression 61 is performed by the total optimization flow control unit 1604. By adjusting the DIFS of each transmission buffer according to Expression 61, MAC layer access control can be performed so that the total data remaining amount (total buffer remaining amount) $q_n$ of transmission buffers is equalized between the relay device and its cooperative relay device, thereby suppressing an imbalance in data remaining amount (buffer remaining amount) of transmission buffers on the transmission path.

The third example describes the case where Expressions 57, 59, 60, and 61 respectively for controlling the CW, $CW_{min}$, $CW_{max}$, and DIFS as the CSMA/CA adjustment parameters based on Expression 13 are used as a method of MAC layer transmission amount control. However, other control expressions for controlling the transmission amount of each transmission buffer so as to equalize the total data remaining amount (total buffer remaining amount) of transmission buffers between relay devices, are also applicable.

For example, though a throughput is computed based on Expression 46 using the assumption of the transmission timing shown in FIG. 24 in order to find the data transmission amount from the relay device, other expressions may be used depending on assumed conditions. As one example, an expression for calculating a transmission amount on an assumption of a transmission timing in consideration of Request to Send (RTS) and Clear to Send (CTS) notification between relay devices is applicable.

Also, in the case where the variation in data remaining amount of transmission buffers with respect to the adjustment amount of the DIFS or CW ($CW_{min}$, $CW_{max}$) as the control target in Expression 51 can be regarded as constant irrespective of the size of the CW ($CW_{min}$, $CW_{max}$), the adjustment may be performed by using Expression 51 as a constant.

Fourth Example

Transmission Amount Control in the Case Where Access Control of Each Individual Transmission Buffer is Possible A method of self-optimization and total optimization by MAC layer access control based on Expressions 7 and 13 in the case where access control according to CSMA/CA can be performed independently for each transmission buffer is described below.

A method of controlling MAC layer access control independently for each transmission buffer can be realized by Enhanced Distributed Channel access (EDCA) defined in IEEE 802.11e.

Figure 25:
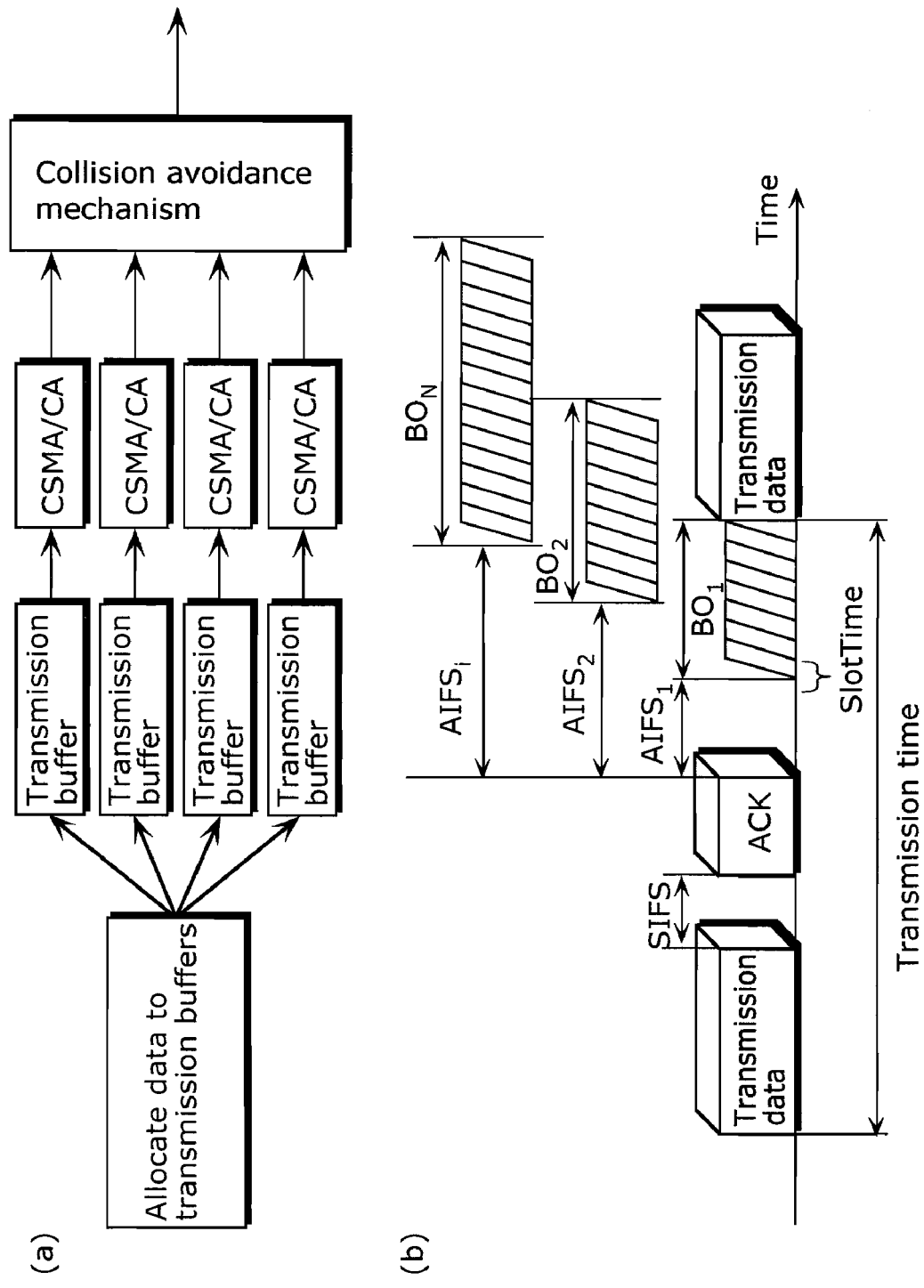
FIG. 25 is an explanatory diagram of access control in EDCA.

FIG. 25 is an explanatory diagram of access control in EDCA.

In EDCA, four transmission buffers (access categories) are prepared in order to perform Quality of Service (QoS: communication quality) control according to data priority, as shown in FIG. 25(*a*). Access control by CSMA/CA can be performed independently for each transmission buffer.

In EDCA, each transmission buffer is provided with an Arbitration IFS (AIFS) time which substitutes for the DIFS time as a wait time after ACK data reception as shown in FIG. 25(*b*), $CW_{min}$ and $CW_{max}$ for determining the BO time, and a Transmission Opportunity (TXOP: exclusive channel use) for determining a time during which the transmission buffer has an exclusive transmission right.

Accordingly, by adjusting the AIFS time, $CW_{min}$, $CW_{max}$, and TXOP of each transmission buffer, the data transmission amount from each transmission buffer can be changed individually.

Control expressions of $CW_{min}$ and $CW_{max}$ by the self-optimization flow control unit 1603 based on Expression 7 are described below.

Control expressions in which the control target of Expression 7 is substituted with $CM_{min}$ and $CW_{max}$ of relay device n are shown below.

Expression 64 is a control expression of $CW_{min}$ by the self-optimization flow control unit 1603.

$$\frac{dCW_{min_{n,i}}}{dt} = -\alpha_{cw}\left(q_{n,i} - \frac{1}{M_n}\sum_{j}^{M_n} q_{n,j}\right)\frac{1}{\left(\frac{SlotTime*}{CW_{min_{n,i}} + 4T_{CW_{n,i}}}\right)^2} \quad \text{[Expression 64]}$$

Expression 65 is a control expression of $CW_{max}$ by the self-optimization flow control unit 1603.

$$\frac{dCW_{max_{n,i}}}{dt} = -\alpha_{cw}\left(q_{n,i} - \frac{1}{M_n}\sum_{j}^{M_n} q_{n,j}\right)\frac{1}{\left(\frac{SlotTime*}{CW_{max_{n,i}} + 4T_{CW_{n,i}}}\right)^2} \quad \text{[Expression 65]}$$

Expression 66 defines coefficient $\alpha_{CW}$ in Expressions 64 and 65.

$$\alpha_{CW}=2\alpha^*\Delta T^*DATA\_Size^*SlotTime \quad \text{[Expression 66]}$$

Expression 67 defines constant $T_{CW}$ in Expressions 64 and 65.

$$T_{CW_{n,i}} = SIFS + AIFS_i + \frac{SlotTime}{2} + \frac{ACK\_Size + DATA\_Size}{r} \quad \text{[Expression 67]}$$

According to Expression 64, $CW_{min}$ of relay device n is controlled as follows. When data remaining amount $q_{n,i}$ of the i-th transmission buffer as the control target is larger than the average data remaining amount (average buffer remaining amount) of the transmission buffers in the relay device, $CW_{min}$ is decreased. When data remaining amount $q_{n,i}$ of the i-th transmission buffer as the control target is smaller than the average data remaining amount (average buffer remaining amount) of the transmission buffers in the relay device, $CW_{min}$ is increased.

Also, according to Expression 65, $CW_{max}$ of relay device n is controlled as follows. When data remaining amount $q_{n,i}$ of the i-th transmission buffer as the control target is larger than the average data remaining amount (average buffer remaining amount) of the transmission buffers in the relay device, $CW_{max}$ is decreased. When data remaining amount $q_{n,i}$ of the i-th transmission buffer as the control target is smaller than the average data remaining amount (average buffer remaining amount) of the transmission buffers in the relay device, $CW_{max}$ is increased.

This control of $CW_{min}$ and $CW_{max}$ based on Expressions 64 and 65 is performed by the self-optimization flow control unit 1603. By adjusting $CW_{min}$ and $CW_{max}$ of each transmission buffer according to Expressions 64 and 65, each relay device can perform MAC layer access control so that data remaining amount (buffer remaining amount) $q_{n,i}$ of each transmission buffer approaches an equal level, thereby providing a more uniform transmission quality (delay, loss rate) of each relay path.

The derivation of Expressions 64 and 65 is the same as that of Expressions 59 and 60 which are the MAC layer control expressions used by the total optimization flow control unit 1604, and so its explanation has been omitted here.

The difference between Expressions 64 and 65 and Expressions 59 and 60 is in the following. Expressions 59 and 60 are control expressions for performing MAC layer transmission amount control by comparing total data remaining amount (total buffer remaining amount) $q_n$ of transmission buffers between the relay device and its one-hop neighbor relay device. Expressions 64 and 65 are control expressions for adjusting the transmission amount of each transmission buffer by comparing data remaining amount (buffer remaining amount) $q_{n,i}$ between the transmission buffers in the same relay device.

An autonomous control expression for adjusting the AIFS is defined as shown in Expression 68, in the same manner as the control expressions of $CW_{min}$ and $CW_{max}$.

Expression 68 is a control expression of the AIFS time by the self-optimization flow control unit 1603.

$$\frac{dAIFS_{n,i}}{dt} = -\alpha_{AIFS}\left(q_{n,i} - \frac{1}{M_n}\sum_{k}^{M_n} q_{n,k}\right)\frac{1}{\left(\frac{AIFS_{n,i}+}{T_{AIFS}}\right)^2} \quad \text{[Expression 68]}$$

In Expression 68, $T_{AIFS}$ is a constant, which is defined as shown in Expression 69.

$$T_{AIFS} = SIFS + BO + \frac{ACK\_Size + DATA\_Size}{r} \quad \text{[Expression 69]}$$

In Expression 68, $\alpha_{AIFS}$ is a coefficient, which is defined as shown in Expression 70.

$$\alpha_{AIFS} = 2\alpha^*\Delta T^*DATA\_Size \quad \text{[Expression 70]}$$

According to Expression 68, the AIFS of relay device n is controlled as follows. When data remaining amount $q_{n,i}$ of the i-th transmission buffer as the control target is larger than the average data remaining amount (average buffer remaining amount) of the transmission buffers in the relay device, the AIFS is decreased. When data remaining amount $q_{n,i}$ of the i-th transmission buffer as the control target is smaller than the average data remaining amount (average buffer remaining amount) of the transmission buffers in the relay device, the AIFS is increased.

This control of the AIFS based on Expression 68 is performed by the self-optimization flow control unit 1603. By adjusting the AIFS of each transmission buffer according to Expression 68, each relay device can perform MAC layer access control so that data remaining amount (buffer remaining amount) $q_{n,i}$ of each transmission buffer approaches an equal level, thereby providing a more uniform transmission quality (delay, loss rate) of each relay path.

An autonomous control expression of the TXOP based on Expression 7 is described next.

Figure 26:
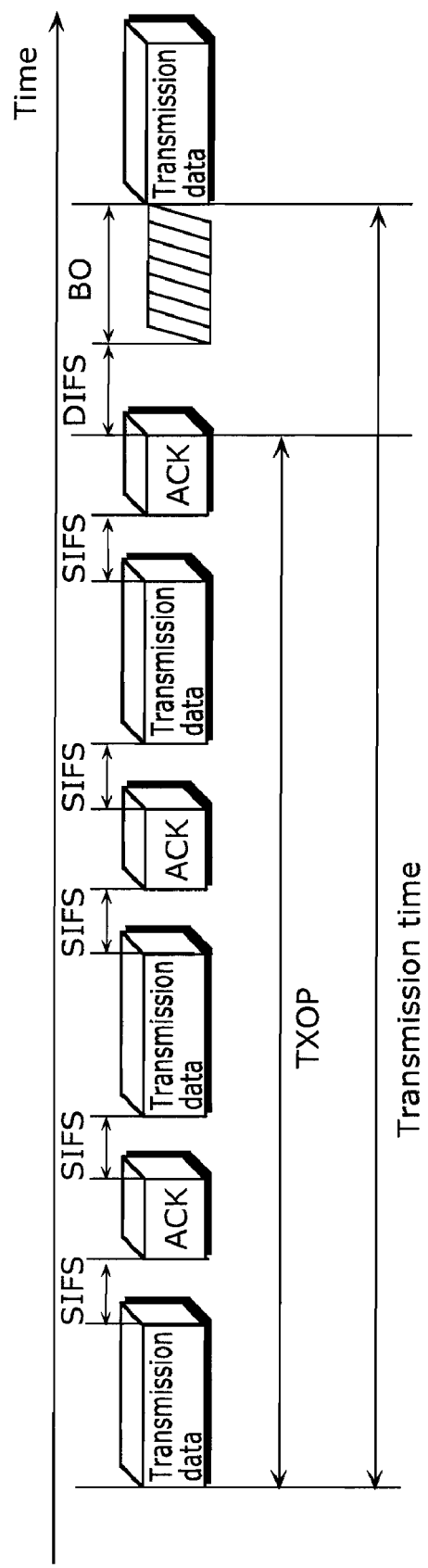
FIG. 26 is an explanatory diagram of a data transmission timing in the case of acquiring an exclusive transmission right (TXOP).

FIG. 26 is an explanatory diagram of a data transmission timing in the case where the relay device acquires an exclusive transmission right (TXOP) in EDCA.

When the TXOP time is given, the relay device can continuously transmit data without waiting the AIFS time and the BO time, during the TXOP time.

This being so, the amount of data transmitted from the relay device in the case where the TXOP time is given can be computed according to Expression 71, based on the transmission timing of transmission data shown in FIG. 26.

$$x_{n,i,out} = \frac{DATA\_Size * \dfrac{TXOP_{n,i}}{\left(\dfrac{DATA\_Size+}{ACK}\right)/r +}}{TXOP_{n,i} + AIFS + BO} \quad \text{[Expression 71]}$$

In Expression 71, the numerator of the right-hand side is a size of data transmitted in the TXOP time, and the denominator of the right-hand side is a total time taken for data transmission.

A control expression in which the control target of Expression 7 is substituted with the TXOP of relay device n is shown in Expression 72.

$$\frac{dTXOP_{n,i}}{dt} = \alpha_{TXOP}\left(q_{n,i} - \frac{1}{M_n}\sum_{k}^{M_n} q_{n,k}\right)\frac{AIFS + BO}{\left(\frac{TXOP_{n,i}+}{AIFS+BO}\right)^2} \quad \text{[Expression 72]}$$

In Expression 72, $\alpha_{TXOP}$ is a coefficient, which is defined as shown in Expression 73.

$$\alpha_{TXOP} = 2\alpha\Delta T \frac{DATA\_Size}{\left(\dfrac{DATA\_Size+}{ACK\_Size}\right)/r + 2SIFS} \quad \text{[Expression 73]}$$

According to Expression 72, the TXOP of relay device n is controlled as follows. When data remaining amount $q_{n,i}$ of the i-th transmission buffer as the control target is larger than the average data remaining amount (average buffer remaining amount) of the transmission buffers in the relay device, the TXOP is increased. When data remaining amount $q_{n,i}$ of the i-th transmission buffer as the control target is smaller than the average data remaining amount (average buffer remaining amount) of the transmission buffers in the relay device, the TXOP is decreased.

This control of the TXOP based on Expression 72 is performed by the self-optimization flow control unit 1603. By adjusting the TXOP of each transmission buffer according to Expression 72, each relay device can perform MAC layer access control so that data remaining amount $q_{n,i}$ of each transmission buffer approaches an equal level, thereby providing a more uniform transmission quality (delay, loss rate) of each relay path.

<Total Optimization Control in Relay Device Having EDCA Function>

On the other hand, total optimization control between relay devices having the EDCA function can be performed in the following way. In each of Expressions 64, 65, 68, and 72, the buffer remaining amount of the transmission buffer is compared not with the average data remaining amount (average buffer remaining amount) of the transmission buffers in the relay device, but with the average data remaining amount (average buffer remaining amount) of the transmission buffers in its cooperative relay device. In this way, MAC layer access control for total optimization can be performed on each transmission buffer so as to suppress an imbalance in data remaining amount of transmission buffers on the transmission path.

Expression 74 is a control expression of $CW_{min}$ by the total optimization flow control unit 1604.

$$\frac{dCW_{min_{n,i}}}{dt} = -\beta_{cw}\left(q_{n,i} - \frac{1}{N_n}\sum_{k\in next(n)} Q_k\right)\frac{1}{\left(\frac{SlotTime*}{CW_{min_{n,i}}+} + 4T_{CW_{n,i}}\right)^2}$$ [Expression 74]

Expression 75 is a control expression of $CW_{max}$ by the total optimization flow control unit 1604.

$$\frac{dCW_{max_{n,i}}}{dt} = -\beta_{cw}\left(\frac{q_{n,i}-}{\frac{1}{N_n}\sum_{k\in next(n)} Q_k}\right)\frac{1}{\left(\frac{SlotTime*}{SW_{max_{n,i}}+} + 4T_{CW_{n,i}}\right)^2}$$ [Expression 75]

In Expressions 74 and 75, $\beta_{CW}$ is a coefficient, which is defined as shown in Expression 76.

$\beta_{CW}=2\beta*\Delta T*\text{DATA\_Size}*\text{SlotTime}$ [Expression 76]

According to Expression 74, $CW_{min}$ of relay device n is controlled as follows. When the data remaining amount (buffer remaining amount) of each transmission buffer in the relay device is larger than the average value of the average data remaining amounts (average buffer remaining amounts) of the cooperative relay devices, $CW_{min}$ is decreased. When the data remaining amount (buffer remaining amount) of each transmission buffer in the relay device is smaller than the average value of the average data remaining amounts (average buffer remaining amounts) of the cooperative relay devices, $CW_{min}$ is increased.

Also, according to Expression 75, $CW_{max}$ of relay device n is controlled as follows. When the data remaining amount (buffer remaining amount) of each transmission buffer in the relay device is larger than the average value of the average data remaining amounts (average buffer remaining amounts) of the cooperative relay devices, $CW_{max}$ is decreased. When the data remaining amount (buffer remaining amount) of each transmission buffer in the relay device is smaller than the average value of the average data remaining amounts (average buffer remaining amounts) of the cooperative relay devices, $CW_{max}$ is increased.

This control of $CW_{min}$ and $CW_{max}$ based on Expressions 74 and 75 is performed by the total optimization flow control unit 1604. By adjusting $CW_{min}$ and $CW_{max}$ according to Expressions 74 and 75, MAC layer access control can be performed so that the data remaining amount (buffer remaining amount) of each transmission buffer in the relay device is made equal to average data remaining amount (average buffer remaining amount) $q_n$ of transmission buffers in its cooperative relay device, thereby suppressing an imbalance in buffer remaining amount on the transmission path.

Expression 77 is a control expression of the AIFS time by the total optimization flow control unit 1604.

$$\frac{dAIFS_{n,i}}{dt} = -\beta_{AIFS}\left(q_{n,i} - \frac{1}{N_n}\sum_{k\in next(n)} Q_k\right)\frac{1}{\left(\frac{AIFS_{n,i}+}{T_{AIFS}}\right)^2}$$ [Expression 77]

In Expression 77, $\beta_{AIFS}$ is a coefficient, which is defined as shown in Expression 78.

$\beta_{AIFS}=2\beta*\Delta T*\text{DATA\_Size}$ [Expression 78]

According to Expression 77, the AIFS of relay device n is controlled as follows. When the data remaining amount (buffer remaining amount) of each transmission buffer in the relay device is larger than the average value of the average data remaining amounts (average buffer remaining amounts) of the cooperative relay devices, the AIFS is decreased. When the data remaining amount (buffer remaining amount) of each transmission buffer in the relay device is smaller than the average value of the average data remaining amounts (average buffer remaining amounts) of the cooperative relay devices, the AIFS is increased.

This control of the AIFS based on Expression 77 is performed by the total optimization flow control unit 1604. By adjusting the AIFS of each transmission buffer according to Expression 77, MAC layer access control can be performed so that the data remaining amount (buffer remaining amount) of each transmission buffer in the relay device is made equal to average data remaining amount (average buffer remaining amount) $q_n$ of transmission buffers in its cooperative relay device, thereby suppressing an imbalance in data remaining amount (buffer remaining amount) of transmission buffers on the transmission path.

Expression 79 is a control expression of the TXOP by the total optimization flow control unit 1604.

$$\frac{dTXOP_{n,i}}{dt} = \beta_{TXOP}\left(q_{n,i} - \frac{1}{N_n}\sum_{k\in next(n)} Q_k\right)\frac{AIFS+BO}{\left(\frac{TOXP_{n,i}+}{AIFS+BO}\right)^2}$$ [Expression 79]

In Expression 79, $\beta_{TXOP}$ is a coefficient, which is defined as shown in Expression 80.

$$\beta_{TXOP} = 2\beta\Delta T \frac{DATA\_Size}{\left(\frac{DATA\_Size+}{ACK\_Size}\right)/r + 2SIFS} \quad \text{[Expression 80]}$$

According to Expression 79, the TXOP of relay device n is controlled as follows. When the data remaining amount (buffer remaining amount) of each transmission buffer in the relay device is larger than the average value of the average data remaining amounts (average buffer remaining amounts) of the cooperative relay devices, the TXOP is increased. When the data remaining amount (buffer remaining amount) of each transmission buffer in the relay device is smaller than the average value of the average data remaining amounts (average buffer remaining amounts) of the cooperative relay devices, the TXOP is decreased.

This control of the TXOP based on Expression 79 is performed by the total optimization flow control unit 1604. By adjusting the TXOP of each transmission buffer according to Expression 79, MAC layer access control can be performed so that the data remaining amount (buffer remaining amount) of each transmission buffer in the relay device is made equal to average data remaining amount (average buffer remaining amount) $q_n$ of transmission buffers in its cooperative relay device, thereby suppressing an imbalance in buffer remaining amount on the transmission path.

The fourth example describes the case where Expressions 64 and 74 for controlling the $CW_{min}$, Expressions 65 and 75 for controlling the $CW_{max}$, Expressions 68 and 77 for controlling the AIFS, and Expressions 72 and 79 for controlling the TXOP as the CSMA/CA adjustment parameters based on Expression 7 are used as a method of transmission amount control using EDCA. However, other control expressions for equalizing the data remaining amount between transmission buffers in one relay device and between transmission buffers of relay devices may also be used.

For example, though a throughput is computed based on Expression 67 using the assumption of the transmission timing shown in FIG. 25(b) in order to find the data transmission amount from the relay device, other expressions may be used depending on assumed conditions. As one example, an expression for calculating a transmission amount on an assumption of a transmission timing in consideration of Request to Send (RTS) and Clear to Send (CTS) notification between relay devices is applicable.

Also, in the case where the variation in data remaining amount (buffer remaining amount) of each transmission buffer with respect to the adjustment amount of the $CW_{min}$, $CW_{max}$, AIFS, or TXOP as the control target corresponding to Expression 51 can be regarded as approximately constant, the adjustment may be performed by using Expression 51 as a constant, in the same manner as in the third example.

Fifth Example

Cooperative Party Estimation Using Congestion Control Request Message

The fifth example relates to a method of realizing transmission amount control according to the present invention without mutual notification of a buffer remaining amount with a neighbor relay device, by using a congestion control request message employed in IEEE 802.11s.

Figure 27:
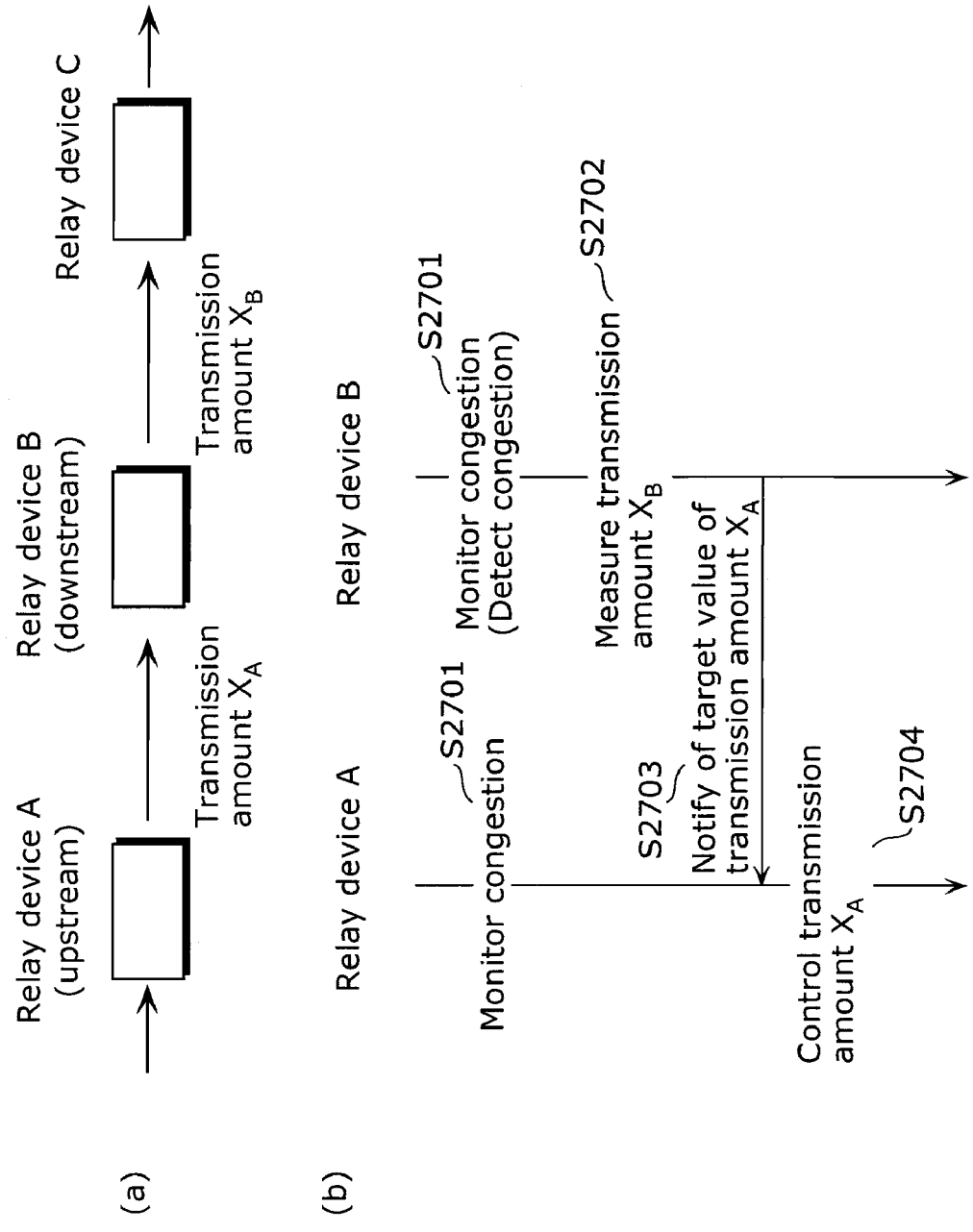
FIG. 27 is an explanatory diagram of an operation of a congestion control function in IEEE 802.11s.

FIG. 27 is an explanatory diagram of an operation of a congestion control function in IEEE 802.11s.

Currently, standardization activities for a technology that enables wireless data relay between wireless LAN access points are being carried out under IEEE 802.11s. IEEE 802.11s provides the following congestion avoidance function. Each relay device monitors its own congestion state. When congestion occurs, the relay device transmits a congestion control request message to an upstream relay device which transmits data to the relay device, to restrict the data transmission amount of the upstream relay device.

FIG. 27(a) shows a structure of relay devices for explaining the congestion control function of IEEE 802.11s. In FIG. 27(a), three relay devices A, B, and C are arranged in one row in this order, and data is relayed from relay device A (upstream) to relay device B (downstream), and from relay device B (downstream) to relay device C.

FIG. 27(b) is a time chart showing a congestion control operation of relay devices A and B shown in FIG. 27(a). The operation of each relay device is described below, with reference to the time chart of FIG. 27(b).

Each relay device monitors its own congestion state (Step S2701).

To monitor the congestion state, a method of monitoring a difference between an amount of data transmitted to the relay device and an amount of data transmitted from the relay device, or a method of monitoring a packet remaining amount in a transmission buffer, may be used. In each case, an occurrence of congestion is judged based on how large the monitored value is.

Suppose congestion is detected in relay device B as a result of congestion state monitoring. The congestion in relay device B may occur because data transmission amount $x_A$ of data transmitted to relay device B is larger than data transmission amount $x_B$ of data transmitted from relay device B. In such a case, to make transmission amount $x_A$ of upstream relay device A no larger than transmission amount $x_B$ of relay device B, relay device B measures transmission amount $x_B$ (Step S2702), and sends a congestion control request message to upstream relay device A to change transmission amount $x_A$ by setting transmission amount $x_B$ as a target value (upper limit) of transmission amount $x_A$ (Step S2703).

Upon receiving the congestion control request message, relay device A adjusts transmission amount $x_A$ so as not to exceed transmission amount $x_B$ (Step S2704).

The difference between the transmission amount control by the congestion control function of IEEE 802.11s and the transmission amount control according to the present invention is the following. In the transmission amount control according to the present invention, the transmission amount is controlled in consideration of the transmission buffer crowding state between relay devices, so as to suppress an imbalance in packet remaining amount between transmission buffers of both relay devices. In the transmission amount control by the congestion control function of IEEE 802.11s, on the other hand, the relay device that detects congestion unilaterally changes the transmission amount upper limit of the upstream relay device, without considering a possibility that the change of the transmission amount upper limit of the upstream relay device may cause a buffer remaining amount change (congestion) in the other relay device.

FIG. 28 is an explanatory diagram of a probability of transmitting the congestion control request message.

When the congestion of the relay device is judged based on the packet remaining amount of the transmission buffer, two thresholds, namely, upper_threshold and lower_threshold, are given to the transmission buffer, as shown in FIG. 28(a).

When the packet remaining amount is larger than upper_threshold, the relay device transmits a congestion control request packet to the upstream relay device. When the packet remaining amount is smaller than lower_threshold, the relay device does not transmit the congestion control request packet to the upstream relay device. When the packet remaining amount is in a range from lower_threshold to upper_threshold, the relay device transmits the congestion control request packet with a probability computed according to an expression shown in FIG. 28(*b*).

Suppose lower_threshold is 50, and upper_threshold is 80. When the packet remaining amount is 60, congestion control request packet transmission probability Pr is ⅓. When the packet remaining amount is 70, congestion control request packet transmission probability Pr is ⅔.

Thus, when the packet remaining amount is in the range from lower_threshold to upper_threshold, congestion control request packet transmission probability Pr changes in proportion to the packet remaining amount.

Accordingly, by observing the congestion control request packet transmission probability on the other relay device side and using an expression of FIG. 28(*c*) which defines the relation between the congestion control request packet transmission frequency and the packet remaining amount, it is possible to estimate the packet remaining amount of the transmission destination relay device and use it for transmission amount control, without direct notification of the packet remaining amount.

The estimation of the packet remaining amount from the congestion control request packet transmission frequency is performed by the buffer remaining amount communication unit 1602. Instead of using cooperative information transmitted from another relay device, the buffer remaining amount communication unit 1602 computes the transmission probability from the number or rate of congestion control request messages received within a predetermined time, and estimates the buffer remaining amount according to the expression of FIG. 28(*c*).

Note here that upper_threshold and lower_threshold may be changed to specify the packet remaining amount more accurately. For example, by setting upper_threshold to an upper limit of a buffer size and lower_threshold to 0, it is possible to estimate the packet remaining amount in the range from 0% to 100%.

When upper_threshold and lower_threshold are different for each relay device, the packet remaining amount can be estimated by notifying upper_threshold and lower_threshold as the performance information explained with reference to FIG. 11.

When the cooperative party transmission buffer state can be estimated from the congestion control request message, the transmission amount control for self-optimization and total optimization can be performed by using any of the methods described in the first to fifth examples.

In the case where the congestion control request message transmission probability does not change with the packet remaining amount of the transmission buffer, instead of using Expression 13 for transmission amount adjustment based on the difference in packet remaining amount between the relay device and the cooperative relay device, Expressions 81 and 83 for transmission amount adjustment based on the difference in transmission amount between the relay device and the cooperative relay device can be used. In this way, the transmission amount of each relay device is equalized to suppress congestion on the transmission path, by using only information of the transmission amount obtained from the congestion control request message.

$$J(x_{n,i}, \vec{X}_{next(n)}) = \left(x_{n,i} - \frac{1}{N_n} \sum_{k \in next(n)} x_k\right)^2 \quad \text{[Expression 81]}$$

In Expression 81, n is a number for identifying a relay device.

Also, i and j are each a number for identifying a transmission buffer in a relay device.

Also, next(n) is a set of numbers for identifying cooperative relay devices of relay device n.

Also, $N_n$ is the number of cooperative relay devices of relay device n, and X is a set of transmission amounts x of the cooperative relay devices obtained from the congestion control request message. X is defined as shown in Expression 82.

$$\vec{X}_{next(n)} = \{x_k | k \in next(n)\} \quad \text{[Expression 82]}$$

Function J of Expression 81 is a minimum value (0) when transmission amount $x_{n,i}$ of the i-th transmission buffer in relay device n is equal to the average value of transmission amounts $x_k$ of the $N_n$ cooperative relay devices, and monotonically increases with the difference between transmission amount $x_{n,i}$ of the i-th transmission buffer in relay device n and the average value of transmission amounts $x_k$ of the $N_n$ cooperative relay devices.

$$\frac{dx_{n,i}}{dt} = -\beta \frac{\partial J(x_{n,i}, \vec{X}_{next,(n)})}{\partial x_{n,i}} \quad \text{[Expression 83]}$$
$$= -2\beta \left(x_{n,i} - \frac{1}{N_n} \sum_{k \in next(n)} x_k\right)$$

In Expression 83, n is a number for identifying a relay device.

Also, i and k are each a number for identifying a transmission buffer in a relay device.

Also, next(n) is a set of numbers for identifying cooperative relay devices of relay device n, $N_n$ is the number of cooperative relay devices of relay device n, and β is a coefficient.

Expression 83 is a control expression whose right-hand side includes a derivative obtained by partially differentiating the function of Expression 81 with respect to data transmission amount $x_{n,i}$. This expression is used by the total optimization flow control unit 1604 to calculate data transmission amount $x_{n,i}$ so that function J approaches the minimum value.

According to Expression 83, the transmission amount of the i-th transmission buffer in relay device n is controlled as follows. When transmission amount $x_i$ of the i-th transmission buffer is larger than the average value of transmission amounts $x_k$ of the cooperative relay devices, transmission amount $x_i$ is decreased. When transmission amount $x_i$ of the i-th transmission buffer is smaller than the average value of transmission amounts $x_k$ of the cooperative relay devices, transmission amount $x_i$ is increased.

This control of the transmission amount based on Expression 83 is performed by the total optimization flow control unit 1604. By adjusting the transmission amount to approach an equal level to transmission amount $x_k$ of its cooperative relay device, an imbalance in transmission amount x between relay devices on the path from the transmission source to the transmission destination is suppressed. As a result, congestion can be prevented.

It should be noted that, as the congestion-related message transmission in IEEE 802.11s, instead of using the congestion control request message adopted in unicasting, a neighborhood congestion announcement message adopted in broadcasting may be used to estimate a buffer remaining amount or a transmission amount of a congested relay device.

As described above, through the use of the congestion control request message defined in IEEE 802.11s, transmission amount control of suppressing a buffer remaining amount imbalance on a transmission path can be achieved by using only a message adopted in an existing standard.

The first to fifth examples describe the case where an average buffer remaining amount or a total buffer remaining amount of a plurality of transmission buffers in a cooperative relay device is notified, but this can be modified as follows. The buffer remaining amount communication unit 1602 notifies a buffer remaining amount or a transmission amount of each transmission buffer individually, and the total optimization flow control unit 1604 selects and uses only a buffer remaining amount of a transmission buffer that relates to a transmission path of a corresponding data flow. This allows transmission amount $x_{n,i}$ to be adjusted using only a packet remaining amount of a transmission buffer that relates to a transmission path of corresponding traffic. As a result, transmission amount $x_{n,i}$ can be controlled more accurately.

The first to fifth examples describe the case where Expression 7 is used as the basis of formulation of self-optimization control, but an expression other than Expression 7 may be used as the basis for determining a transmission amount of each transmission buffer depending on a crowding state of the transmission buffer.

For instance, to allocate transmission amount $x_{n,i,out}$ to each transmission buffer in relay device n in proportion to a data remaining amount of the transmission buffer with respect to a total transmission amount of relay device n, an evaluation function shown in Expression 84 may be used.

$$H(\vec{q}_n) = \left(x_{n,i,out} - \frac{q_{n,i}}{\sum_j^{M_n} q_{n,j}} x_{n,out}\right)^2 \quad \text{[Expression 84]}$$

In Expression 84, function H is an evaluation function that is a minimum value when the transmission amount of each transmission buffer is in proportion to the remaining amount of the transmission buffer with respect to the total transmission amount of the relay device, and increases with the difference between the transmission amount of the transmission buffer and the amount in proportion to the buffer remaining amount of the transmission buffer with respect to the total transmission amount of the relay device.

A control expression of the transmission amount, which is obtained by applying the evaluation function of Expression 84 to Expression 7 instead of evaluation function F of Expression 3, is shown in Expression 85.

$$\frac{dx_{n,i}}{dt} = -\alpha \frac{\partial H(\vec{q}_n)}{\partial x_{n,i}} \quad \text{[Expression 85]}$$

$$= -2\alpha\left(x_{n,i,out} - \frac{q_{n,i}}{\sum_j^{M_n} q_{n,j}} x_{n,out}\right)$$

In Expression 85, n is a number for identifying a relay device.

Also, i and j are each a number for identifying a transmission buffer in a relay device.

Also, $M_n$ is the number of one-hop neighbor relay devices to which relay device n forwards data.

Also, $\alpha$ is a coefficient.

According to Expression 85, the transmission amount of each transmission buffer is controlled as follows. When the transmission amount is larger than the amount obtained by dividing the total transmission amount of the relay device in proportion to the buffer remaining amount of the transmission buffer, the transmission amount is decreased. When the transmission amount is smaller than the amount obtained by dividing the total transmission amount of the relay device in proportion to the buffer remaining amount of the transmission buffer, the transmission amount is increased.

The above description concerns the case where Expression 13 is used as the basis of formulation of total optimization control, but other control expressions may be used as the basis for determining the transmission amount so that the crowding state of each relay device on the transmission path is equalized.

For instance, though the above examples describe the comparison with the average data remaining amount of transmission buffers as the transmission buffer state of the one-hop neighbor relay device on the transmission path, other control expressions for comparing a value such as a maximum value, a minimum value, or a variance value (standard deviation) of the buffer remaining amount in a predetermined time may instead be used.

The comparison of the maximum buffer remaining amount in the predetermined time has an advantage that the transmission amount adjustment can be performed in consideration of a worst condition where the amount of data remaining in the transmission buffer is largest. The comparison of the minimum buffer remaining amount in the predetermined time, on the other hand, has an advantage that the transmission amount adjustment can be performed on an assumption that the free space of the transmission buffer can be put to maximum use.

As described above, according to the embodiment of the present invention, a congested part on a transmission path of each communication flow is solved. This produces an effect of reducing a delay caused by packet retransmission or the like in the congested part.

Also, since the data remaining amount of each relay device varies approximately uniformly, data transmission that makes maximum use of the buffer capacity on the transmission path is possible. This produces an effect of reducing a data loss rate.

The embodiment disclosed above should be considered merely as an example and should not in any sense be interpreted as limiting the scope of the present invention. The scope of the present invention is shown not by the above description but by the claims, and all variations which are equivalent in meaning and range to the claims are included in the scope of the present invention.

INDUSTRIAL APPLICABILITY

The present invention achieves high-quality transmission of video and audio using a network system in which fixed terminals or mobile terminals are connected by a wired or wireless network, and can be used for applications such as home monitoring, town monitoring, and ITS.

Also, the present invention is applicable not only to video and audio transmission but also to transmission of various media including text, still images, music, and the like, and enables high-quality media transmission both indoors and outdoors. Furthermore, the present invention achieves high-quality transmission not only for real-time media transmission using UDP or TCP but also for non-real-time transmission such as the Web and data downloading.

The invention claimed is:

1. A relay transmission device for transmitting data from a transmission terminal to a reception terminal via a plurality of relay devices, said relay transmission device comprising:

transmission buffers each of which corresponds to, among the plurality of relay devices, a different one of relay devices that are data transmission destinations, and temporarily holds data to be transmitted from said relay transmission device to the corresponding relay device;

a cooperative party determination unit operable to determine one or more cooperative relay devices that are to cooperate with said relay transmission device, from among the plurality of relay devices;

a transmission flow information management unit operable to, for each cooperative relay device, exchange information including a data remaining amount of a transmission buffer with the cooperative relay device, the data remaining amount being an amount of data held in the transmission buffer;

a self-optimization flow control unit operable to, for each cooperative relay device, determine an amount of data to be transmitted from said relay transmission device to the cooperative relay device so that respective data remaining amounts of said transmission buffers are equalized;

a total optimization flow control unit operable to, for each cooperative relay device, determine an amount of data to be transmitted from said relay transmission device to the cooperative relay device so that a data remaining amount of said transmission buffers and a data remaining amount of transmission buffers included in the cooperative relay device are equalized;

an optimization coefficient storage unit in which a self-optimization coefficient and a total optimization coefficient are stored for each cooperative relay device, the self-optimization coefficient being a coefficient for weighting the amount of data determined by said self-optimization flow control unit, and the total optimization coefficient being a coefficient for weighting the amount of data determined by said total optimization flow control unit; and a transmission buffer management unit operable to, for each cooperative relay device, calculate a sum of a value obtained by weighting the amount determined by said self-optimization flow control unit based on the self-optimization coefficient and a value obtained by weighting the amount determined by said total optimization flow control unit based on the total optimization coefficient, and transmit data of an amount specified by the calculated sum to the cooperative relay device.

2. The relay transmission device according to claim 1, further comprising a balance adjustment unit operable to, for each cooperative relay device, compare an influence of congestion caused by transmission bandwidth allocation contention on said relay transmission device and an influence of congestion caused by transmission bandwidth allocation contention on the cooperative relay device, increase the self-optimization coefficient and decrease the total optimization coefficient when the influence on said relay transmission device is larger than the influence on the cooperative relay device, and decrease the self-optimization coefficient and increase the total optimization coefficient when the influence on said relay transmission device is smaller than the influence on the cooperative relay device.

3. The relay transmission device according to claim 2, wherein said balance adjustment unit is operable to, for each cooperative relay device, increase the self-optimization coefficient and decrease the total optimization coefficient when the data remaining amount of said transmission buffers in said relay transmission device is larger than the data remaining amount of the transmission buffers in the cooperative relay device, and decrease the self-optimization coefficient and increase the total optimization coefficient when the data remaining amount of said transmission buffers in said relay transmission device is smaller than the data remaining amount of the transmission buffers in the cooperative relay device.

4. The relay transmission device according to claim 1, wherein said self-optimization flow control unit is operable to, for each cooperative relay device, compare a data remaining amount of one of said transmission buffers in said relay transmission device corresponding to the cooperative relay device and an average data remaining amount of said transmission buffers in said relay transmission device, increase the amount of data to be transmitted to the cooperative relay device when the data remaining amount of said transmission buffer corresponding to the cooperative relay device is larger than the average data remaining amount of said transmission buffers, and decrease the amount of data to be transmitted to the cooperative relay device when the data remaining amount of said transmission buffer corresponding to the cooperative relay device is smaller than the average data remaining amount of said transmission buffers.

5. The relay transmission device according to claim 1, wherein said total optimization flow control unit is operable to calculate an average data remaining amount of transmission buffers in all of the one or more cooperative relay devices and, for each cooperative relay device, compare a data remaining amount of one of said transmission buffers in said relay transmission device corresponding to the cooperative relay device and the calculated average data remaining amount, increase the amount of data to be transmitted to the cooperative relay device when the data remaining amount of said transmission buffer corresponding to the cooperative relay device is larger than the calculated average data remaining amount, and decrease the amount of data to be transmitted to the cooperative relay device when the data remaining amount of said transmission buffer corresponding to the cooperative relay device is smaller than the calculated average data remaining amount.

6. The relay transmission device according to claim 1, wherein said cooperative party determination unit is operable to, when the data remaining amount of said transmission buffers in said relay transmission device is larger than a first threshold, increase a number of hops specifying a range of cooperative relay devices, and determine each relay device which is located within a range of the increased number of hops counted from said relay transmission device, as a cooperative relay device.

7. The relay transmission device according to claim 6, wherein said cooperative party determination unit is further operable to exclude, from the determination, a relay device which is located within the range of the increased number of hops counted from said relay transmission device but whose transmission buffers have a data remaining amount that is larger than a second threshold.

8. The relay transmission device according to claim 1,
wherein said cooperative party determination unit is operable to determine a relay device whose transmission buffers have a data remaining amount that is smaller than a predetermined threshold, as a cooperative relay device, and
the predetermined threshold is a median value or a mode value of the data remaining amount of the transmission buffers in the relay device in a predetermined time period.

9. The relay transmission device according to claim 1,
wherein said cooperative party determination unit is operable to determine, with a higher priority, a relay device whose transmission buffers have a larger physical size as a cooperative relay device.

10. The relay transmission device according to claim 1,
wherein said cooperative party determination unit is operable to exclude, from the determination, a relay device that exceeds said relay transmission device in at least one of an airtime metric, a transmission error rate, a forward error correction strength, a retransmission count, a retransmission time, and a number of accommodated terminals.

11. The relay transmission device according to claim 1,
wherein said cooperative party determination unit is operable to exclude a relay device that has a smaller reception electric field intensity than said relay transmission device, from the determination.

12. The relay transmission device according to claim 1,
wherein said cooperative party determination unit is operable to exclude a relay device whose maximum transmission rate absolute difference from said relay transmission device is larger than a predetermined threshold, from the determination.

13. The relay transmission device according to claim 1,
wherein said transmission flow information management unit is operable to increase a frequency of exchanging the information, when the data remaining amount of said transmission buffers in said relay transmission device is larger than a first threshold.

14. The relay transmission device according to claim 13,
wherein said transmission flow information management unit is operable to, for each cooperative relay device, increase the frequency of exchanging the information with the cooperative relay device, when the data remaining amount of said transmission buffers in said relay transmission device is larger than the first threshold and the data remaining amount of the transmission buffers in the cooperative relay device is smaller than a second threshold.

15. The relay transmission device according to claim 1,
wherein said transmission flow information management unit is operable to increase a frequency of exchanging the information, when the data remaining amount of said transmission buffers in said relay transmission device is larger than a first threshold, and
the first threshold is a median value or a mode value of the data remaining amount of said transmission buffers in said relay transmission device in a first time period.

16. The relay transmission device according to claim 15,
wherein said transmission flow information management unit is operable to, for each cooperative relay device, increase the frequency of exchanging the information with the cooperative relay device, when the data remaining amount of said transmission buffers in said relay transmission device is larger than the first threshold and the data remaining amount of the transmission buffers in the cooperative relay device is smaller than a second threshold, and
the second threshold is a median value or a mode value of the data remaining amount of the transmission buffers in the cooperative relay device in a second time period.

17. The relay transmission device according to claim 1,
wherein said transmission flow information management unit is operable to, for each cooperative relay device, increase a frequency of exchanging the information with the cooperative relay device, when said transmission buffers in said relay transmission device have a smaller physical size than the transmission buffers in the cooperative relay device.

18. The relay transmission device according to claim 1,
wherein said transmission flow information management unit is operable to, for each cooperative relay device, increase a frequency of exchanging the information with the cooperative relay device, when the cooperative relay device is a larger number of hops away from said relay transmission device.

19. The relay transmission device according to claim 1,
wherein said transmission flow information management unit is operable to, for each cooperative relay device, increase a frequency of exchanging the information with the cooperative relay device, when said relay transmission device has a smaller maximum transmission rate than the cooperative relay device.

20. The relay transmission device according to claim 1,
wherein said transmission flow information management unit is operable to, for each cooperative relay device, decrease a frequency of exchanging the information with the cooperative relay device when an absolute difference in maximum transmission rate between said relay transmission device and the cooperative relay device is larger than a predetermined threshold, in a case where said relay transmission device and the cooperative relay device perform mutual data transmission.

21. A relay transmission method used in a relay transmission device for transmitting data from a transmission terminal to a reception terminal via a plurality of relay devices,
the relay transmission device including transmission buffers each of which corresponds to, among the plurality of relay devices, a different one of relay devices that are data transmission destinations, and temporarily holds data to be transmitted from the relay transmission device to the corresponding relay device,
said relay transmission method comprising:
a cooperative party determination step of determining one or more cooperative relay devices that are to cooperate with the relay transmission device, from among the plurality of relay devices;
a transmission flow information management step of, for each cooperative relay device, exchanging information including a data remaining amount of a transmission buffer with the cooperative relay device, the data remaining amount being an amount of data held in the transmission buffer;
a self-optimization flow control step of, for each cooperative relay device, determining an amount of data to be transmitted from the relay transmission device to the cooperative relay device so that respective data remaining amounts of the transmission buffers are equalized;
a total optimization flow control step of, for each cooperative relay device, determining an amount of data to be transmitted from the relay transmission device to the cooperative relay device so that a data remaining amount of the transmission buffers and a data remaining amount of transmission buffers included in the cooperative relay device are equalized; and a transmission buffer management step of, for each cooperative relay device, calculating a sum of a value obtained by weighting the amount determined in said self-optimization flow control step based on a self-optimization coefficient and a value obtained by weighting the amount determined in said total optimization flow control step based on a total optimization coefficient, and transmitting data of an amount specified by the calculated sum to the cooperative relay device.

22. A non-transitory computer-readable storage medium having a program stored thereon, the program being executable on a computer for transmitting data from a transmission terminal to a reception terminal via a plurality of relay devices, the computer including transmission buffers each of which corresponds to, among the plurality of relay devices, a different one of relay devices that are data transmission destinations, and temporarily holds data to be transmitted from the computer to the corresponding relay device, said program causing the computer to execute:

a cooperative party determination step of determining one or more cooperative relay devices that are to cooperate with the computer, from among the plurality of relay devices;

a transmission flow information management step of, for each cooperative relay device, exchanging information including a data remaining amount of a transmission buffer with the cooperative relay device, the data remaining amount being an amount of data held in the transmission buffer;

a self-optimization flow control step of, for each cooperative relay device, determining an amount of data to be transmitted from the computer to the cooperative relay device so that respective data remaining amounts of the transmission buffers are equalized;

a total optimization flow control step of, for each cooperative relay device, determining an amount of data to be transmitted from the computer to the cooperative relay device so that a data remaining amount of the transmission buffers and a data remaining amount of transmission buffers included in the cooperative relay device are equalized; and a transmission buffer management step of, for each cooperative relay device, calculating a sum of a value obtained by weighting the amount determined in said self-optimization flow control step based on a self-optimization coefficient and a value obtained by weighting the amount determined in said total optimization flow control step based on a total optimization coefficient, and transmitting data of an amount specified by the calculated sum to the cooperative relay device.

* * * * *